US009897429B2

(12) United States Patent
Pitzer

(10) Patent No.: US 9,897,429 B2
(45) Date of Patent: Feb. 20, 2018

(54) HARVESTER SUSPENSION

(71) Applicant: Harvest CROO, LLC, Plant City, FL (US)

(72) Inventor: Robert Pitzer, Tampa, FL (US)

(73) Assignee: HARVEST CROO, LLC, Plant City, FL (US)

( * ) Notice: Subject to any disclaimer, the term of this patent is extended or adjusted under 35 U.S.C. 154(b) by 45 days.

(21) Appl. No.: 15/045,073

(22) Filed: Feb. 16, 2016

(65) Prior Publication Data

US 2016/0161238 A1  Jun. 9, 2016

Related U.S. Application Data

(63) Continuation-in-part of application No. 14/576,598, filed on Dec. 19, 2014, now Pat. No. 9,480,202.
(Continued)

(51) Int. Cl.
*A01D 46/30* (2006.01)
*G01B 5/14* (2006.01)
(Continued)

(52) U.S. Cl.
CPC .............. *G01B 5/14* (2013.01); *A01D 46/30* (2013.01); *A01D 45/006* (2013.01); *A01D 46/24* (2013.01)

(58) Field of Classification Search
CPC ..... A01B 51/02; A01B 69/008; A01B 79/005; A01C 45/006; A01C 46/24; A01C 46/30;
(Continued)

(56) References Cited

U.S. PATENT DOCUMENTS 3,460,332 A  8/1969 Bucheke et al.
3,552,108 A  1/1971 Kattan et al.
(Continued)

FOREIGN PATENT DOCUMENTS

JP  2008023746 A  1/1996
JP  2009145367 A  6/1997
(Continued)

OTHER PUBLICATIONS

International Search Report and Written Opinion for PCT/US2014/071411 dated Apr. 16, 2015.
(Continued)

*Primary Examiner* — Robert Pezzuto
(74) *Attorney, Agent, or Firm* — Bryan Cave LLP

(57) ABSTRACT

A harvesting vehicle including a body including a plurality of picking systems configured to be carried over plants growing in one or more plant beds to harvest crops of the plants. Each picking system can include an imaging system and can be configured to (a) determine a height of the picking system over one of the one or more plant beds as the picking system is carried over the plants and (b) provide distance measurement data based on the height. The harvesting vehicle also can include a plurality of wheels each having a vertical position with respect to the body. The harvesting vehicle also can include a suspension control system configured to perform: receiving the distance measurement data from the plurality of picking systems; determining adjustment information for an adjustment of the vertical position of one or more of the plurality of wheels with respect to the body based at least in part on the distance measurement data provided by at least one of the plurality of picking systems; and controlling the adjustment of the vertical position of the one or more of the plurality of wheels
(Continued)

with respect to the body based on the adjustment information. Other embodiments are provided.

20 Claims, 48 Drawing Sheets

Related U.S. Application Data

(60) Provisional application No. 61/919,168, filed on Dec. 20, 2013, provisional application No. 62/116,890, filed on Feb. 16, 2015.

(51) Int. Cl.
*A01D 45/00* (2018.01)
*A01D 46/24* (2006.01)

(58) Field of Classification Search
CPC .... A01G 1/001; A01G 3/08; B25J 9/04; B25J 9/0084; B25J 18/02; B25J 18/06; B25J 19/021; Y10S 56/15; G01B 5/14
USPC .............. 56/328.1, 330, 10.2 A, 10.2 R, 1; 382/110, 153; 701/1, 50
See application file for complete search history.

(56) References Cited

U.S. PATENT DOCUMENTS

| | | | |
|---|---|---|---|
| 3,596,456 A | 8/1971 | Quick | |
| 3,698,171 A | 10/1972 | Hecht | |
| 4,003,193 A | 1/1977 | Haws | |
| 4,034,542 A | 7/1977 | Loehr | |
| 4,064,682 A | 12/1977 | Haws | |
| 4,291,525 A | 9/1981 | Benkert | |
| 4,519,191 A | 5/1985 | Ledebuhr et al. | |
| 4,532,757 A | 8/1985 | Tutle | |
| 4,663,925 A | 5/1987 | Terada | |
| 4,843,561 A | 6/1989 | Larson | |
| 5,024,052 A | 6/1991 | Bragg et al. | |
| 5,544,474 A | 8/1996 | Finkelstein | |
| 6,105,352 A | 8/2000 | Tremblay et al. | |
| 6,338,236 B1 | 1/2002 | Rodriguez | |
| 6,671,582 B1 * | 12/2003 | Hanley .................. | A01B 51/02 250/339.11 |
| 7,694,458 B2 | 4/2010 | Fukuyama et al. | |
| 8,306,663 B2 | 11/2012 | Wickham | |
| 8,336,893 B2 | 12/2012 | Grossberger | |
| 2006/0150602 A1 | 7/2006 | Stimmann | |
| 2010/0050588 A1 | 3/2010 | Ramirez | |
| 2011/0252760 A1 | 10/2011 | Bravo Trinidad et al. | |

FOREIGN PATENT DOCUMENTS

| | | |
|---|---|---|
| JP | 02757480 | 5/1998 |
| JP | 2001095348 | 10/2001 |
| JP | 2011206014 | 10/2011 |
| JP | 2012148380 | 8/2012 |
| WO | 2010063075 | 6/2010 |

OTHER PUBLICATIONS

The Japan Times; "Latest robot can pick strawberry fields forever"; http://www.japantimes.co.jp/news/2013/09/26/business/latest-robot-can-pick-strawberry-fields-forever/# Vln_X9LF-iA; Sep. 26, 2013.
National Physical Laboratory (UK); "Robot strawberry pickers"; http://www.npl.co.uk/news/robot-strawberry-pickers; Aug. 7, 2013.
ASME; "Smart Robots for Picking Fruit"; https://www.asme.org/engineering-topics/articles/robotics/smart-robots-for-picking-fruit; May 2013.
US Department of Agriculture: National Institute of Food and Agriculture; "USDA Grants Support Federal Partnership for Robotics Research"; http://www.csrees.usda.gov/newsroom/news/2013news/10251_robots.html; Oct. 25, 2013.
CNS News; "Gov't Pays $1,123,463 to Develop Strawberry Harvest-Aiding Robots"; http://cnsnews.com/article/eric-schneider/govt-pays-1123463-develop-strawberry-harvest-aiding-robots; Nov. 8, 2013.
Singularity Hub; "Japan's Robot Picks Only the Ripest Strawberries"; https://singularityhub.com/2010/12/04/japans-robot-picks-only-the-ripes-strawberries; Dec. 4, 2010.
CNET; "Strawberry-picking robot knows when they're ripe"; https://www.cnet.com/news/strawberry-picking-robot-knows-when-theyre-ripe/; Dec. 13, 2010.
CNET; "$50,000 strawberry picking robot to go on sale in Japan"; http://cnet.com/news/50000-strawberry-picking-robot-to-go-on-sale-in-japan/; Sep. 27, 2013.
TechCrunch ; "Video: Impressive Strawberry Picking Robot"; http://techcrunch.com/2010/12/01/video-impressive-strawberry-picking-robot/; Dec. 1, 2010.
Wired; "Robot Learns to Pick the Sweetest, Ripest Strawberries"; http://www.wired.com/2012/08/st_strawberry_robot/; Aug. 6, 2012.
Agrobot; "Strawbery Harvesters"; http://www.agrobot.com/products.html; Jan. 16, 2015.
Robotic Harvesting, LLC; "Products: Robotic Strawberry Harvester"; http://roboticharvesting.com/products.html; Jan. 16, 2015.
The Packer; "Robotic harvesters may be the future"; http://www.thepacker.com/fruit-vegetable-news/shipping-profiles/Robotic-harvesters-may-be-the-futur-256744101.html?print=1; Apr. 25, 2014.
CropCare; "PA 1400 Picking Assistant"; http://www.cropcareequipment.com/vegetable_equip/picking_assistant.php; Jan. 16, 2015.
International Search Report and Written Opinion from PCT/US2016/018099, dated May 12, 2016.

* cited by examiner

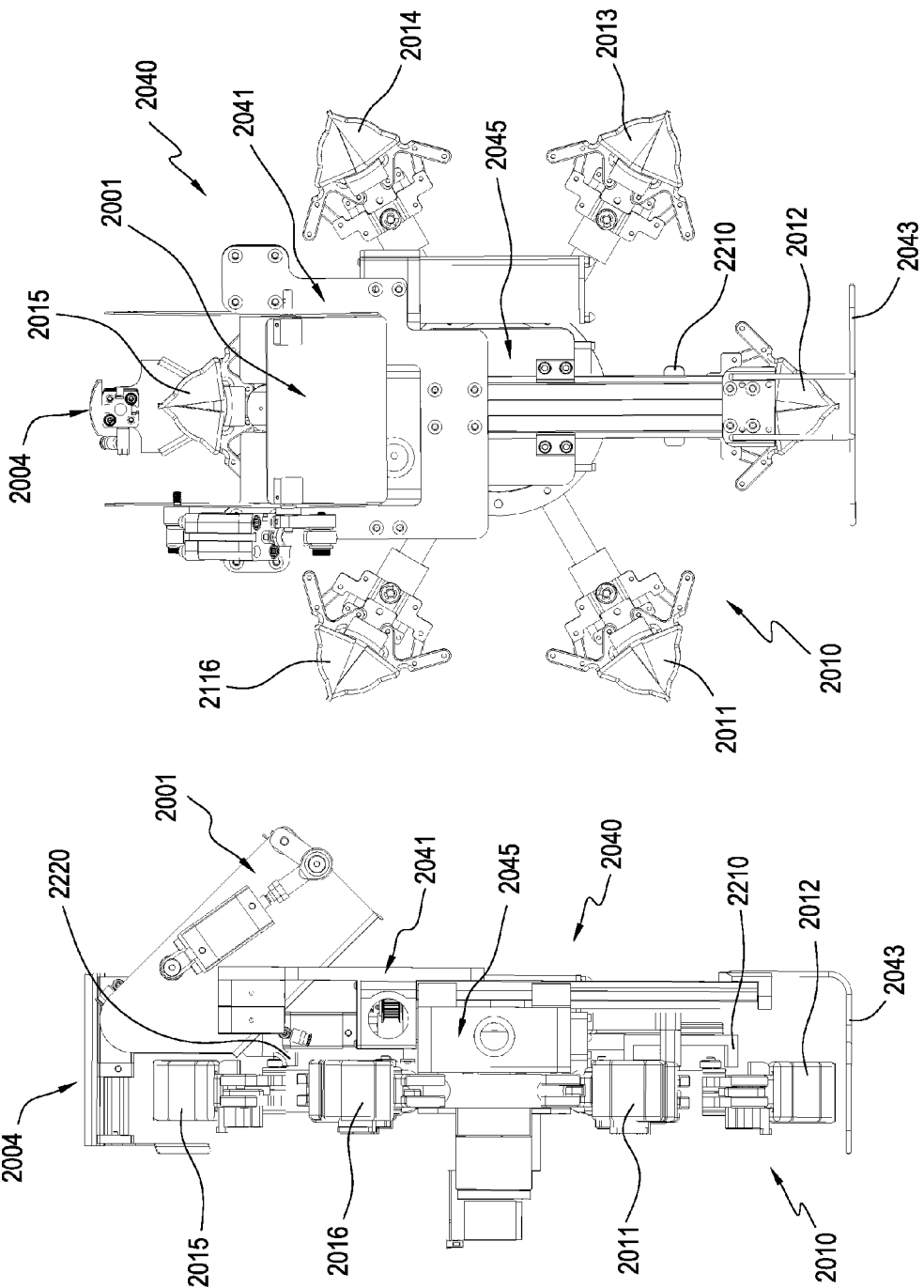

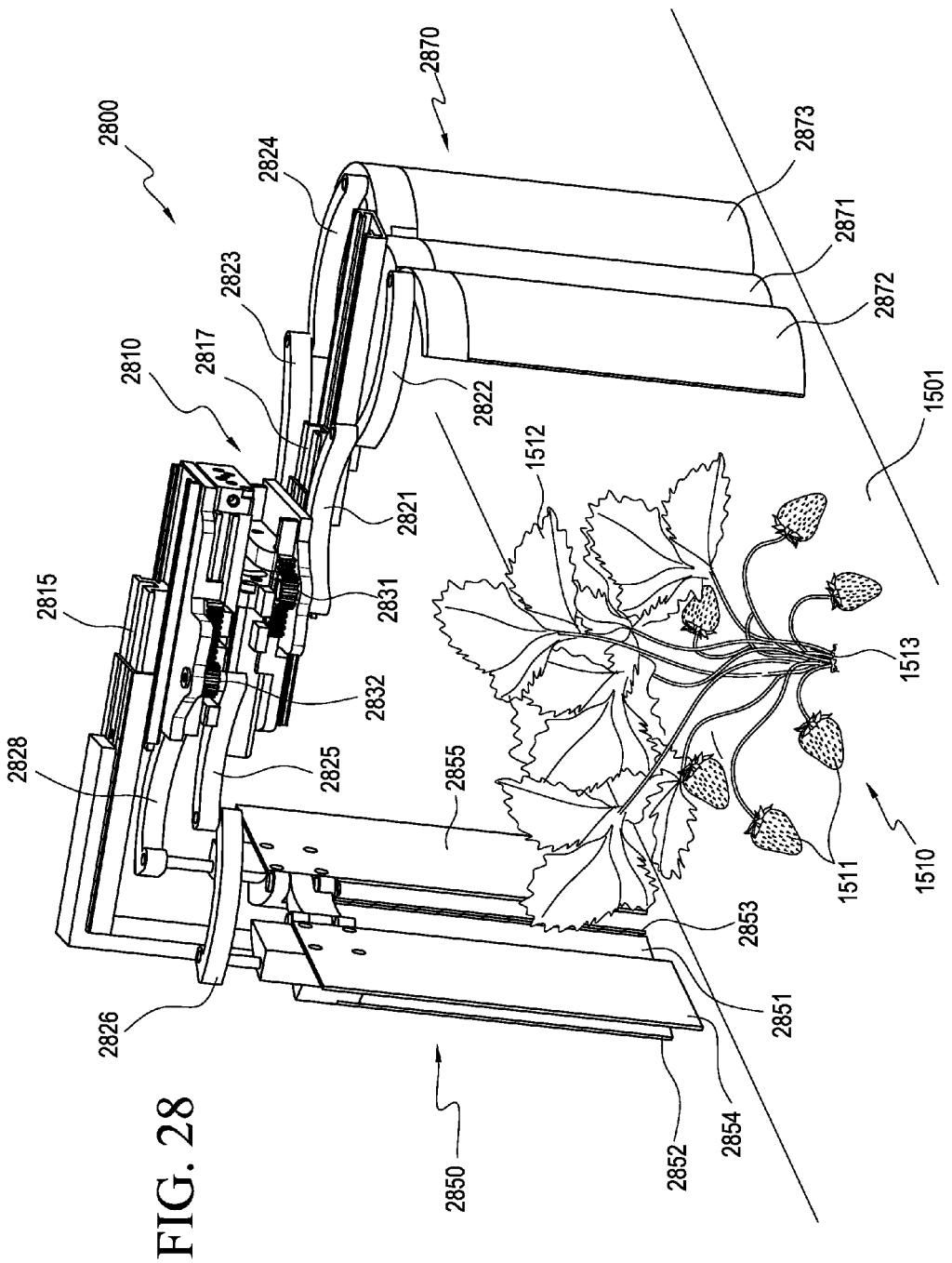

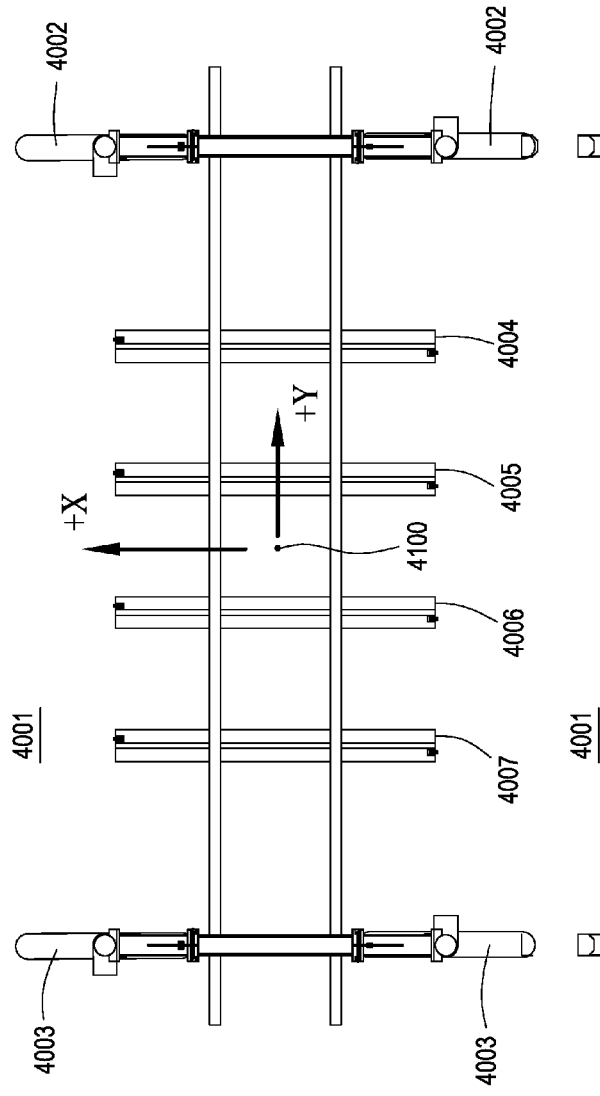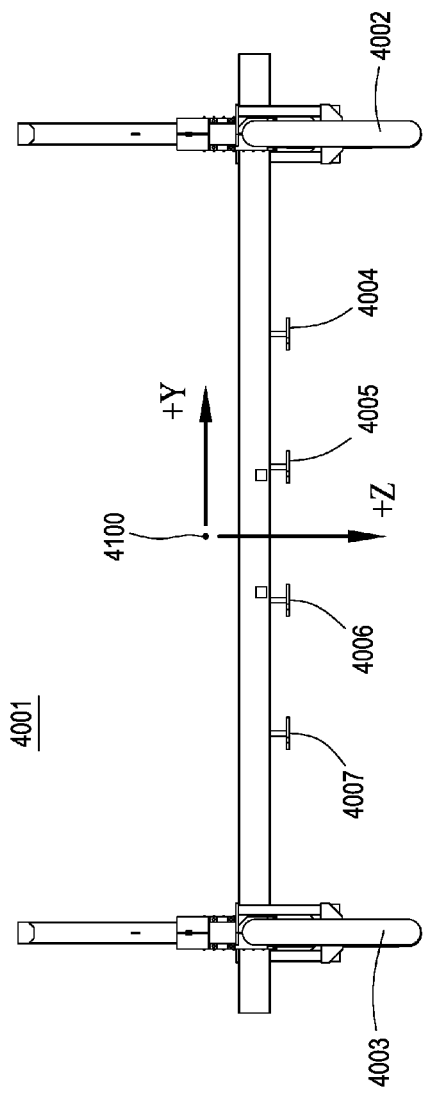
FIG. 41
FIG. 42

HARVESTER SUSPENSION

CROSS-REFERENCE TO RELATED APPLICATIONS

This application is a continuation-in-part of U.S. patent application Ser. No. 14/576,598, filed Dec. 19, 2014, which claims the benefit of U.S. Provisional Application No. 61/919,168, filed Dec. 20, 2013. This application also claims the benefit of U.S. Provisional Application No. 62/116,890, filed Feb. 16, 2015. U.S. patent application Ser. No. 14/576,598, and U.S. Provisional Application Nos. 61/919,168 and 62/116,890 are incorporated herein by reference in their entirety.

TECHNICAL FIELD

This disclosure relates generally to crop harvesting, and relates more particularly to automated systems for selectively picking crops from plants.

BACKGROUND

Various crops, such as strawberries, have been harvested typically using manual labor due to the delicate nature of the crops and the selective nature of the harvesting. For example, laborers perform the harvesting by selectively picking ripe crops from the plants while leaving unripe crops on the plants for later harvesting when they have ripened. The high seasonal demand for laborers and the limited labor force has resulted in increased labor costs and crops being left unpicked. Further, labor shortages have resulted in portions of fields being left unplanted in order to avoid the effort, expense, and waste involved with growing unpicked crops.

BRIEF DESCRIPTION OF THE DRAWINGS

To facilitate further description of the embodiments, the following drawings are provided in which:

FIG. 24 illustrates a right side view of the carriage assembly, the picking apparatus, the collection apparatus, and the crop ejector of FIG. 20, in which the picking apparatus is in a raised offload position and a gripper of the picking apparatus is in a closed offload position;

FIG. 25 illustrates a rear side view of the carriage assembly, the picking apparatus, the collection apparatus, and the crop ejector of FIG. 24;

FIG. 28 illustrates a perspective view of a leaf displacement system, according to an embodiment, hovering over the plant and growing bed of FIG. 15 in an open configuration;

FIG. 41 illustrates a top view of the portion of the vehicle of FIG. 40, showing an X-axis and a Y-axis in a coordinate system for a guidance control system;

FIG. 42 illustrates a rear view of the vehicle of FIG. 40, showing the Y-axis and a Z-axis in the coordinate system of FIG. 41 for a guidance control system;

Figure 1:
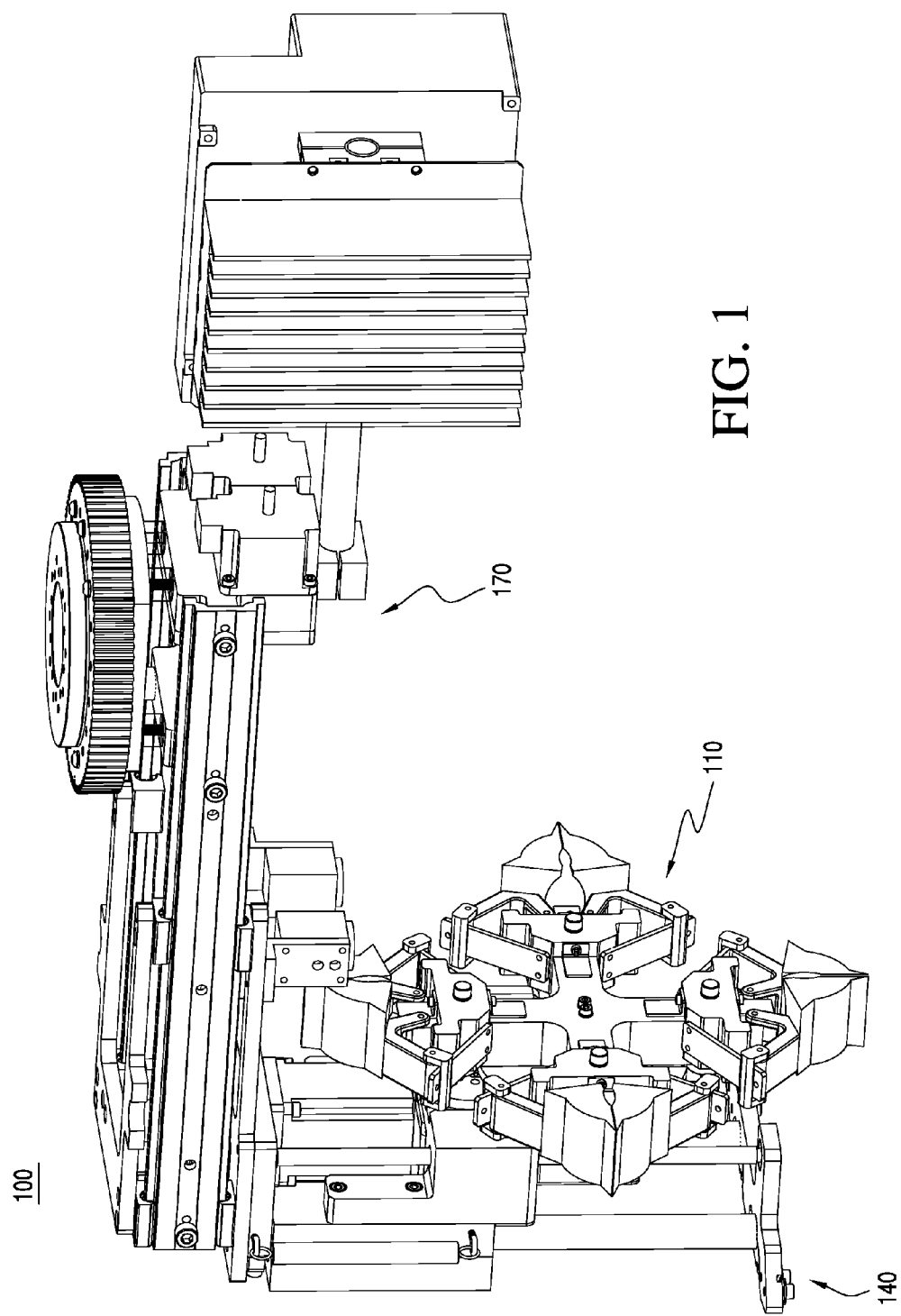
FIG. 1 illustrates a top, front, left side perspective view of a harvesting robot, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant.

"Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a device for selectively harvesting crops on a plant. The device can include a picking apparatus. The picking apparatus can be rotatable around a central axis. The picking apparatus can include a plurality of grippers each spaced apart and extending radially from the central axis, and each configured to pick a different individual one of the crops. Each of the plurality of grippers can be adjustable between an open position and a closed position. Each of the plurality of grippers can be configured in the open position to open around the individual crop. Each of the plurality of grippers can be configured in the closed position to securely hold the individual crop when the picking apparatus is rotated around the central axis.

A number of embodiments include a method of providing a device for selectively harvesting crops on a plant. The method can include providing a picking apparatus. The picking apparatus can be rotatable around a central axis. The picking apparatus can include a plurality of grippers each spaced apart and extending radially from the central axis, and each configured to pick a different individual one of the crops. The method also can include providing a carriage assembly. The carriage assembly can include a first rotational mechanism. The picking apparatus can be configured to be coupled to the first rotational mechanism. The first rotational mechanism can be configured to rotate the picking apparatus around the central axis in a rotational path with respect to the carriage assembly. Each of the plurality of grippers can be adjustable between an open position and a closed position. Each of the plurality of grippers can be configured in the open position to open around the individual crop. Each of the plurality of grippers can be configured in the closed position to securely hold the individual crop when the picking apparatus is rotated around the central axis.

Some embodiments include a foliage displacement mechanism for facilitating harvesting crops on a plant. The foliage displacement mechanism can include a back surface configured to extend normal to a growing bed of the plant. The foliage displacement mechanism also can include a base configured to extend parallel to the growing bed from the back surface toward the plant. The foliage displacement mechanism further can include a curved surface extending from the base upward to the back surface. The foliage displacement mechanism also can include a channel bisecting a front portion of the base and extending upward through the curved surface, the channel being configured to surround a center of the plant when the foliage displacement mechanism is moved toward the plant. The foliage displacement mechanism can be configured, when moved toward the plant, to move the foliage upward and toward the center of the plant to expose at least a portion of the crops.

Various embodiments include a system. The system can include a picking apparatus including a plurality of grippers each spaced apart and extending radially from a central axis of the picking apparatus, and each configured to pick a different individual crop of crops of plants. The picking apparatus can be configured to use a first one of the plurality of grippers to pick a first individual crop of the crops at a first time. During a second time period that starts with a second one of the plurality of grippers picking a second individual crop of the crops and ends with a third one of the plurality of grippers picking a third individual crop of the crops, the picking apparatus can be configured to offload the first individual crop from the first one of the plurality of grippers. The second time period can start after the first time. The second and third ones of the plurality of grippers can be configured to hold the second and third individual crops, respectively, at the end of the second time period.

A number of embodiments include a method. The method can include picking, at a first time, a first individual crop of crops of plants using a picking apparatus. The picking apparatus can include a plurality of grippers each spaced apart and extending radially from a central axis of the picking apparatus, and each configured to pick a different individual crop of the crops of the plants. The method also can include picking a second individual crop of the crops to start a second time period. The second time period can start after the first time. The method additionally can include offloading the first individual crop during the second time period. The method further can include picking a third individual crop of the crops to end the second time period. The picking apparatus can hold the second and third individual crops at the end of the second time period.

Several embodiments include a method of providing a system. The method can include providing a picking apparatus. Providing the picking apparatus can include providing a plurality of grippers. Providing the picking apparatus can include attaching the plurality of grippers to the picking apparatus such that the plurality of grippers are each spaced apart and extend radially from a central axis. The plurality of grippers each can be configured to pick a different individual crop of crops of plants. The picking apparatus can be configured to use a first one of the plurality of grippers to pick a first individual crop of the crops at a first time. During a second time period that starts with a second one of the plurality of grippers picking a second individual crop of the crops and ends with a third one of the plurality of grippers picking a third individual crop of the crops, the picking apparatus can be configured to offload the first individual crop from the first one of the plurality of grippers. The second time period can start after the first time. The second and third ones of the plurality of grippers can be configured to hold the second and third individual crops, respectively, at the end of the second time period.

Various embodiments include a system including a foliage displacement system. The foliage displacement system can include a support structure and two or more surfaces movably coupled to the support structure and configured to move between an open configuration of the foliage displacement system and a closed configuration of the foliage displacement system. The two or more surfaces can be configured to move foliage of a plant toward a center of the plant such that crops of the plant that underlie the foliage are exposed when the foliage displacement system moves from the open configuration to the closed configuration.

Several embodiments include a method. The method can include moving foliage of a plant toward a center of the plant using two or more surfaces of a foliage displacement system such that crops of the plant that underlie the foliage are exposed when the foliage displacement system moves from an open configuration of the foliage displacement system to a closed configuration of the foliage displacement system. The foliage displacement system can include a support structure and the two or more surfaces. The two or more surfaces can be movably coupled to the support structure and configured to move between the open configuration to the closed configuration. The method also can include holding in a stationary manner the foliage of the plant using the two or more surfaces when the foliage displacement system is in the closed configuration to keep the crops of the plant exposed.

A number of embodiments include a method of providing a system. The method can include providing a foliage displacement system. Providing a foliage displacement system can include providing a support structure. Providing a foliage displacement system also can include providing two or more surfaces. Providing a foliage displacement system further can include movably coupling the two or more surfaces to the support structure, such that the two or more surfaces are configured to move between an open configuration of the foliage displacement system and a closed configuration of the foliage displacement system. The two or more surfaces can be configured to move foliage of a plant toward a center of the plant such that crops of the plant that underlie the foliage are exposed when the foliage displacement system moves from the open configuration to the closed configuration.

Many embodiments include a harvesting vehicle. The harvesting vehicle can include a body including a plurality of picking systems configured to be carried over plants growing in one or more plant beds to harvest crops of the plants. Each picking system can include an imaging system and can be configured to (a) determine a height of the picking system over one of the one or more plant beds as the picking system is carried over the plants and (b) provide distance measurement data based on the height. The harvesting vehicle also can include a plurality of wheels each having a vertical position with respect to the body. The harvesting vehicle also can include a suspension control system configured to perform: receiving the distance measurement data from the plurality of picking systems; determining adjustment information for an adjustment of the vertical position of one or more of the plurality of wheels with respect to the body based at least in part on the distance measurement data provided by at least one of the plurality of picking systems; and controlling the adjustment of the vertical position of the one or more of the plurality of wheels with respect to the body based on the adjustment information.

Some embodiments include a method. The method can include receiving distance measurement data provided from a plurality of picking systems carried by a harvesting vehicle over plants growing in one or more plant beds to harvest crops of the plants. Each picking system can include an imaging system and can be configured to determine a height of the picking system over one of the one or more plant beds as the picking system is carried over the plants. The distance measurement data can be based on the height. The harvesting vehicle can include (a) a body comprising the plurality of picking systems and (b) a plurality of wheels each having a vertical position with respect to the body. The method also can include determining adjustment information for an adjustment of the vertical position of one or more of the plurality of wheels with respect to the body based at least in part on the distance measurement data provided by at least one of the plurality of picking systems. The method additionally can include controlling the adjustment of the vertical position of the one or more of the plurality of wheels with respect to the body based on the adjustment information.

Various embodiments include a method of providing a harvesting vehicle. The method can include providing a body comprising a plurality of picking systems configured to be carried over plants growing in one or more plant beds to harvest crops of the plants. Each picking system can include an imaging system and configured to (a) determine a height of the picking system over one of the one or more plant beds as the picking system is carried over the plants and (b) provide distance measurement data based on the height. The method also can include providing a plurality of wheels each having a vertical position with respect to the body. The method additionally can include providing a suspension control system configured to perform: receiving the distance measurement data from the plurality of picking systems; determining adjustment information for an adjustment of the vertical position of one or more of the plurality of wheels with respect to the body based at least in part on the distance measurement data provided by at least one of the plurality of picking systems; and controlling the adjustment of the vertical position of the one or more of the plurality of wheels with respect to the body based on the adjustment information.

Several embodiments include a system. The system can include one or more first carriers each configured to carry two or more robotic systems. The system also can include one or more second carriers configured to be coupled to a vehicle that is movable across a surface. Each of the one or more first carriers each can be movably coupled to and carried by one of the one or more second carriers. The system can be configured to automatically hold each of the one or more first carriers in a first carrier position and stationary with respect to the surface for a first time period while the vehicle moves the one or more second carriers in a first direction with respect to the surface, such that at least a portion of each of the two or more robotic systems carried by each of the one or more first carriers is carried in a stationary manner with respect to the surface for the first time period by each of the one or more first carriers.

A number of embodiments include a method. The method can include moving a vehicle across a surface in a first direction, such that one or more second carriers coupled to the vehicle are moved in the first direction with respect to the surface. The one or more second carriers can be movably coupled to and can be carrying one or more first carriers each configured to carry two or more robotic systems. The method also can include automatically offsetting the movement in the first direction of the one or more second carriers to hold each of the one or more first carriers in a first carrier position and stationary with respect to the surface for a first time period while the vehicle moves the one or more second carriers in the first direction, such that at least a portion of each of the two or more robotic systems carried by each of the one or more first carriers is carried in a stationary manner with respect to the surface for the first time period by each of the one or more first carriers.

Many embodiments include a method of providing a system. The method can include providing one or more first carriers each configured to carry two or more robotic systems. The method also can include providing one or more second carriers configured to be coupled to a vehicle that is movable across a surface. The method additionally can include movably coupling each of the one or more first carriers to one of the one or more second carriers, such that the each of the one or more first carriers is carried by the one of the one or more second carriers. The system can include the one or more first carriers and the one or more second carriers. The system can be configured to automatically hold each of the one or more first carriers in a first carrier position and stationary with respect to the surface for a first time period while the vehicle moves the one or more second carriers in a first direction with respect to the surface, such that at least a portion of each of the two or more robotic systems carried by each of the one or more first carriers is carried in a stationary manner with respect to the surface for the first time period by each of the one or more first carriers.

Some embodiments include a vehicle. The vehicle can include a body, a plurality of wheels movably coupled to the body, a guidance control system. The plurality of wheels can be configured to roll through rows between plant beds such that at least a portion of the body moves above the plant beds. The guidance control system can be configured to guide the vehicle along the rows. The guidance control system can be configured to track a different individual plant location of each individual plant of plants that are either planned for growth or growing in the plant beds.

Several embodiments include a method. The method can include guiding a vehicle along rows. The rows can be between plant beds. The vehicle can include a body, a plurality of wheels movable coupled to the body, and a guidance control system. The plurality of wheels can be configured to move along the rows such that at least a portion of the body moves above the plant beds. The method also can include Tracking a different individual plant location of each individual plant of plants that are either planned for growth or growing in the plant beds.

Further embodiments include a method of providing a vehicle. The method can include providing a body, providing a plurality of wheels movably coupled to the body, and providing a guidance control system. The plurality of wheels can be configured to roll through rows between plant beds such that at least a portion of the body moves above the plant beds. The guidance control system can be configured to guide the vehicle along the rows. The guidance control system can be configured to track a different individual plant location of each individual plant of plants that are either planned for growth or growing in the plant beds.

Figure 2:
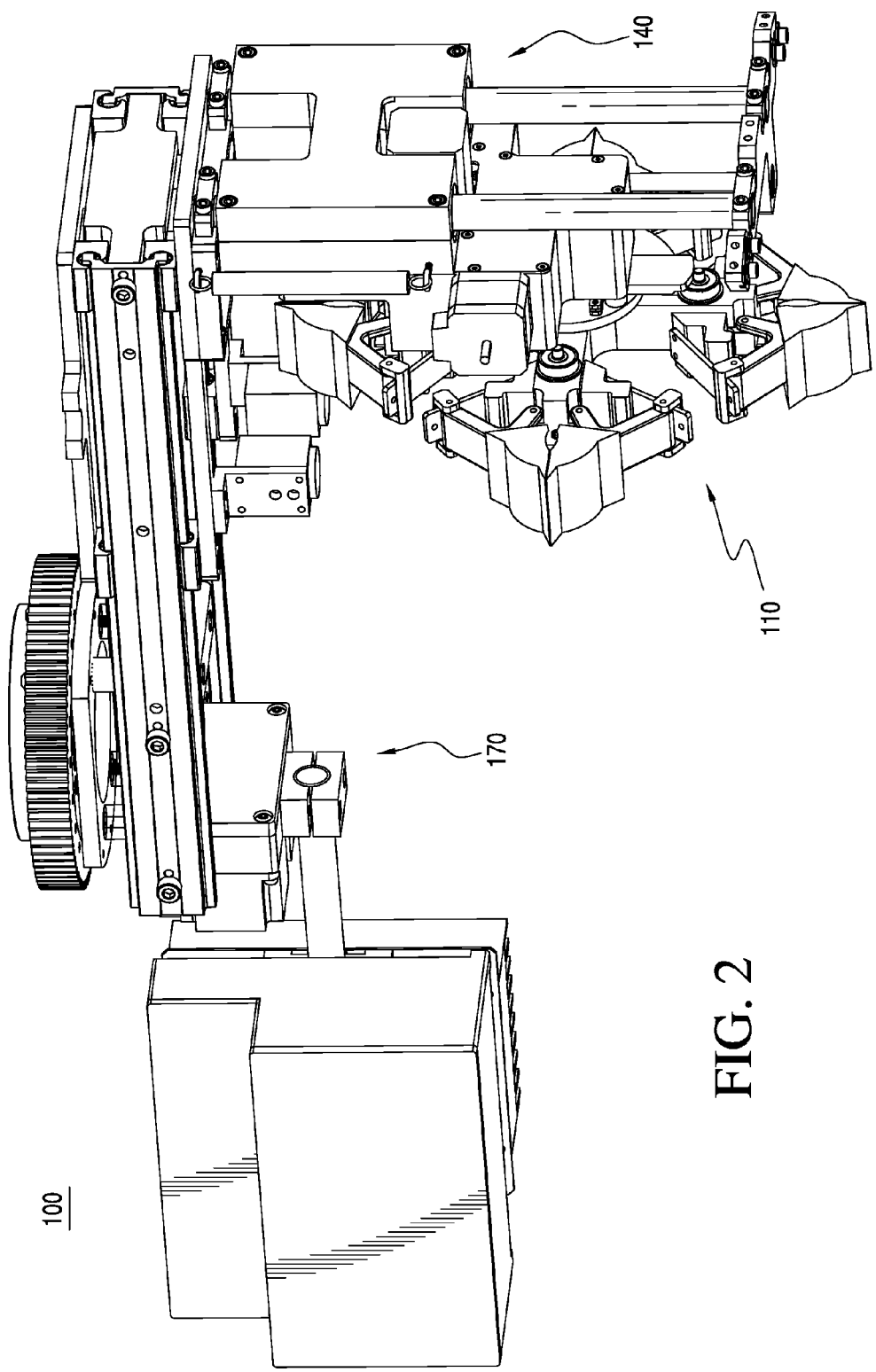
FIG. 2 illustrates a bottom, back, right side perspective view of the harvesting robot of FIG. 1.

Turning to the drawings, FIG. 1 illustrates a top, front, left side perspective view of a harvesting robot 100. FIG. 2 illustrates a bottom, back, right side perspective view of harvesting robot 100. Harvesting robot 100 is merely exemplary, and embodiments of the harvesting robot are not limited to embodiments presented herein. The harvesting robot can be employed in many different embodiments or examples not specifically depicted or described herein. In many embodiments, harvesting robot 100 can include a picking apparatus 110, a carriage assembly 140, and/or a carrier assembly 170. In several embodiments, harvesting robot 100 can be configured to harvest crops from plants. In some embodiments, harvesting robot 100 can be used to harvest crops such as strawberries from strawberry plants. In the same or other embodiments, harvesting robot 100 can be used to harvest crops such as tomatoes, peppers (e.g., bell peppers, chili peppers, etc.), oranges, and/or other suitable crops. In a number of embodiments, harvesting robot 100 can be configured to selectively pick crops (e.g., ripe crops) from plants, and leave other crops (e.g., unripe crops) on the plants.

Figure 3:
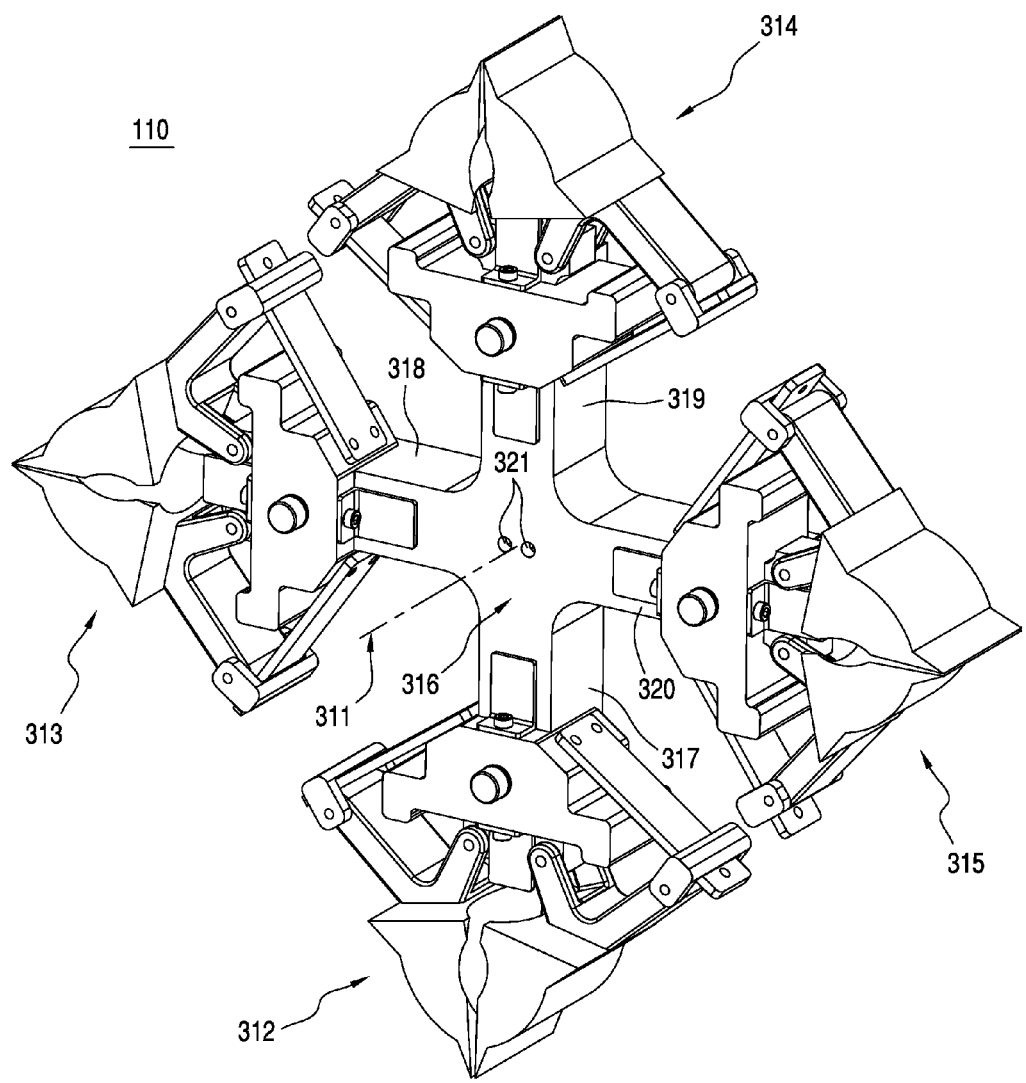
FIG. 3 illustrates a top, front, right side perspective view of a picking apparatus, according to the embodiment of FIG. 1.

Turning ahead in the drawings, FIG. 3 illustrates a top, front, right side perspective view of picking apparatus 110. Picking apparatus 110 is merely exemplary, and embodiments of the picking apparatus are not limited to embodiments presented herein. The picking apparatus can be employed in many different embodiments or examples not specifically depicted or described herein. In many embodiments, picking apparatus 110 can be rotatable around a central axis 311. In a number of embodiments, picking apparatus 110 can include one or more grippers, such as grippers 312, 313, 314, and/or 315. In various embodiments, each of the grippers (e.g., 312-315) can be used to pick a different individual one of the crops. For example, gripper 312 can be used to pick a first strawberry; gripper 313 can be used to pick a second strawberry; gripper 314 can be used to pick a third strawberry; and/or gripper 315 can be used to pick a fourth strawberry. In a number of embodiments, picking apparatus 110 can include four grippers (e.g., 312-315), such as shown in FIG. 3. In other embodiments, the number of grippers (e.g., 312-315) on picking apparatus 110 can be one, two, three, five, six, seven, eight, nine, ten, or another suitable number of grippers. In some embodiments, the number of grippers can be even numbered. In other embodiments, the number of grippers can be odd numbered. In several embodiments, the number of grippers (e.g., 312-315) on picking apparatus 110 can be based on the average number of individual crops (e.g., strawberries, etc.) expected to be harvested from a plant, the time it takes to offload the individual crops from the grippers (e.g., 312-315), a compromise (such as an optimal compromise) between the maximum number of individual crops expected to be harvested and the time it takes to offload the individual crops, and/or other suitable factors. Each gripper can be identical to the other grippers in picking apparatus 110.

In a number of embodiments, the grippers (e.g., 312-315) can be spaced apart and/or can extend radially from central axis 311. In many embodiments, the grippers (e.g., 312-315) can be facing radially outwards from a rotational circumference of picking apparatus 110. In some embodiments, the gripper can be equally spaced apart on picking apparatus 110. In several embodiments, picking apparatus 110 can include a frame 316, which can include one or more spokes, such as spokes 317, 318, 319, and/or 320. In various embodiments, each gripper (e.g., 312-315) can be attached to a different spoke (e.g., 317-320). For example, as shown in FIG. 3, gripper 312 can be attached to spoke 317; gripper 313 can be attached to spoke 318; gripper 314 can be attached to spoke 319; and/or gripper 315 can be attached to spoke 320. In other embodiments, frame 316 can be a solid wheel with or without spokes, and the grippers (e.g., 312-315) can be attached to the solid wheel of frame 316. In various embodiments, frame 316 can include an attachment mechanism, such as attachment mechanism 321. In many embodiments, attachment mechanism 321 can be used to rotate picking apparatus 110 around central axis 311.

Figure 4:
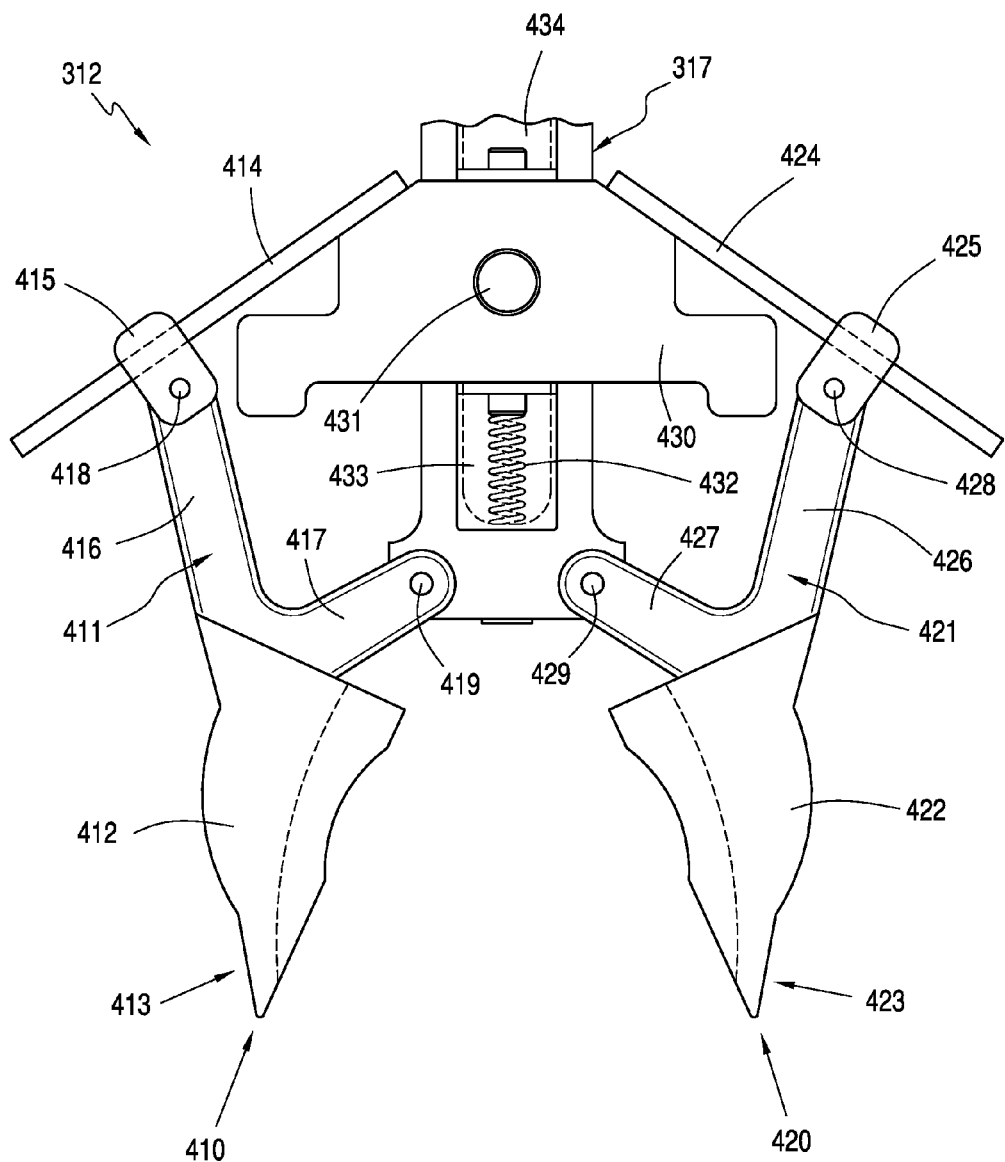
FIG. 4 illustrates a front view of a gripper of the picking apparatus of FIG. 3 in an open position.
Figure 5:
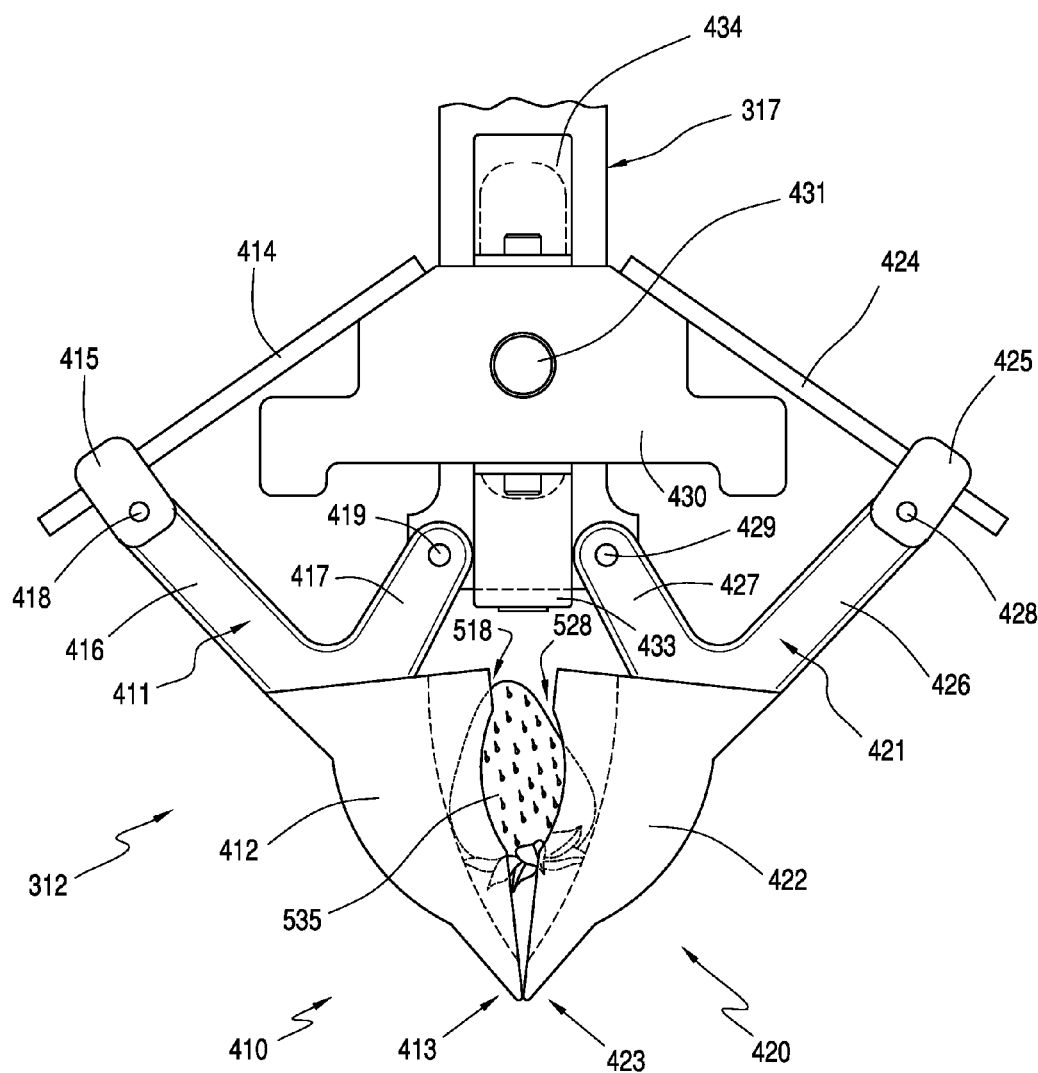
FIG. 5 illustrates a front view of the gripper of FIG. 4 in a closed position.

Turning ahead in the drawings, FIG. 4 illustrates a front view of gripper 312 in an open position. FIG. 5 illustrates a front view of gripper 312 in a closed position. Gripper 312 is merely exemplary, and embodiments of the gripper are not limited to embodiments presented herein. The gripper can be employed in many different embodiments or examples not specifically depicted or described herein. In many embodiments, each of the other grippers (e.g., 313-315 (FIG. 3)) on picking apparatus 110 (FIG. 3) can be identical or similar to gripper 312. In several embodiments, gripper 312 can be adjustable between the open position, as shown in FIG. 4, and the closed position, as shown in FIG. 5. In a number of embodiments, gripper 312 can be configured in the open position (as shown in FIG. 4) to open around an individual crop, such as a single strawberry growing on a strawberry plant, or another suitable crop. In many embodiments, gripper 312 can be configured in the closed position (as shown in FIG. 5) to securely hold the individual crop, such as strawberry 535, when picking apparatus 110 (FIGS. 1-3) is moved and/or rotated around central axis 311 (FIG. 3).

In various embodiments, gripper 312 can include a first claw piece 410 and a second claw piece 420. In other embodiments, gripper 312 can include a single claw or scoop piece and one or more support pieces. In yet other embodiments, gripper 312 can include three or more claw pieces. In many embodiments, first claw piece 410 can include a first claw frame 411 and/or second claw piece 420 can include a second claw frame 421. In some embodiments, first claw frame 411 can provide rigid support for first claw piece 410, and/or second claw frame 421 can provide rigid support for second claw piece 420. In a number of embodiments, first claw frame 411 and/or second claw frame 421 can be made of a suitable rigid polymer (e.g., polycarbonate (PC), acrylonitrile butadiene styrene (ABS)), metal (e.g., aluminum), or another suitable material.

In many embodiments, first claw piece 410 can include a first claw surface 412, and/or second claw piece 420 can include a second claw surface 422. In a number of embodiments, first claw surface 412 can be attached to and/or can at least partially cover first claw frame 411, and/or second claw surface 422 can be attached to and/or can at least partially cover second claw frame 421. In a number of embodiments, first claw surface 412 and/or second claw surface 422 can be made of a soft and/or elastic material, such as silicone rubber, thermoplastic elastomer (TPE) (e.g., thermoplastic polyurethane (TPU)), rubber, foam, neoprene, or another suitable material that can provide a gentle, soft, and/or compliant surface for contacting, without damaging, the crops, and/or that can be suitable for contact with food. For example, first claw surface 412 and/or second claw surface 422 can be made of 20 A Shore durometer silicone rubber. First claw surface 412 and/or second claw surface 422 can be within a range of durometer, such as below 50 A Shore durometer.

In many embodiments, first claw piece 410 can include a first tip 413, and/or second claw piece 420 can include a second tip 423. In many embodiments, first tip 413 and/or second tip 423 can be wedge-shaped and/or configured to be inserted between crops to separate an individual crop from proximate crops (e.g., a cluster of crops) in order to pick the individual crop without damaging the proximate crops. For example, if a crop to be picked is located between two other nearby crops, first tip 413 can be configured to be wedged between the crop to be picked and another one of the nearby crops, and second tip 423 can be configured to be wedged between the crop to be picked and the other one of the nearby crops, which can separate and/or isolate the individual crop to be picked from the nearby crops without damaging the nearby crops.

In some embodiments, first claw piece 410 can include a retention surface 518, and/or second claw piece 420 can include a retention surface 528. Retention surface 518 and/or retention surface 528 can be configured to securely hold the crop (e.g., strawberry 535) in gripper 312. In several embodiments, such as shown in FIG. 5, retention surface 518 and/or retention surface 528 can each include a concave surface, which can at least partially surround the crop (e.g., strawberry 535) to facilitate securely holding the crop.

In several embodiments, gripper 312 can be spring biased to be in the open position, as shown in FIG. 4. In a number of embodiments, gripper 312 can include a displacement block 430, which can be coupled to spoke 317, and which can be configured to slide radially inward and outward along spoke 317. In several embodiments, displacement block 430 can include a pin 431, which can facilitate coupling displacement block 430 to spoke 317. In many embodiments, spoke 317 can include a compression spring 432, which can compress when displacement block 430 is adjusted outward along spoke 317 to adjust gripper 312 to the closed position, as shown in FIG. 5, and which can be biased to press displacement block 430 inward along spoke 317 to adjust gripper 312 to the open position, as shown in FIG. 4. In various embodiments, gripper 312 can include one or more spring guards, such as spring guard 433 and/or spring guard 434, which can cover and/or protect compression spring 432.

In many embodiments, a first claw piece 410 can include a first displacement mounting portion 416 and a spoke mounting portion 417, and/or second claw piece 420 can include a second displacement mounting portion 426 and a spoke mounting portion 427. In a number of embodiments, spoke mounting portion 417 and/or spoke mounting portion 427 can be hingedly coupled to spoke 317, such as at a hinge 419 and/or a hinge 429, respectively. In several embodiments, first displacement mounting portion 416 and/or second displacement mounting portion 426 can be linkedly attached to displacement block 430, such that adjusting the position of displacement block 430 can adjust first claw piece 410 and/or second claw piece 420 between the open position, as shown in FIG. 4, and the closed position, as shown in FIG. 5, such as by rotating first claw piece 410 around hinge 419 and/or rotating second claw piece 420 around hinge 429.

In many embodiments, gripper 312 can include a first strip 414, a first linkage piece 415, a second strip 424, and/or a second linkage piece 425. First strip 414 and/or second strip 424 can be coupled to displacement block 430. First linkage piece 415 can be hingedly coupled to first displacement mounting portion 416 at a hinge 418, and can be coupled, such as slidably coupled, to first strip 414. Second linkage piece 425 can be hingedly coupled to second displacement mounting portion 426 at a hinge 428, and can be coupled, such as slidably coupled, to second strip 424. In many embodiments, first strip 414 and/or second strip 424 can be made of a flexible and/or abrasive-resistant semi-rigid material, such as ultra-high-molecular-weight (UHMW) polyethylene (UHMWPE). As shown in FIGS. 4-5, as displacement block 430 is adjusted radially outward on spoke 317, first strip 414 can push first claw piece 410 forward to rotate around hinge 419 to the closed position, and first linkage piece 415 can slide outwardly along first strip 414 away from displacement block 430 as the position of first displacement mounting portion 416 is adjusted. Similarly, as displacement block 430 is adjusted radially outward on spoke 317, second strip 424 can push second claw piece 420 forward to rotate around hinge 429 to the closed position, and second linkage piece 425 can slide outwardly along second strip 424 away from displacement block 430 as the position of second displacement mounting portion 426 is adjusted.

In several embodiments, as displacement block 430 is adjusted radially outward on spoke 317, first strip 414 and/or second strip 424 can bend backward (i.e., toward a center of frame 316 (FIG. 3)) to account for first claw piece 410 and/or second claw piece 420, respectively, not fully pushing forward in their rotation around hinge 419 and/or hinge 429, respectively. For example, if gripper 312 is utilized to pick a large-size crop, the size of the crop can prevent first claw piece 410 and/or second claw piece 420 from being fully pushed forward in their rotation around hinge 419 and/or hinge 429, respectively. When displacement block 430 is adjusted radially outward on spoke 317, first strip 414 and/or second strip 424 can provide spring-loaded bias on first claw piece 410 and/or second claw piece 420, respectively, to securely hold a crop (e.g., strawberry 535) in gripper 312. In a number of embodiments, the spring-loaded bending of first strip 414 and/or second strip 424 can advantageously allow gripper 312 to pick crops of various different sizes and securely hold those different-sized crops without damaging the crops. For example, gripper 312 can be configured to pick strawberries ranging from small-sized strawberries to large-sized strawberries.

Figure 6:
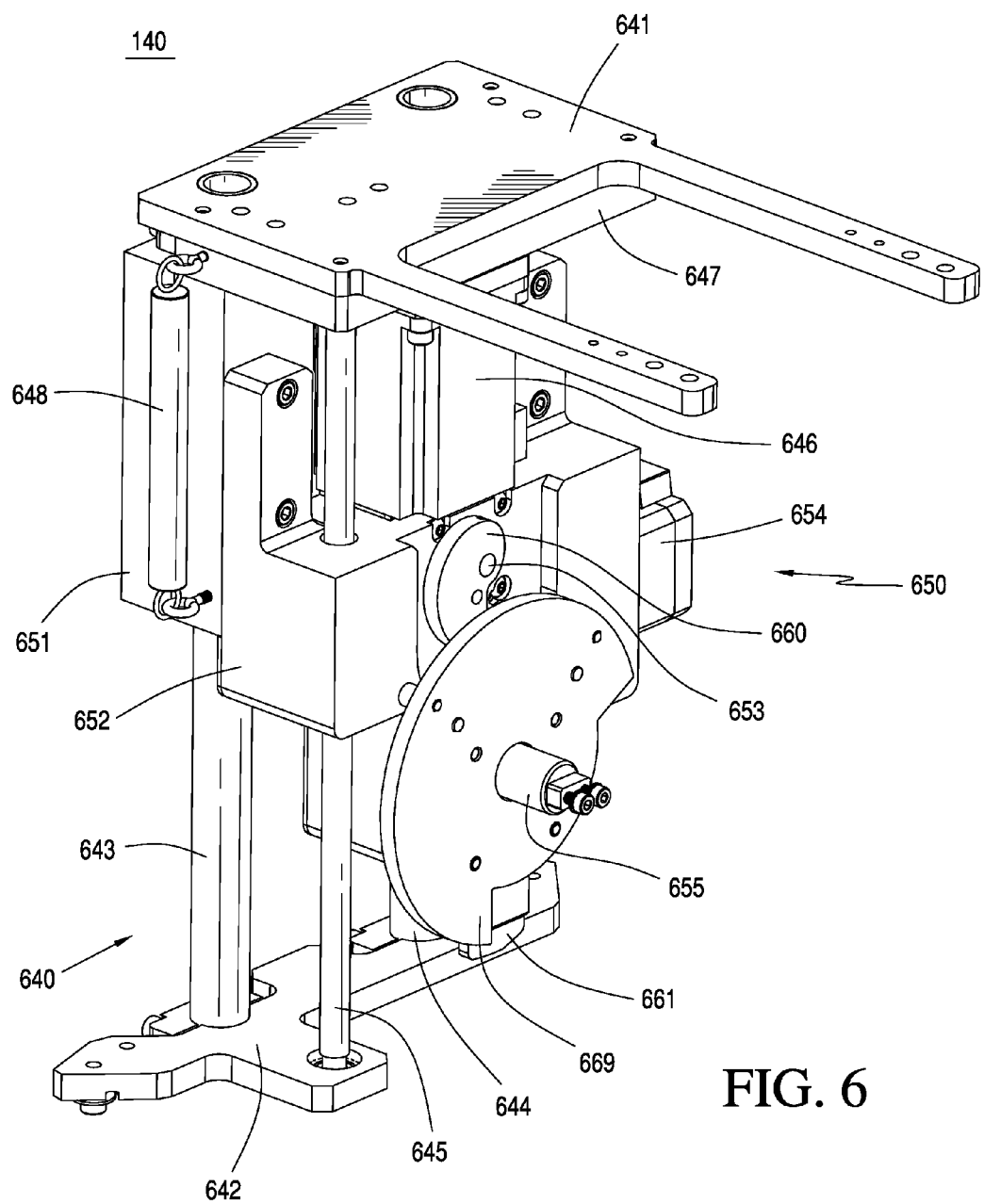
FIG. 6 illustrates a top, front, left side perspective view of a carriage assembly, showing a stationary cam, and covers of a top base, a guide assembly, and a gear housing, according to the embodiment of FIG. 1.
Figure 7:
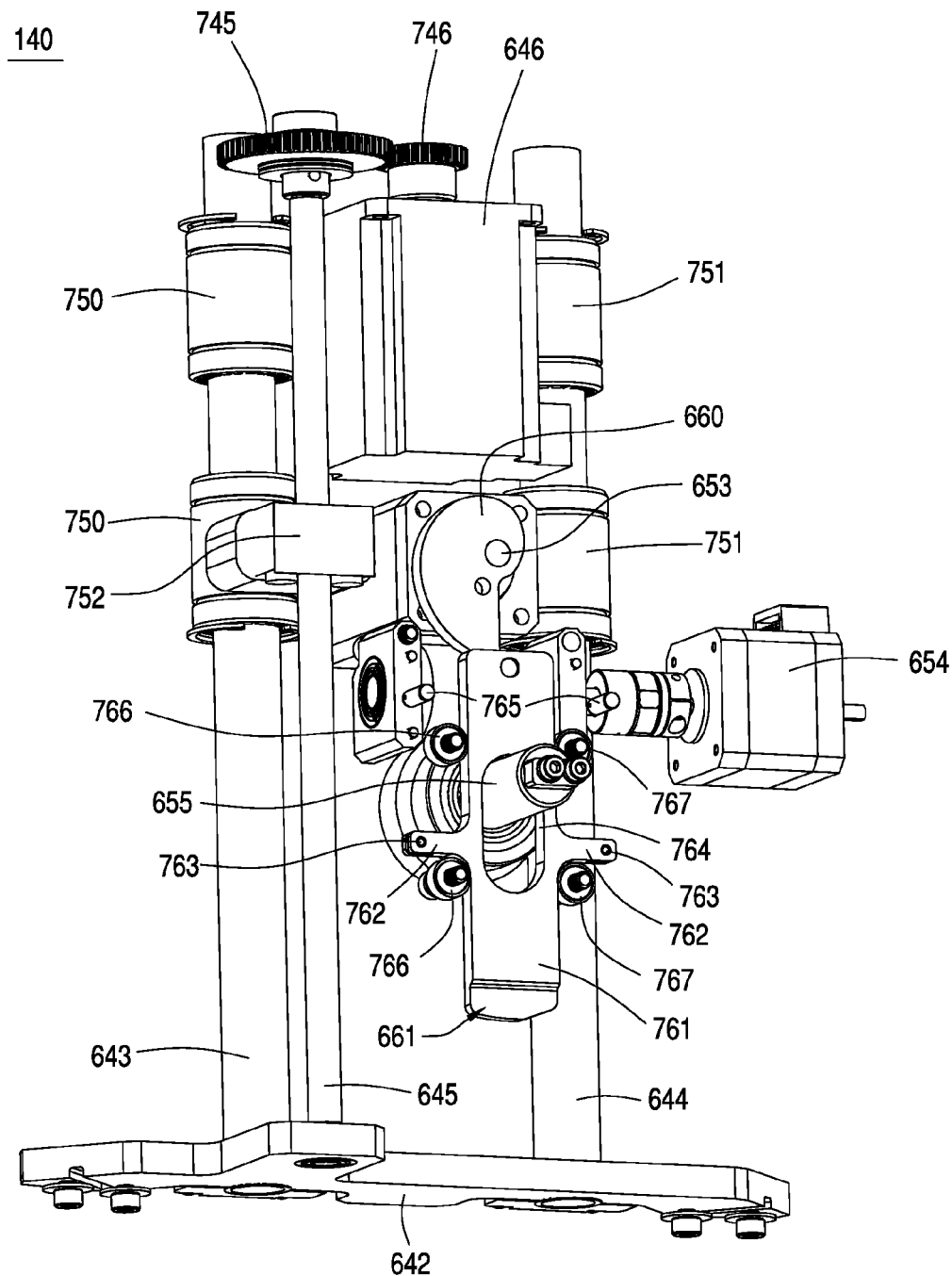
FIG. 7 illustrates a bottom, front, left side perspective view of various internal components of the carriage assembly of FIG. 6, and not showing the stationary cam and the covers of the top base, the guide assembly, and the gear housing of FIG. 6.
Figure 8:
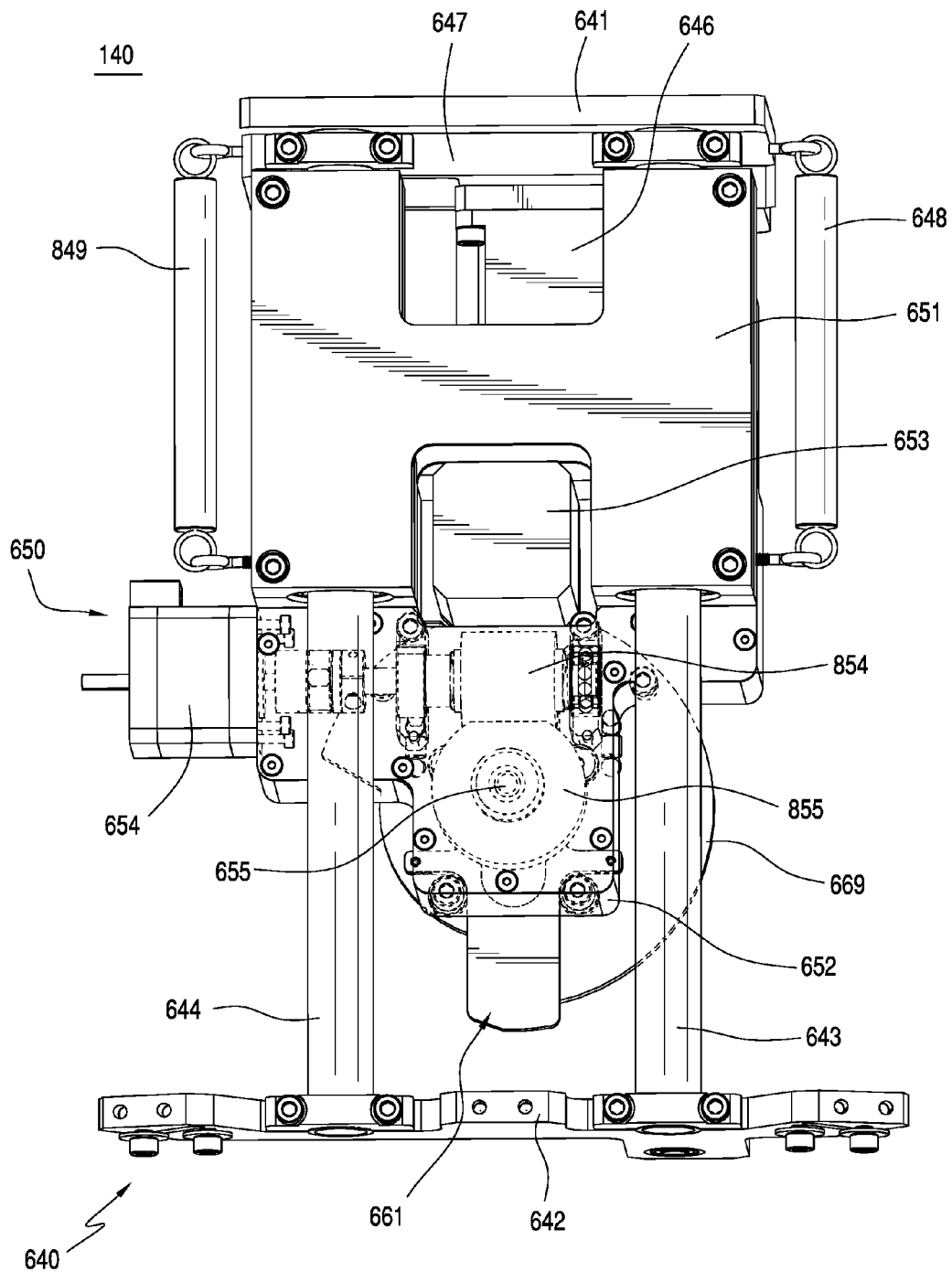
FIG. 8 illustrates a rear view of the carriage assembly of FIG. 6, showing the stationary cam and the covers of the top base, the guide assembly, and the gear housing of FIG. 6, and showing various internal components in the gear housing.

Turning ahead in the drawings, FIG. 6 illustrates a top, front, left side perspective view of carriage assembly 140, showing a stationary cam 669, and covers of a top base 641, a guide assembly 651, and a gear housing 652. FIG. 7 illustrates a bottom, front, left side perspective view of various internal components of carriage assembly 140, and not showing stationary cam 669 and the covers of top base 641, guide assembly 651, and gear housing 652. FIG. 8 illustrates a rear view of carriage assembly 140, showing stationary cam 669 and the covers of top base 641, guide assembly 651, and gear housing 652, and showing various internal components in gear housing 652. Carriage assembly 140 is merely exemplary, and embodiments of the carriage assembly are not limited to embodiments presented herein. The carriage assembly can be employed in many different embodiments or examples not specifically depicted or described herein. In many embodiments, carriage assembly 140 can include a carriage support assembly 640 and a carriage 650. In many embodiments, carriage 650 can be vertically adjustable with respect to carriage support assembly 640.

In a number of embodiments, carriage support assembly 640 can include top base 641 and/or a bottom base 642. In several embodiments, carriage support assembly 640 can include a left guide pole 643 and/or a right guide pole 644, which can each extend from top base 641 to bottom base 642. In some embodiments carriage support assembly can include a vertical adjustment shaft 645. In many embodiments, vertical adjustment shaft 645 can extend from top base 641 to bottom base 642, and can rotate with respect to top base 641 and bottom base 642. In a number of embodiments, vertical adjustment shaft 645 can be a threaded shaft, such as a lead screw. In a number of embodiments, top base 641 can include a gear enclosure 647. In various embodiments, carriage support assembly 640 can include a motor 646. Motor 646 can be a stepper motor or another suitable motor. In a number of embodiments, motor 646 can control the rotation of vertical adjustment shaft 645. For example, as shown in FIG. 7, which shows the components within gear enclosure 647 (FIGS. 6, 8) and which does not show the cover of gear enclosure 647 itself, motor 646 can be coupled to a gear 746 inside first gear enclosure 647, and vertical adjustment shaft 645 can be coupled to a gear 745 inside gear enclosure 647 (FIGS. 6, 8). Gear 745 can be positioned to engage with gear 746 within gear enclosure 647 (FIGS. 6, 8). By rotating vertical adjustment shaft 645, motor 646 can control the vertical position of carriage 650.

In several embodiments, carriage 650 can include guide assembly 651. As shown in FIG. 7, which shows the components within guide assembly 651 and which does not show the cover of guide assembly 651 itself, guide assembly 651 can include left linear bearings 750 and/or right linear bearings 751. In various embodiments, left linear bearings 750 can be guide the vertical motion of carriage 650 along left guide pole 643, and/or right linear bearings 751 can guide the vertical motion of carriage 650 along right guide pole 644. In several embodiments, carriage assembly 140 can include one or more springs, such as spring 648 and spring 849, which can extend from carriage 650 to top base 641 of carriage support assembly 640. Spring 648 and spring 849 can be extension springs, which can beneficially support carriage 650 to decrease the force required to vertically lift carriage 650 with respect to carriage support assembly 640.

In many embodiments, carriage 650 can include gear housing 652. As shown in FIG. 7, which shows the components inside gear housing 652 and which does not show the cover of gear housing 652 itself, carriage 650 can include a carriage position piece 752, which can be attached to vertical adjustment shaft 645 and can be configured to vertically adjust the position of the carriage upon rotational movement of vertical adjustment shaft 645. In several embodiments, carriage position piece 752 can be a lead screw nut that has a threading corresponding to vertical adjustment shaft 645.

In a number of embodiments, carriage 650 can include a rotational shaft 655. Rotational shaft 655 can be configured to couple to picking apparatus 110 (FIGS. 1-3). For example, rotational shaft 655 can attach to attachment mechanism 321 (FIG. 3). In many embodiments, carriage 650 can include a motor 654. Motor 654 can be a stepper motor or another suitable motor. In several embodiments, motor 654 can control the rotation of a rotational shaft 655 and/or picking apparatus 110. For example, motor 654 can be configured to control the rotational positioning of the grippers (e.g., 312-315 (FIG. 3)) on picking apparatus 110 (FIGS. 1-3). As shown in FIG. 8, which shows various internal components within gear housing 652 (FIG. 6), motor 654 can be coupled to a gear 854 inside gear housing 652 (FIG. 6), and rotational shaft 655 can be coupled to a gear 855 inside gear housing 652 (FIG. 6). Gear 854 can be positioned to engage with gear 855 within gear housing 652 (FIG. 6). For example, gear 854 can be a worm, and gear 855 can be a corresponding worm gear. By rotating rotational shaft 655, motor 654 can control the rotational position of picking apparatus 110 (FIGS. 1-3).

Figure 10:
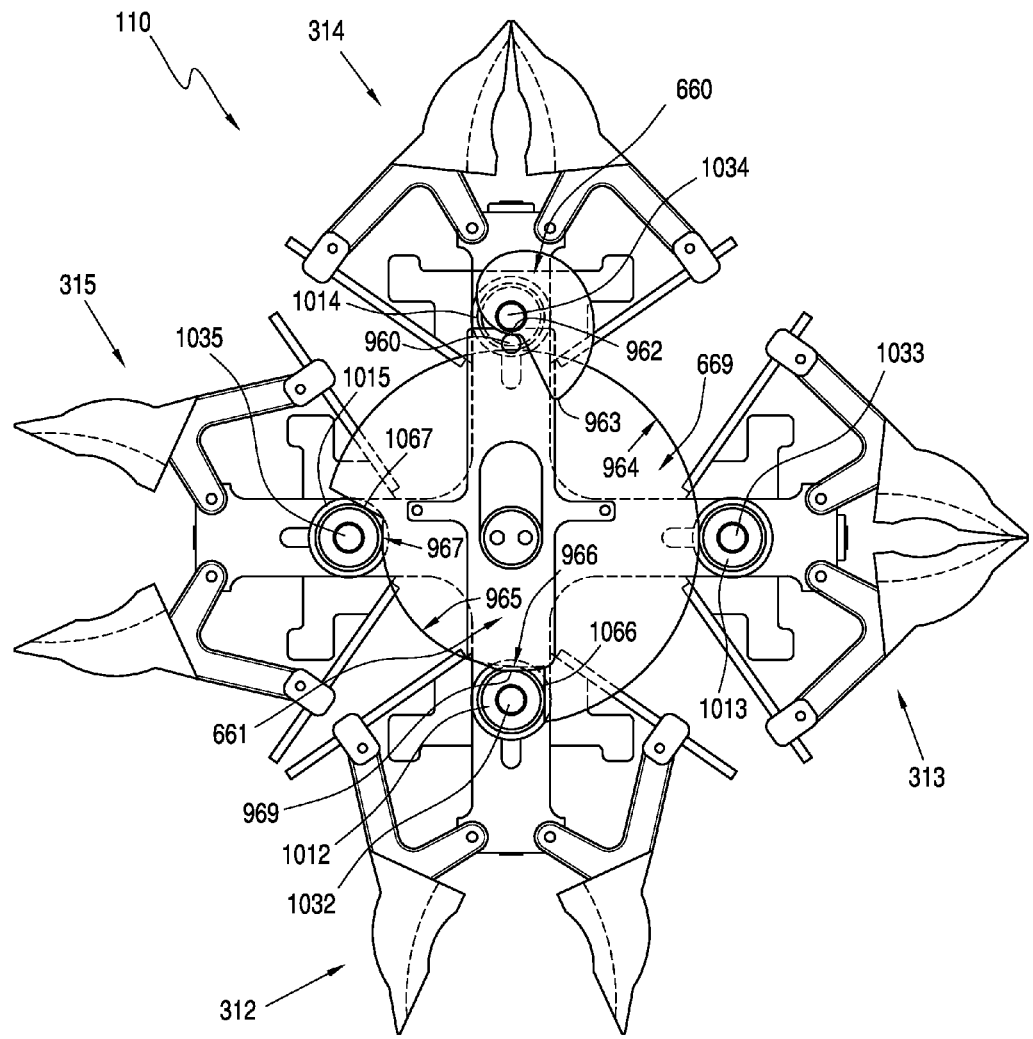
FIG. 10 illustrates a rear view of the actuation cam, actuator, and stationary cam of FIG. 9, and the picking apparatus of FIG. 3 with a gripper in the picking position being in the open position.
Figure 11:
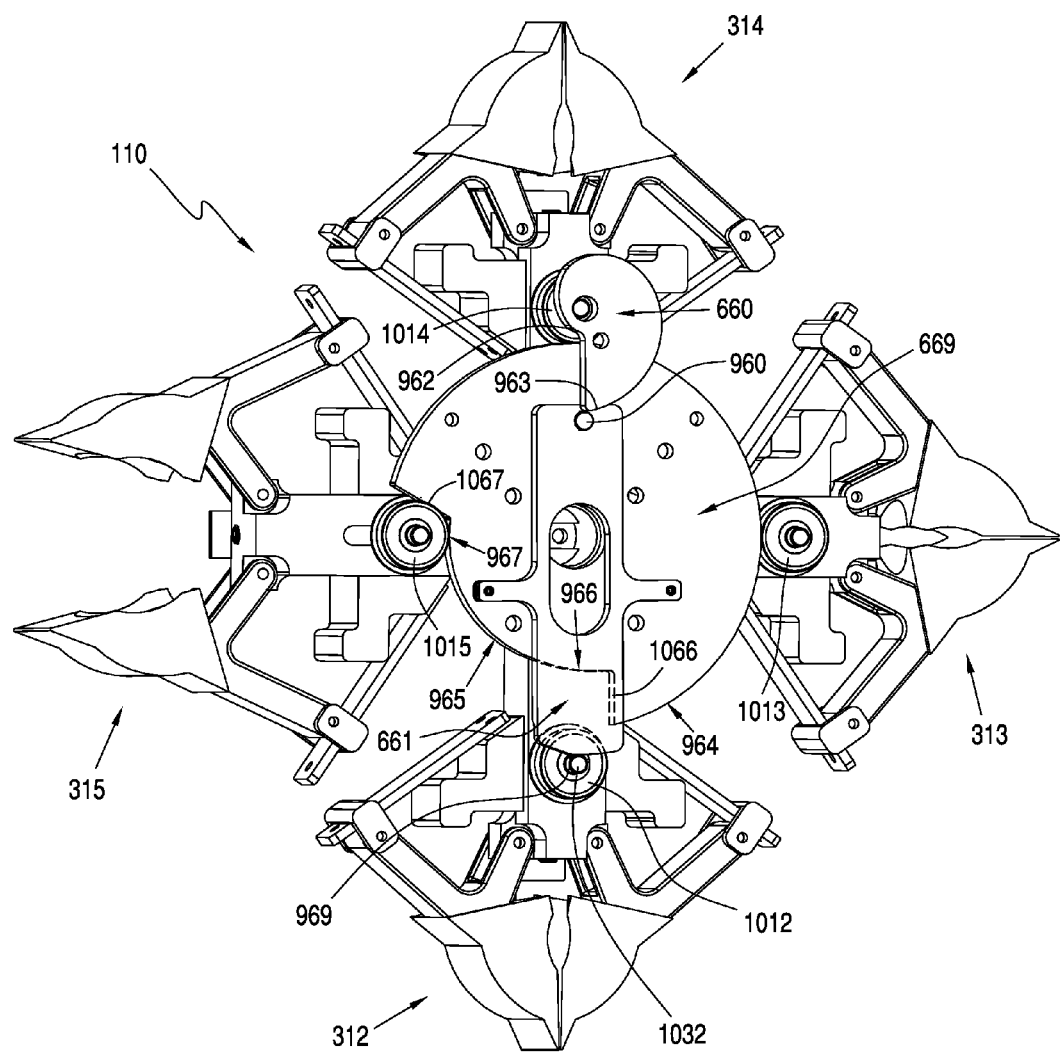
FIG. 11 illustrates a rear, right side perspective view of the actuation cam, actuator, and stationary cam of FIG. 9, and the picking apparatus of FIG. 3 with the gripper of FIG. 10 in the picking position being in the closed position.

In several embodiments, carriage 650 can include stationary cam 669 (FIGS. 6, 8, not shown in FIG. 7). In a number of embodiments, rotational shaft 655 can pass through a central region of stationary cam 669. In many embodiments, stationary cam 669 can facilitate controlling the adjustment position (e.g., open position, closed position) of the grippers (e.g., 312-315 (FIG. 3)) on picking apparatus 110 (FIGS. 1-3) as the grippers (e.g., 312-315 (FIG. 3)) rotate around central axis 311 (FIG. 3), as shown in FIGS. 10-11 and described below in greater detail.

In some embodiments, carriage 650 can include an actuation cam 660. Actuation cam 660 can be configured to facilitate controlling the adjustment position (e.g., open position, closed position) of the grippers (e.g., 312-315 (FIG. 3)) on picking apparatus 110 (FIGS. 1-3) as each of the grippers (e.g., 312-315 (FIG. 3)) are positioned above and utilized to pick a crop, as shown in FIGS. 10-11 and described below in greater detail. In many embodiments, actuation cam 660 can be a snail drop cam. In various embodiments, carriage 650 can include a motor 653. Motor 653 can be a stepper motor or another suitable motor. In many embodiments, motor 653 can be coupled to and/or can control the rotation of actuation cam 660

In some embodiments, carriage 650 can include an actuator 661. As shown in FIG. 7, which shows components of carriage 650 (FIGS. 6, 8) with stationary cam 669 (FIGS. 6, 8) removed, actuator can include a drive portion 761, which can fit vertically between left actuator bearings 766 and right actuator bearings 767 on carriage 650 (FIGS. 6, 8), and can adjust vertically to transfer the control position of actuation cam 660 to the gripper (e.g., 312-315 (FIG. 3)), which can adjust the adjustment position (e.g., open position, closed position) of the gripper (e.g., 312-315 (FIG. 3)), as shown in FIGS. 10-11 and described below in greater detail. In various embodiments, drive portion 761 can include a sliding slot 764, which can allow actuator 661 to surround rotational shaft 655, and which can allow vertical movement of actuator 661 with respect to rotational shaft 655. In a number of embodiments, actuator 661 can include guide portions 762, which can each fit horizontally between left actuator bearings 766 and right actuator bearings 767, respectively. For example, guide portions 762 can guide the vertical adjustment of actuator 661 between, and prevent the vertical movement beyond, the top bearings and bottom bearings of left bearings 766 and/or right bearings 767. In certain embodiments guide portions 762 can include attachment pieces 763, which can attach actuator 661 to attachment bases 765 on gear housing 652 (FIGS. 6, 8) of carriage 650 (FIGS. 6, 8) via springs (e.g., extension springs) or other suitable elastic components, in order to bias actuator 661 in a vertically upward position to engage with actuation cam 660.

Figure 9:
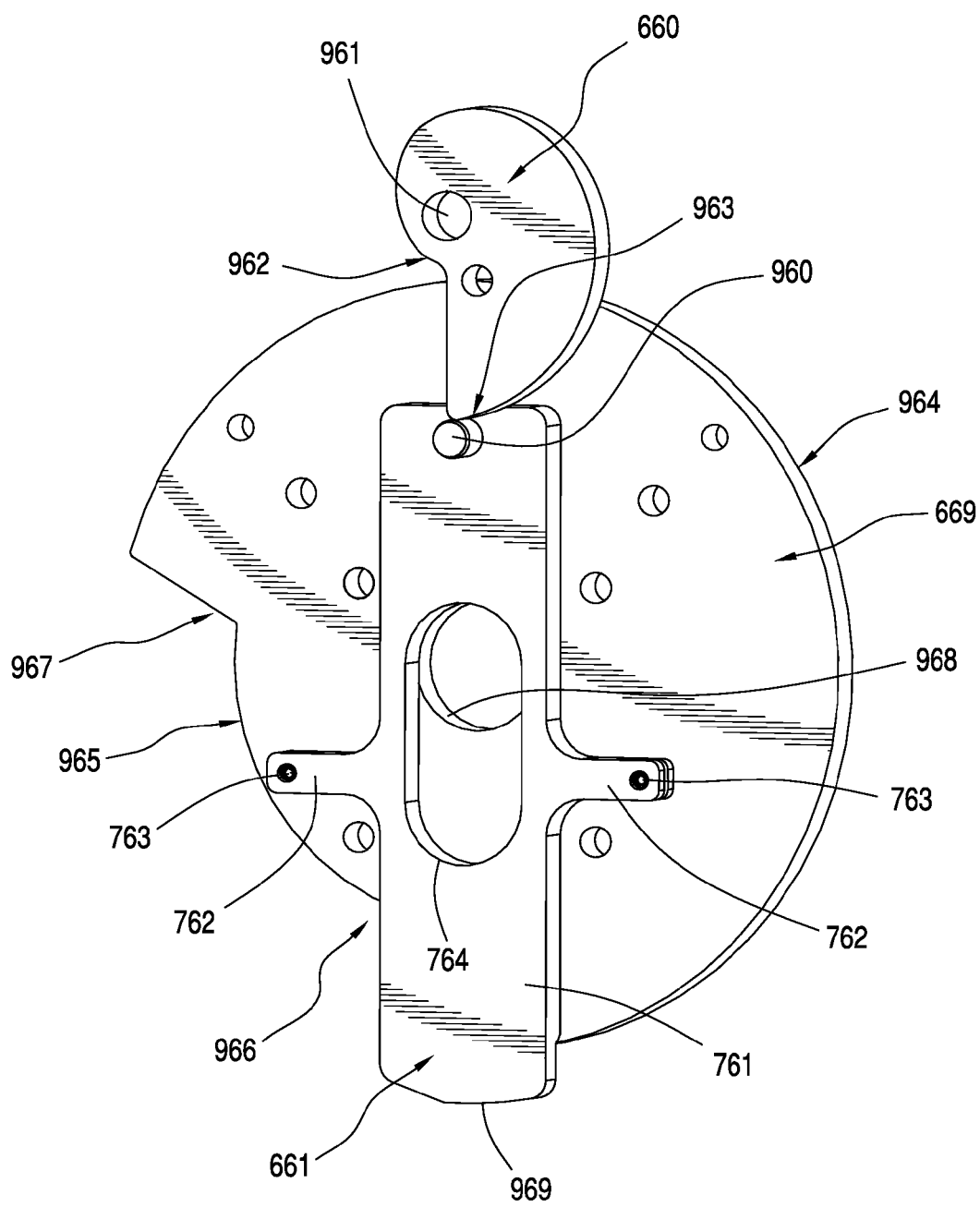
FIG. 9 illustrates a top, rear, left side perspective view of an actuation cam, an actuator, and a stationary cam of the carriage assembly of FIG. 6.

Turning ahead in the drawings, FIG. 9 illustrates a top, rear, left side perspective view of actuation cam 660, actuator 661, and stationary cam 669. Actuation cam 660, actuator 661, and stationary cam 669 are merely exemplary, and embodiments of the actuation cam, actuator, and stationary cam are not limited to embodiments presented herein. The actuation cam, actuator, and stationary cam can be employed in many different embodiments or examples not specifically depicted or described herein. In many embodiments, actuator 661 can include a cam interface piece 960, which can follow the shape of actuation cam 660 to adjust the position of actuator 661. In several embodiments, actuation cam 660 can be attached to motor 653 (FIGS. 6-8) at rotation point 961, and actuation cam 660 can rotate around rotation point 961. In many embodiments, actuation cam 660 can rotate in a counter-clockwise direction, as viewed from the rear perspective shown FIG. 9. As actuation cam 660 rotates, cam interface piece 960 can move along actuation cam 660 from a base point 962 of actuation cam 660 to a peak point 963 of actuation cam 660, which can push actuator 661 vertically downward. As actuation cam 660 rotates further, cam interface piece 960 can drop back from peak point 963 to base point 962.

In several embodiments, actuator 661 can include a gripper interface portion 969, which can interface with a gripper (e.g., 312-315 (FIG. 3)) on picking apparatus 110 (FIGS. 1-3) to adjust the adjustment position of the gripper (e.g., 312-315 (FIG. 3)) between the open position (as shown in FIG. 4) and the closed position (as shown in FIG. 5). The gradual, continuous increase of actuation cam 660 can beneficially allow motor 653 (FIGS. 6-8) to precisely control the vertical position of actuator 661, which can advantageously allow motor 653 to precisely control the adjustment position of the gripper (e.g., 312-315 (FIG. 3)) on picking apparatus 110 (FIGS. 1-3). For example, motor 653, actuation cam 660, and actuator 661 can be used to precisely adjust the position of first tip 413 (FIGS. 4-5) of first claw piece 410 (FIGS. 4-5) and second tip 423 (FIGS. 4-5) of second claw piece 420 (FIGS. 4-5) in order to fit around an individual crop to be picked, and to separate and/or isolate the individual crop to be picked from the other nearby crops without damaging the nearby crops.

In a number of embodiments, stationary cam 669 can include a circular slot 968, which can be configured to surround rotational shaft 655 (FIGS. 6-7). In several embodiments, stationary cam 669 can have a fixed position with respect to carriage 650 (FIGS. 6, 8), and the grippers (e.g., 312-315 (FIG. 3)) on picking apparatus 110 (FIGS. 1-3) can rotate around stationary cam 669. In many embodiments, the rotational path of stationary cam 669 can include a first portion 964. Stationary cam 669 can be configured to hold the grippers (e.g., 312-315 (FIG. 3)) on picking apparatus 110 (FIGS. 1-3) in a closed position (as shown in FIG. 5) along first portion 964 of the rotational path. In several embodiments, the rotational path of stationary cam 669 can include a second portion 965. In a number of embodiments, second portion 965 of the rotational path can include a release position 967 and a picking position 966. Stationary cam 669 can be configured to allow the grippers (e.g., 312-315 (FIG. 3)) on picking apparatus 110 (FIGS. 1-3) to open to the open position (as shown in FIG. 4) along second portion 965 of the rotational path from release position 967 to picking position 966.

Turning ahead in the drawings, FIG. 10 illustrates a rear view of actuation cam 660, actuator 661, stationary cam 669, and picking apparatus 110 with gripper 312 in picking position 966 being in the open position. FIG. 11 illustrates a rear, right side perspective view of actuation cam 660, actuator 661, stationary cam 669, and picking apparatus 110 with gripper 312 in picking position 966 being in the closed position. In a number of embodiments, gripper 312 can include a displacement pin 1032 and/or a bearing 1012. In a number of embodiments, displacement pin 1032 can be identical to or attached to pin 431 (FIGS. 4-5). In many embodiments, displacement pin 1032 can be coupled to displacement block 430 (FIGS. 4-5), such that adjusting displacement pin 1032 can adjust displacement block 430. In many embodiments, bearing 1012 can be centered on displacement pin 1032, and can rotate along the rotational path of stationary cam 669. Similarly, gripper 313 can include a displacement pin 1033 and/or a bearing 1013; gripper 314 can include a displacement pin 1034 and/or a bearing 1014; and/or gripper 315 can include a displacement pin 1035 and/or a bearing 1015. Displacement pin 1033, displacement pin 1034, and/or displacement pin 1035 can be similar or identical to displacement pin 1032. Bearing 1013, bearing 1014, and/or bearing 1015 can be similar or identical to bearing 1012.

In many embodiments, motor 654 (FIGS. 6-8) can rotate picking apparatus 110 in a counter-clockwise direction, as viewed from the rear perspective shown in FIGS. 10-11. Gripper 312 can be rotated to picking position 966 of second portion 965 of the rotational path of the grippers (e.g., 312-315 (FIG. 3)) along stationary cam 669. In many embodiments, stationary cam 669 can include a stopping edge 1066, which can stop bearing 1012 in the rotation of picking apparatus 110 to stop gripper 312 at picking position 966. In many embodiments, when gripper 312 is in picking position 966, gripper 312 can be facing downward to allow gripper 312 to pick a crop from a growing bed. When gripper 312 is rotated to picking position 966, actuation cam 660 can be rotated such that cam interface piece 960 of actuator 661 can be at base point 962 of actuation cam 660 and actuator 661 is adjusted upwards (e.g., retracted) with respect to stationary cam 669. When actuator 661 is in the retracted position, as shown in FIG. 10, gripper interface portion 969 of actuator 661 can be at or proximate to second portion 965 of stationary cam 669, such that gripper 312 can remain in the open position.

In several embodiments, as gripper 312 rotates toward picking position 966, gripper 315 can rotate along the rotational path of stationary cam 669 from first portion 964 to second portion 965 at release position 967. In many embodiments, stationary cam 669 can include a release edge 1067, which can allow gripper 315 to gradually open from the closed position (as shown in FIG. 5) to the open position (as shown in FIG. 4) at release position 967. When gripper 315 is rotated to release position 967 and opens to the open position, gripper 315 can release a crop that it is holding, such as in a collection device. When gripper 312 is at picking position 966 and gripper 315 is at release position 967, grippers 313 and 314 can be positioned along first portion 964 of the rotational path of stationary cam 669, which can hold grippers 313 and 314 in the closed position, as shown in FIG. 10. For example, grippers 313 and 314 can each be holding a crop.

In many embodiments, at picking position 966 and in the open position, as shown in FIG. 10, gripper 312 can be ready to pick a crop from a plant. In several embodiments, carrier 170 (FIG. 1) can move carriage support assembly 140 such that gripper 312 is positioned over the crop to be picked. Motor 653 (FIGS. 6-8) can rotate actuation cam 660 to engage gripper interface portion 969 of actuator 661 with displacement pin 1032 of gripper 312 to adjust the position of first claw piece 410 (FIGS. 4-5) and second claw piece 420 (FIGS. 4-5) of gripper 312 in order to fit around the individual crop to be picked. For example, if the crop is a larger, such as a large-sized strawberry, gripper 312 can be set to a wider opening in the open position, and if the crop is smaller, such as a small-sized strawberry, gripper 312 can be set to a narrow opening in the open position, which can allow gripper 312 to separate and/or isolate the individual crop to be picked from the other nearby crops without damaging the nearby crops.

When gripper 312 is adjusted to the appropriate opening width for the crop to be picked, carriage support assembly 140 can lower carriage 150 such that first claw piece 410 (FIGS. 4-5) and second claw piece 420 (FIGS. 4-5) of gripper 312 can surround the crop to be picked. Motor 653 (FIGS. 6-8) can rotate actuation cam 660 such that cam interface piece 960 can move along actuation cam 660 to peak point 963, which can push extend actuator 661 to an extended position, as shown in FIG. 11. As actuator 661 is extended, gripper interface portion 969 of actuator 661 can push displacement pin 1032 to adjust the position of gripper 312 to the closed position (as shown in FIG. 11). When gripper 312 is in the closed position, bearing 1012 of gripper 312 can be extended beyond stopping edge 1066 of stationary cam 669, such that gripper 312 can be rotated along first portion 964 of the rotational path of stationary cam 669. In many embodiments, gripper 312 can securely hold the picked crop as gripper 312 rotates along first portion 964. After gripper 312 picks the crop, motor 654 (FIGS. 6-8) can rotate picking apparatus 110 such that gripper 315 is rotated to picking position 966. Although picking apparatus 110 is shown with 4 grippers (e.g., 312-315), picking apparatus 110 can include fewer or additional grippers, and first portion 964 and second portion 965 of the rotational path of stationary cam 669 can be adjusted accordingly.

Figure 12:
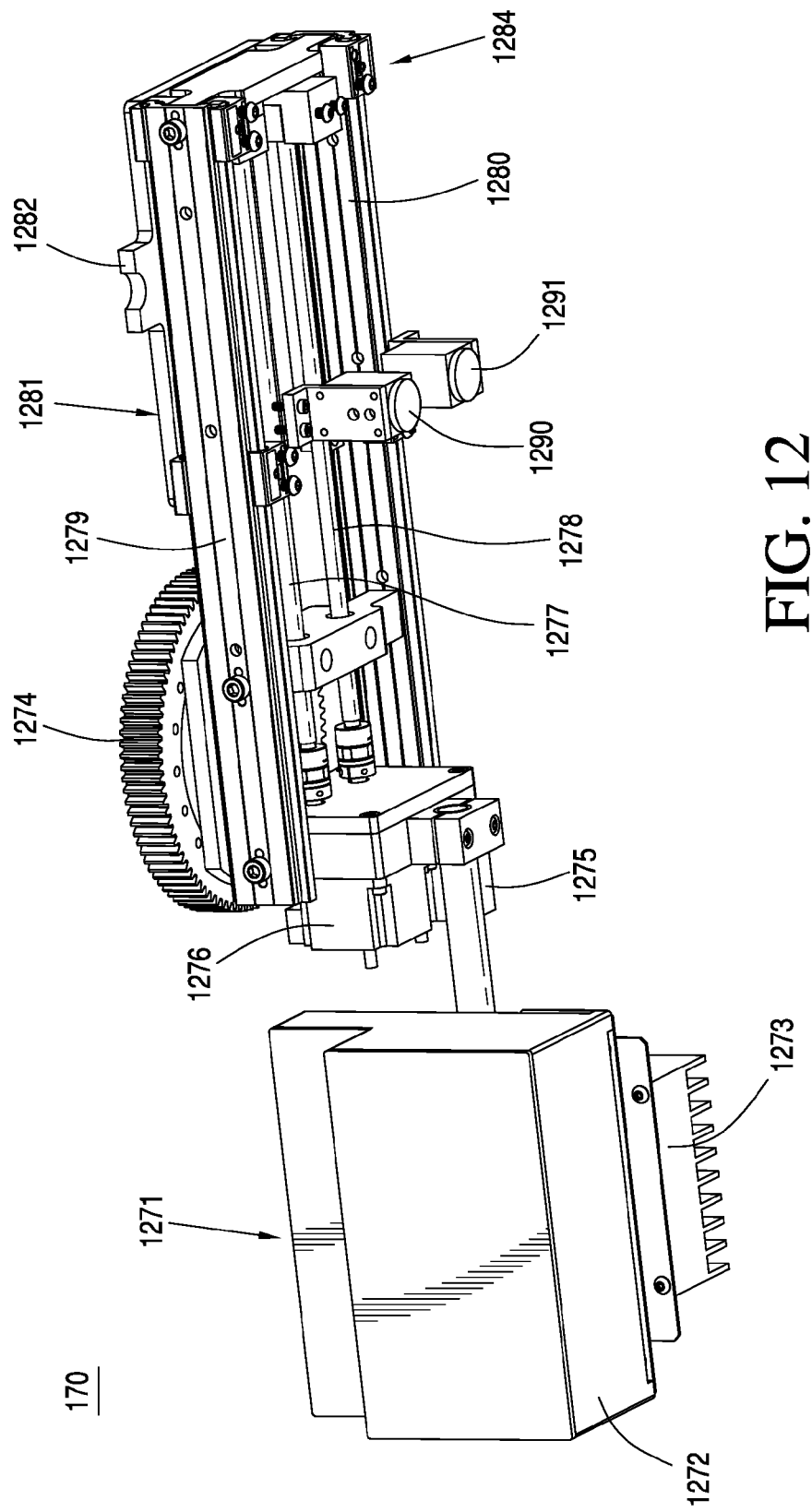
FIG. 12 illustrates a bottom, rear, right side perspective view of a carrier assembly, according to the embodiment of FIG. 1.
Figure 13:
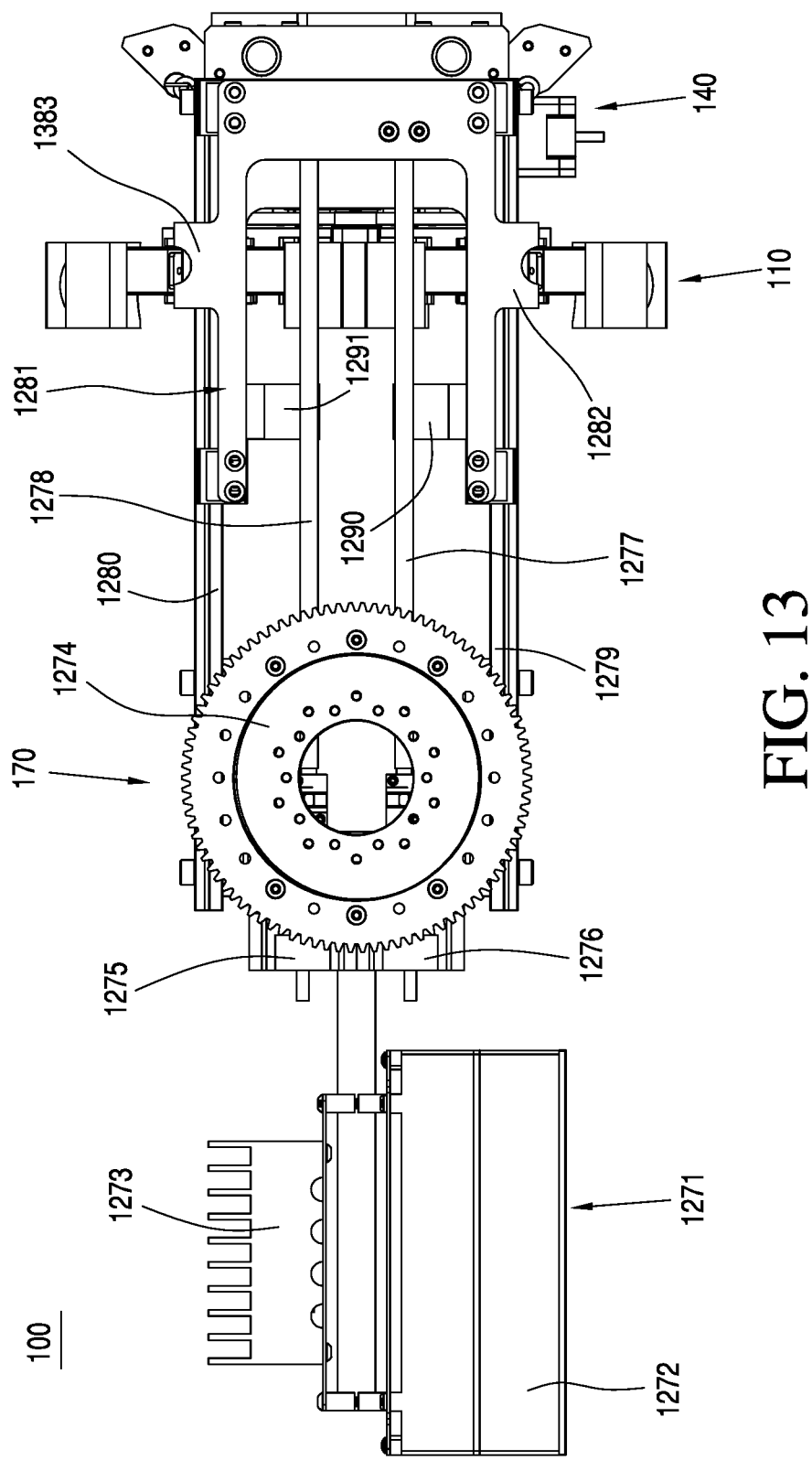
FIG. 13 illustrates a top view of the harvesting robot of FIG. 1, showing the carrier assembly of FIG. 12 coupled to the carriage assembly of FIG. 6 and the picking apparatus of FIG. 3.

Turning ahead in the drawings, FIG. 12 illustrates a bottom, rear, right side perspective view of carrier assembly 170. FIG. 13 illustrates a top view of harvesting robot 100, showing carrier assembly 170 coupled to carriage assembly 140 (FIGS. 1-2, 6-8) and picking apparatus 110. Carrier assembly 170 is merely exemplary, and embodiments of the carrier assembly are not limited to embodiments presented herein. The carrier assembly can be employed in many different embodiments or examples not specifically depicted or described herein. In several embodiments, carrier assembly 170 can include a mounting bearing 1274. In many embodiments, carrier assembly 170 and/or harvesting robot 100 can be mounted above a plant to be harvested at mounting bearing 1274. In a number of embodiments, mounting bearing 1274 can be a geared slewing bearing, which can be used to rotate carrier assembly 170 and/or harvesting robot 100 with respect to the plant. For example, harvesting robot 100 can rotate in a clockwise and/or counterclockwise direction, as viewed from the top perspective shown FIG. 13, around mounting bearing 1274.

In many embodiments, carrier assembly 170 can include an carriage attachment base 1284, which can be configured to couple to top base 641 (FIGS. 6, 8) in order to couple carriage assembly 140 to carrier assembly 170 and to move carriage assembly 140 with respect carrier assembly 170. In a number of embodiments, carrier assembly 170 can include a motor 1275. Motor 1275 can be a stepper motor or another suitable motor. In several embodiments, motor 1275 can control the rotation of an adjustment shaft 1278 to adjust the position of carriage attachment base 1284 and/or carriage assembly 140 with respect to mounting bearing 1274. In a number of embodiments, adjustment shaft 1278 can be a threaded shaft, such as a lead screw.

Figure 14:
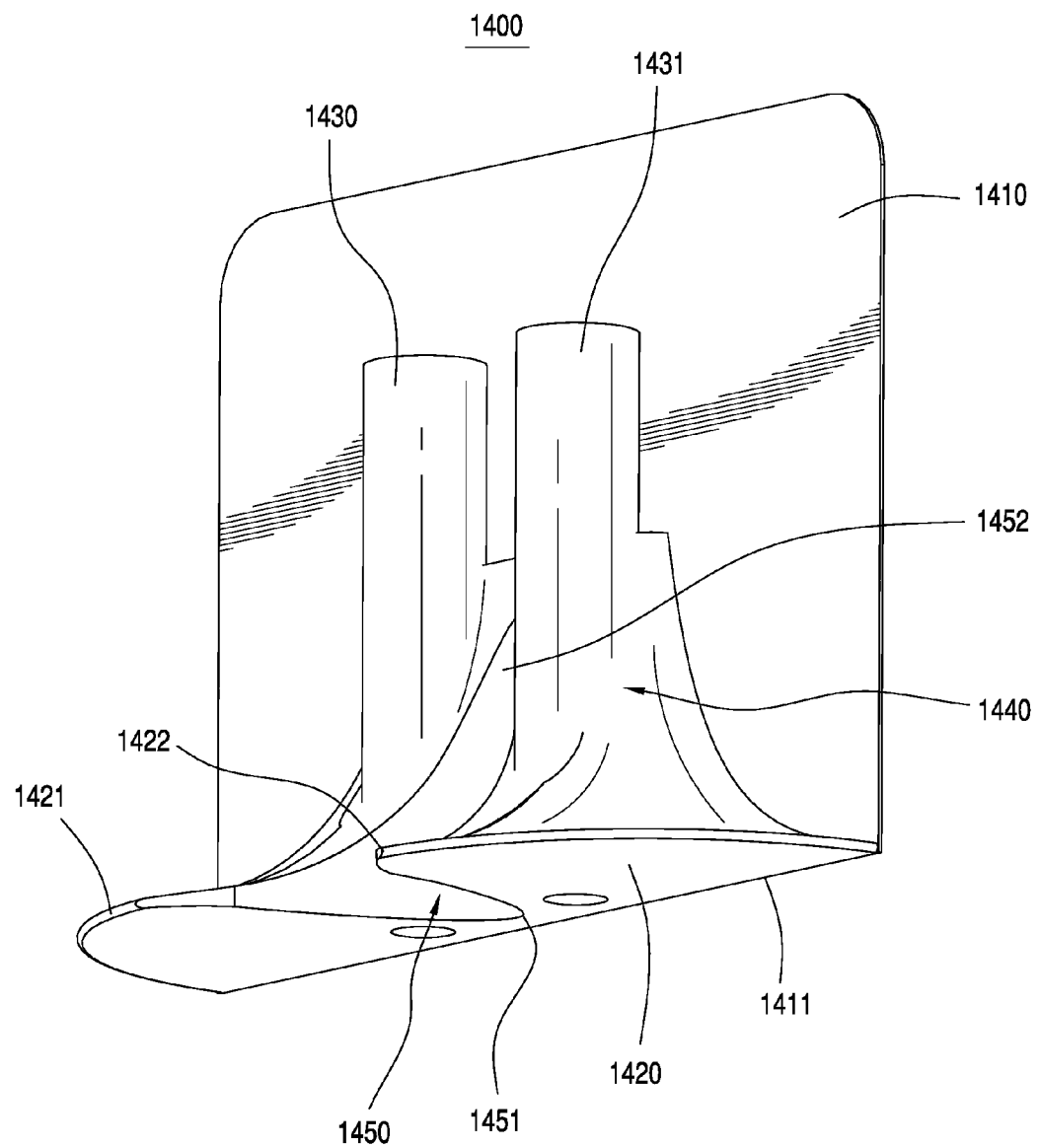
FIG. 14 illustrates a bottom, front, right side perspective view of a foliage displacement mechanism, according to another embodiment.

In some embodiments, carrier assembly 170 can include a foliage displacement base 1281, which can be coupled to a foliage displacement mechanism 1400, as shown in FIG. 14 and described below. In a number of embodiments, foliage displacement mechanism 1400 (FIG. 14) can be attached to foliage displacement base 1281 at attachment portions 1282 and 1383. In many embodiments, carrier assembly 170 can include a motor 1276. Motor 1276 can be a stepper motor or another suitable motor. In various embodiments, motor 1276 can control the rotation of an adjustment shaft 1277 to adjust the position of foliage displacement base 1281 with respect to mounting bearing 1274. In a number of embodiments, adjustment shaft 1277 can be a threaded shaft, such as a lead screw.

In several embodiments, carrier assembly 170 can include rails 1279 and 1280, which can allow carriage attachment base 1284 and/or foliage displacement base 1281 to adjustably slide radially inward and outward with respect to mounting bearing 1274. In many embodiments, carrier assembly 170 can include one or more imaging sensors 1290 and/or 1291. Imaging sensors 1290 and/or 1291 can be cameras configured to detect optical image information. In a number of embodiments, carrier assembly 1270 can include an electronics unit 1271. In some embodiments, electronics unit 1271 can include a control unit 1272 and/or a processing unit 1273. In a number of embodiments, processing unit 1273 can include one or more processors configured to receive information from imaging sensors 1290 and/or 1291 to determine the location of the crops to be harvested. For example, processing unit can be configured to determine that certain crops are ripe and ready to be harvested, and other crops are not yet ripe or are damaged, and should not be harvested. In various embodiments, control unit 1272 can be electrically coupled to processing unit 1273 and/or can include one or more controllers to control the motors in harvesting robot 100, such as motor 646 (FIGS. 6-8), motor 653 (FIGS. 6-8), motor 654 (FIGS. 6-8), motor 1275 (FIGS. 12-13), and/or motor 1276 (FIGS. 12-13).

Turning ahead in the drawings, FIG. 14 illustrates a bottom, front, right side perspective view of a foliage displacement mechanism 1400. Foliage displacement mechanism 1400 is merely exemplary, and embodiments of the foliage displacement mechanism are not limited to embodiments presented herein. The foliage displacement mechanism can be employed in many different embodiments or examples not specifically depicted or described herein. In many embodiments, foliage displacement mechanism 1400 can be configured to move foliage of a plant to expose at least a portion of the crops under the foliage, which can allow imaging sensors 1290 (FIGS. 12-13) and/or 1291 (FIGS. 12-13) to detect the crops and/or allow the grippers (e.g., 312-315 (FIGS. 3, 10-11)) of picking apparatus 110 (FIGS. 1-3) to pick the crops.

Figure 15:
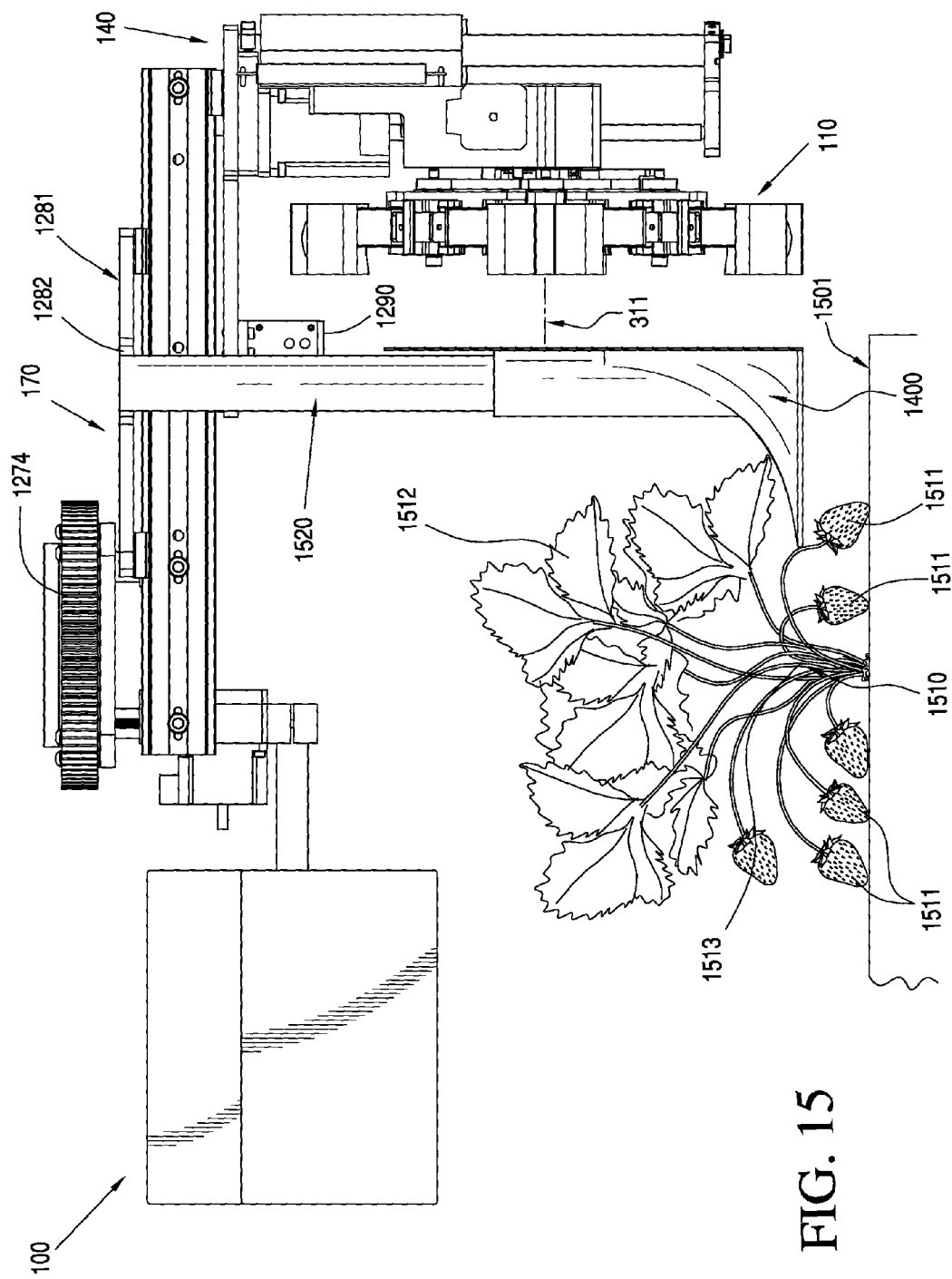
FIG. 15 illustrates a right side view of the harvesting robot of FIG. 1 and the foliage displacement mechanism of FIG. 14 hovering above a plant and a growing bed, with the foliage displacement mechanism in a retracted position.

In several embodiments, foliage displacement mechanism 1400 can include a back surface 1410. In many embodiments, back surface 1410 can have a planar rectangular shape. In a number of embodiments, back surface 1410 can be configured to extend normal to a growing bed of the plant, as shown in FIG. 15 and described below. In several embodiments, foliage displacement mechanism 1400 can include a base 1420. Base 1420 can be configured to extend parallel to the growing bed of the plant from a back edge 1411 at back surface 1410 toward the center of the plant, as shown in FIG. 15 and described below. In a number of embodiments, base 1420 can have a semicircular shape.

In several embodiments, foliage displacement mechanism 1400 can include a surface 1440. Surface 1440 can extend from base 1420 upward to back surface 1410. In a number of embodiments, at least one or more portions of surface 1440 can be curved and/or have a concave shape. In some embodiments, at least one or more portions of surface 1440 can be shaped as at least a portion of an ellipse. In several embodiments, foliage displacement mechanism 1400 can include a channel 1450. In many embodiments, channel 1450 can extend from base 1420 at a bottom channel portion 1451 upwards through surface 1440 to a top channel portion 1452. In some embodiments, base 1420 can extend outward toward the plant from a left side of back surface 1410 to a left front portion 1421 and from a right side of back surface 1410 to a right front portion 1422. In many embodiments, base 1420 can recede back toward back surface 1410 in the center of base 1420 between left front portion 1421 and right front portion 1422 to bottom channel portion 1451.

In a number of embodiments, foliage displacement mechanism 1400 can include attachment mechanisms 1430 and/or 1431. Attachment mechanisms 1430 and 1431 can be configured to attach foliage displacement mechanism 1400 to foliage displacement base 1281 (FIGS. 12-13) at attachment portions 1383 (FIG. 13) and/or 1282 (FIGS. 12-13), respectively. Motor 1276 can be configured to adjust the position of foliage displacement mechanism 1400 to move foliage displacement mechanism 1400 toward or away from the plant. In many embodiments, as foliage displacement mechanism 1400 is moved toward the plant, foliage displacement mechanism 1400 can be positioned such that channel 1450 surrounds the center of the plant. In a number of embodiments, foliage displacement mechanism 1400 can be configured, when moved toward the plant, to move the foliage upward and toward the center of the plant. For example, the curves on surface 1440 can be configured to lift the foliage upwards and towards the center of the plant, which can advantageously prevent damaging and/or tangling the foliage (such as the leaves, vines, and/or blossoms) of the plant.

Turning ahead in the drawings, FIG. 15 illustrates a right side view of harvesting robot 100 and foliage displacement mechanism 1400 hovering above a plant 1510 and growing bed 1501, with foliage displacement mechanism 1400 in a retracted position. To assist with water run-off, growing bed 1501 can be slightly angled. In other examples, growing bed can be flat. Plant 1510 can be a strawberry plant, as shown in FIG. 15. In other examples, plant 1510 can be a tomato plant, a pepper (e.g., bell peppers, chili peppers, etc.) plant, an orange tree, or another suitable plant. As shown in FIG. 15, plant 1510 can have a center 1513 (e.g., a crown of a strawberry plant), and foliage 1512, such as leaves, vines, and/or blossoms, that grow above growing bed 1501. Plant 1510 can have crops 1511 that, when ripe, are located on growing bed 1501. At least some of crops 1511 can be covered by foliage 1512.

In many embodiments, such as shown in FIG. 15, harvesting robot 100 can be mounted and/or supported such that central axis 311 of picking apparatus 110 is parallel to growing bed 1501. In several embodiments, foliage displacement mechanism 1400 can be attached to carrier mechanism 170 at attachment portion 1282 and/or attachment portion 1383 (FIG. 13) on 1281 with one or more attachment poles, such as attachment pole 1520. Carrier mechanism 170 can adjust foliage displacement mechanism 1400 from a retracted position, as shown in FIG. 15, toward plant 1510 to move foliage 1512 upward and toward center 1513 of plant 1510 to expose crops 1511 to be detected by imaging sensor 1290 and/or imaging sensor 1291 (FIGS. 12-13) and/or picked by harvesting robot 100. In many embodiments, center 1513 can fit within channel 1450 (FIG. 14) when foliage displacement mechanism 1400 is moved toward plant 1510.

In several embodiments, mounting bearing 1274 can be centered above plant 1510. When mounting bearing 1274 is centered above plant 1510, mounting bearing 1274 can be configured to rotate harvesting robot 100, carrier assembly 170, carriage assembly 140, picking apparatus 110, and/or foliage displacement mechanism 1400 around plant 1510. When a crop, such as one of crops 1511, is located to be picked, (a) mounting bearing 1274 can rotate carrier assembly 170 such that the gripper (e.g., 312-315 (FIG. 3)) in picking position 966 (FIGS. 9-11) is radially in a line extending from center 1513 of plant 1510 through the crop (e.g., 1511) to be picked, (b) carrier assembly 170 can move carriage assembly 140 radially inward toward plant 1510, and (c) carriage assembly 140 can lower carriage 650 (FIGS. 6, 8) to lower picking apparatus 110 to allow a gripper (e.g., 312-315 (FIG. 3)) to close and pick the crop (e.g., 1511). In some embodiments, the motion of harvesting robot 100 can beneficially conserve motion, and/or can do a minimum amount of movement, such as to harvest an average maximum number of crops (e.g., 1511) from plant 1510 in one rotation. For example, in some embodiments, harvesting robot 100 can be configured to harvest three crops from plant 1510. In other embodiments, harvesting robot 100 can be configured to harvest fewer or additional crops from plant 1510. In a number of embodiments, the picked crops can be deposited in a collection device as harvesting robot 100 moves to another plant.

Figure 16:
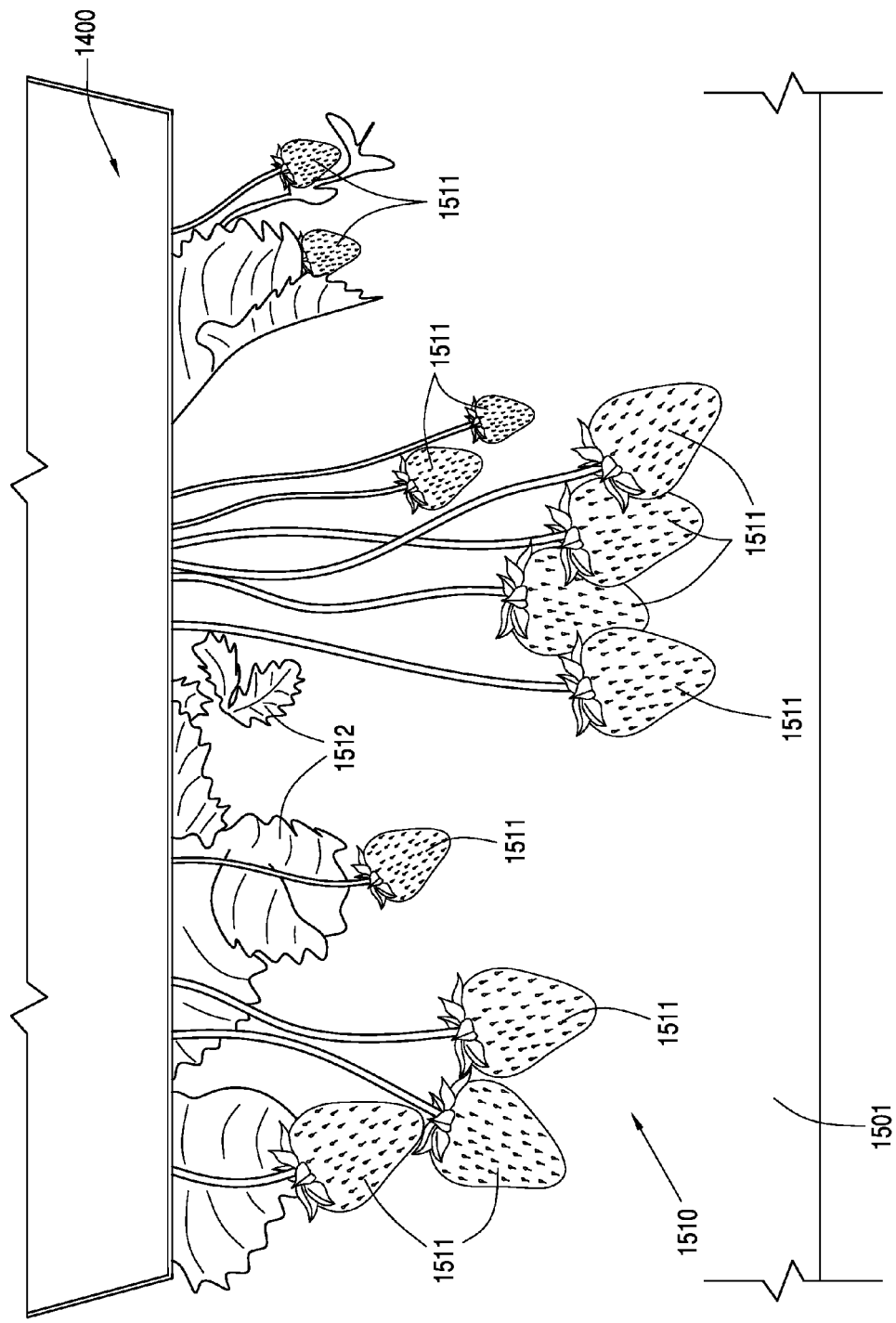
FIG. 16 illustrates a top, rear view of the foliage displacement mechanism of FIG. 14 hovering above the plant of FIG. 15 in an extended position.

Turning ahead in the drawings, FIG. 16 illustrates a top, rear view of foliage displacement mechanism 1400 hovering above plant 1510 in an extended position. In many embodiments, when foliage displacement mechanism 1400 is extended toward plant 1510, moving foliage 1512 (FIG. 15), imaging sensors 1290 and/or 1291 (FIGS. 12-13) can detect crops 1511 on growing bed 1501, and processing unit 1273 (FIGS. 12-13) can determine the crops to be harvested, such as based on ripeness. In many embodiments, harvesting robot 100 (FIGS. 1-2, 13, 15) can rotate around plant 1510 with foliage displacement mechanism 1400 in the extended position, as shown in FIG. 16, in order for processing unit 1273 (FIGS. 12-13) to determine which of the crops (e.g., 1511) are the best crops to be picked.

Figure 17:
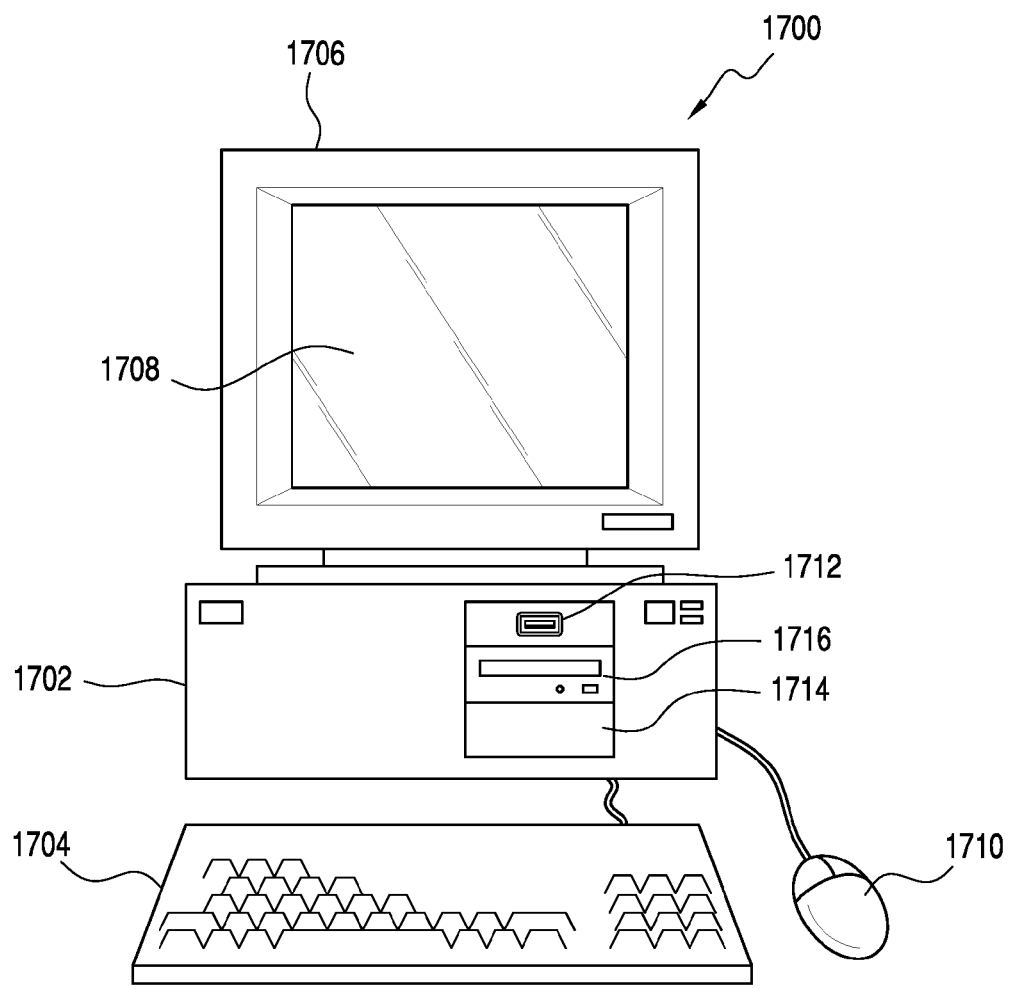
FIG. 17 illustrates a front view of a computer system that is suitable for implementing various embodiments for implementing a processing unit, according to an embodiment of the carrier assembly of FIG. 12.
Figure 18:
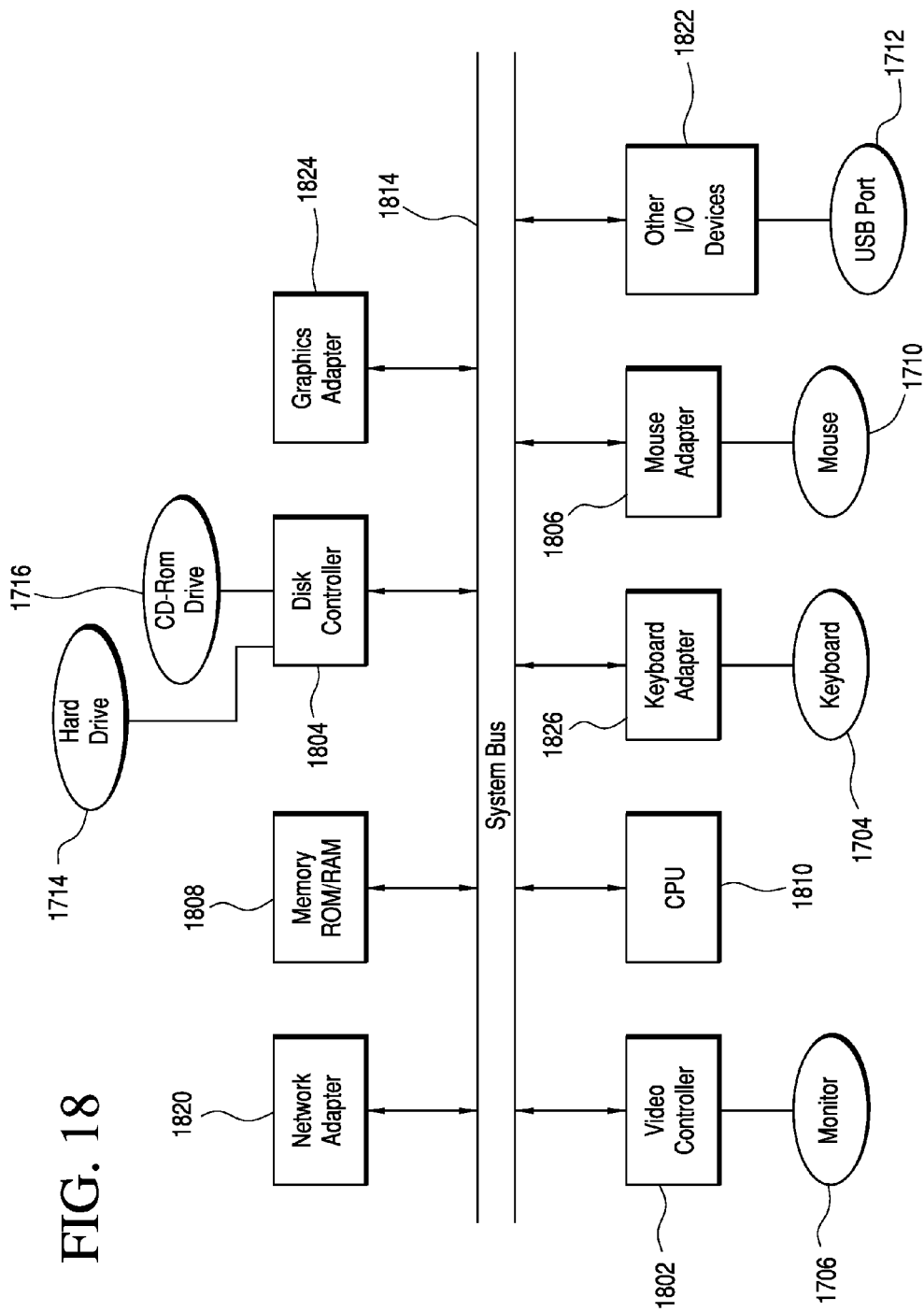
FIG. 18 illustrates a representative block diagram of an example of the elements included in the circuit boards inside a chassis of the computer system of FIG. 17.
Figure 21:
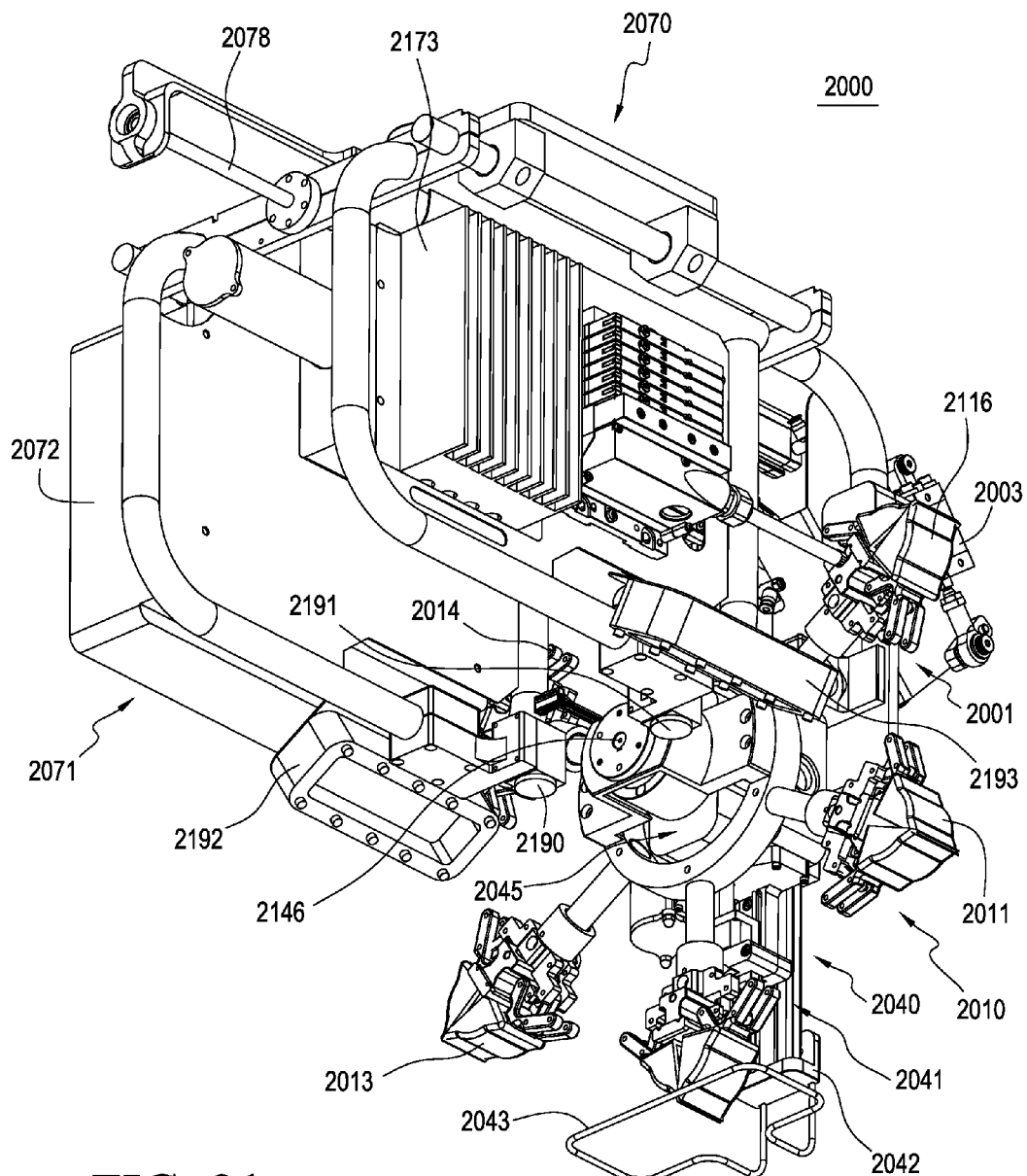
FIG. 21 illustrates a bottom, front, right side perspective view of the harvesting robot of FIG. 20.

Turning ahead in the drawings, FIG. 17 illustrates an exemplary embodiment of computer system 1700, all of which or a portion of which can be suitable for implementing processing unit 1273 (FIGS. 12-13) and/or processing unit 2173 (FIG. 21, described below). As an example, a different or separate one of chassis 1702 (and all or a portion of its internal components) can be suitable for implementing processing unit 1273 (FIGS. 12-13) and/or processing unit 2173 (FIG. 21). Furthermore, one or more elements of computer system 1700 (e.g., refreshing monitor 1706, keyboard 1704, and/or mouse 1710, etc.) can also be appropriate for implementing the techniques described herein. Computer system 1700 comprises chassis 1702 containing one or more circuit boards (not shown), Universal Serial Bus (USB) port 1712, Compact Disc Read-Only Memory (CD-ROM) and/or Digital Video Disc (DVD) drive 1716, and hard drive 1714. A representative block diagram of the elements included on the circuit boards inside chassis 1702 is shown in FIG. 18. Central processing unit (CPU) 1810 in FIG. 18 is coupled to system bus 1814 in FIG. 18. In various embodiments, the architecture of CPU 1810 can be compliant with any of a variety of commercially distributed architecture families.

Continuing with FIG. 18, system bus 1814 also is coupled to memory storage unit 1808, where memory storage unit 1808 comprises both read only memory (ROM) and random access memory (RAM). Non-volatile portions of memory storage unit 1808 or the ROM can be encoded with a boot code sequence suitable for restoring computer system 1700 (FIG. 17) to a functional state after a system reset. In addition, memory storage unit 1808 can comprise microcode such as a Basic Input-Output System (BIOS). In some examples, the one or more memory storage units of the various embodiments disclosed herein can comprise memory storage unit 1808, a USB-equipped electronic device, such as, an external memory storage unit (not shown) coupled to universal serial bus (USB) port 1712 (FIGS. 17-18), hard drive 1714 (FIGS. 17-18), and/or CD-ROM or DVD drive 1716 (FIGS. 17-18). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1810.

In the depicted embodiment of FIG. 18, various I/O devices such as disk controller 1804, graphics adapter 1824, video controller 1802, keyboard adapter 1826, mouse adapter 1806, network adapter 1820, and other I/O devices 1822 can be coupled to system bus 1814. Keyboard adapter 1826 and mouse adapter 1806 are coupled to keyboard 1704 (FIGS. 17-18) and mouse 1710 (FIGS. 17-18), respectively, of computer system 1700 (FIG. 17). While graphics adapter 1824 and video controller 1802 are indicated as distinct units in FIG. 18, video controller 1802 can be integrated into graphics adapter 1824, or vice versa in other embodiments. Video controller 1802 is suitable for refreshing monitor 1706 (FIGS. 17-18) to display images on a screen 1708 (FIG. 17) of computer system 1700 (FIG. 17). Disk controller 1804 can control hard drive 1714 (FIGS. 17-18), USB port 1712 (FIGS. 17-18), and CD-ROM drive 1716 (FIGS. 17-18). In other embodiments, distinct units can be used to control each of these devices separately.

In some embodiments, network adapter 1820 can comprise and/or be implemented as a WNIC (wireless network interface controller) card (not shown) plugged or coupled to an expansion port (not shown) in computer system 1700 (FIG. 17). In other embodiments, the WNIC card can be a wireless network card built into computer system 1700 (FIG. 17). A wireless network adapter can be built into computer system 1700 by having wireless communication capabilities integrated into the motherboard chipset (not shown), or implemented via one or more dedicated wireless communication chips (not shown), connected through a PCI (peripheral component interconnector) or a PCI express bus of computer system 1700 (FIG. 17) or USB port 1712 (FIG. 17). In other embodiments, network adapter 1820 can comprise and/or be implemented as a wired network interface controller card (not shown).

Although many other components of computer system 1700 (FIG. 17) are not shown, such components and their interconnection are well known to those of ordinary skill in the art. Accordingly, further details concerning the construction and composition of computer system 1700 and the circuit boards inside chassis 1702 (FIG. 17) are not discussed herein.

When computer system 1700 in FIG. 17 is running, program instructions stored on a USB-equipped electronic device connected to USB port 1712, on a CD-ROM or DVD in CD-ROM and/or DVD drive 1716, on hard drive 1714, or in memory storage unit 1808 (FIG. 18) are executed by CPU 1810 (FIG. 18). A portion of the program instructions, stored on these devices, can be suitable for carrying out at least part of the techniques described above.

Although computer system 1700 is illustrated as a desktop computer in FIG. 17, there can be examples where computer system 1700 may take a different form factor while still having functional elements similar to those described for computer system 1700. In some embodiments, computer system 1700 may comprise a single computer, a single server, or a cluster or collection of computers or servers, or a cloud of computers or servers. Typically, a cluster or collection of servers can be used when the demand on computer system 1700 exceeds the reasonable capability of a single server or computer. In certain embodiments, computer system 1700 may comprise a portable computer, such as a laptop computer. In certain other embodiments, computer system 1700 may comprise a mobile device, such as a smart phone. In certain additional embodiments, computer system 1700 may comprise an embedded system.

Figure 19:
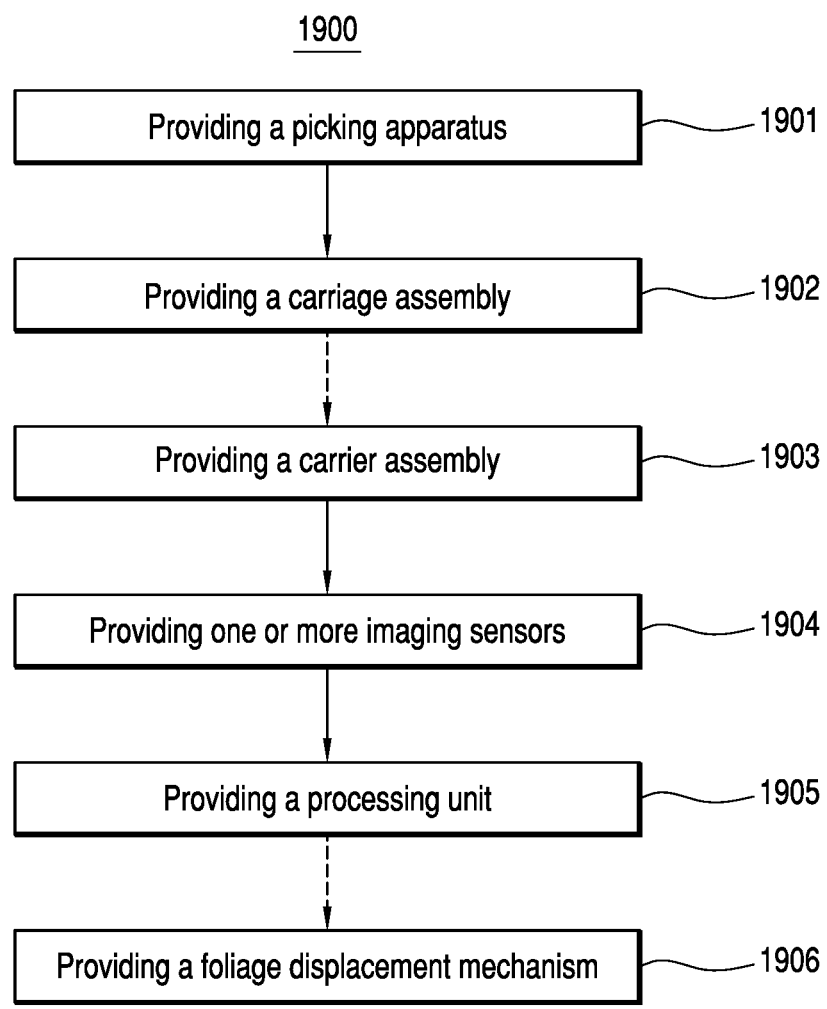
FIG. 19 illustrates a flow chart for a method of providing a device for selectively harvesting crops on a plant, according to another embodiment.

Turning ahead in the drawings, FIG. 19 illustrates a flow chart for a method 1900 of providing a device for selectively harvesting crops on a plant in accordance with the present disclosure. Method 1900 is merely exemplary and is not limited to the embodiments presented herein. Method 1900 can be employed in many different embodiments or examples not specifically depicted or described herein. In some embodiments, the procedures, the processes, and/or the activities of method 1900 can be performed in the order presented. In other embodiments, the procedures, the processes, and/or the activities of method 1900 can be performed in any suitable order. In still other embodiments, one or more of the procedures, the processes, and/or the activities of method 1900 can be combined or skipped. In some embodiments, the plant can be a strawberry plant and each of the crops can be a strawberry. The plant can be similar or identical to plant 1510 (FIG. 15). Each of the crops can be similar or identical to strawberry 535 (FIG. 5). In other embodiments, the plant can be another suitable plant.

Referring to FIG. 19, method 1900 can include a block 1901 of providing a picking apparatus. In many embodiments, the picking apparatus can be similar or identical to picking apparatus 110 (FIGS. 1-3). In a number of embodiments, the picking apparatus can be rotatable around a central axis. The central axis can be similar or identical to central axis 311 (FIG. 3). In various embodiments, the central axis can be parallel to a growing bed of the plant. The growing bed can be similar or identical to growing bed 1501 (FIG. 15). In several embodiments, the picking apparatus can include a plurality of grippers each spaced apart and extending radially from the central axis, and each configured to pick a different individual one of the crops. The individual crop can be similar or identical to crop 535, or another suitable crop. The grippers can be similar or identical to grippers 312-315 (FIG. 3). In some embodiments, the plurality of grippers can include four grippers. For example, the picking apparatus can include, four, fix, six, seven, eight, or more grippers. In other embodiments, the plurality of grippers can include fewer than four grippers.

In a number of embodiments, each of the plurality of grippers can be adjustable between an open position and a closed position. The open position can be similar or identical to the open position shown in FIG. 4. The close position can be similar or identical to the closed position shown in FIG. 5. In various embodiments, each of the plurality of grippers can be configured in the open position to open around the individual crop. In several embodiments, each of the plurality of grippers can be configured in the closed position to securely hold the individual crop when the picking apparatus is rotated around the central axis.

In some embodiments, each of the plurality of grippers can be configured to securely hold the individual crop in the closed position across different sizes of the individual crop. In many embodiments, each of the plurality of grippers can include a first claw piece and a second claw piece. The first claw piece can be similar or identical to first claw piece 410 (FIGS. 4-5). The second claw piece can be similar or identical to second claw piece 420 (FIGS. 4-5). In many embodiments, the first claw piece and/or the second claw piece can each include a metal frame at least partially covered with silicone rubber.

In a number of embodiments, for each of the plurality of grippers, the first claw piece can include a first wedged-shaped tip and/or the second claw piece can include a second wedge-shaped tip. The first wedge-shaped tip can be similar or identical to first tip 413 (FIGS. 4-5), and/or the second wedge-shaped tip can be similar or identical to second tip 423 (FIGS. 4-5). In a number of embodiments, when each of the plurality of grippers is in the open position (such as shown in FIG. 4), the first wedged-shaped tip, and the second wedge-shaped tip are adjustable to fit around the individual crop and to separate the individual crop from one or more proximate crops.

In various embodiments, each of the plurality of grippers can further include a first flexible strip attached to the first claw piece and/or a second flexible strip attached to the second claw piece. The first flexible strip can be similar or identical to first strip 414 (FIGS. 4-5), and/or the second flexible strip can be similar or identical to second strip 424 (FIGS. 4-5). In several embodiments, when the gripper is adjusted to the closed position around the individual crop, the first flexible strip and the second flexible strip can be configured to bend to allow for different sizes of the individual crop.

Method 1900 next can include a block 1902 of providing a carriage assembly. In a number of embodiments, the carriage assembly can be similar or identical to carriage assembly 140 (FIGS. 1-2, 6-8). In some embodiments, the carriage assembly can include a first rotational mechanism. In many embodiments, the first rotational mechanism can be similar or identical to rotational shaft 655 (FIGS. 6-7), motor 654 (FIGS. 6-8), gear 854 (FIG. 8), and/or gear 855 (FIG. 8). In several embodiments, the picking apparatus can be configured to be coupled to the first rotational mechanism. In some embodiments, the first rotational mechanism can be configured to rotate the picking apparatus around the central axis in a rotational path with respect to the carriage assembly.

In some embodiments, the carriage assembly can further include a first cam surrounding the first rotational mechanism. The first cam can be similar or identical to stationary cam 669 (FIGS. 6, 8-11). In a number of embodiments, the carriage assembly can further include an actuator. The actuator can be similar or identical to actuator 661 (FIGS. 6-11), motor 653 (FIGS. 6-8), and/or actuation cam 660 (FIGS. 6-7, 9-11). In some embodiments, the first cam can be configured to hold the plurality of grippers in the closed position for a first portion of the rotational path and to allow the plurality of grippers to open to the open position for a second portion of the rotational path from a release position to a picking position. The first portion of the rotational path can be similar or identical to first portion 964 (FIGS. 9-11), and/or the second portion of the rotational path can be similar or identical to second portion 965 (FIGS. 9-11). The release position can be similar or identical to release position 967 (FIGS. 9-11), and/or the picking position can be similar or identical to picking position 966 (FIGS. 9-11). In a number of embodiments, the first cam can be configured to stop rotation of the picking apparatus when each of the plurality of grippers is rotated to the picking position on the second portion of the rotational path. In various embodiments, the actuator can be configured to adjust an opening width of a picking gripper of the plurality of grippers at the picking position to isolate the individual crop and to close the gripper to securely hold the individual crop. The picking gripper can be similar or identical to gripper 312 at picking position 966 as shown in FIGS. 10-11. The first cam can be configured such that, as each of the plurality of grippers rotates to the release position of the rotational path, each of the plurality of grippers can be configured to open to the open position and release the individual crop in a collection device.

Method 1900 next can optionally include a block 1903 of providing a carrier assembly. The carrier assembly can be similar or identical to carrier assembly 170 (FIGS. 1-2, 12-13). In some embodiments, the carrier assembly can include a second rotational mechanism. The second rotational mechanism can be similar or identical to mounting bearing 1274 (FIGS. 12-13). In various embodiments, the second rotational mechanism can be configured to rotate the carrier assembly around the second rotational mechanism such that the picking apparatus can be rotated around the plant when the second rotational mechanism is centered above the plant.

Method 1900 next can include a block 1904 of providing one or more imaging sensors. In a number of embodiments, the one or more imaging sensors can be similar or identical to imaging sensor 1290 (FIGS. 12-13) and/or imaging sensor 1291 (FIGS. 12-13).

Method 1900 next can include a block 1905 of providing a processing unit. The processing unit can be similar or identical to processing unit 1273 (FIGS. 12-13). In a number of embodiments, the processing unit can be configured to receive information from the one or more imaging sensors to determine the location of the crops to be harvested.

Method 1900 next can optionally include a block 1906 of providing a foliage displacement mechanism. In many embodiments, the foliage displacement mechanism can be similar or identical to foliage displacement mechanism 1400 (FIGS. 14-16). In several embodiments, the foliage displacement mechanism can be configured to move foliage of the plant and expose at least a portion of the crops to the one or more imaging sensors. The foliage can be similar or identical to foliage 1512 (FIG. 15). In some embodiments, the foliage displacement mechanism can include a back surface. The back surface can be similar or identical to back surface 1410 (FIG. 14). In many embodiments, the back surface can be configured to extend normal to a growing bed of the plant. In various embodiments, the foliage displacement mechanism can include a base. The base can be similar or identical to base 1420 (FIG. 14). In several embodiments, the base can be configured to extend parallel to the growing bed from the back surface toward the plant. In some embodiments, the foliage displacement mechanism can include a curved surface. The curved surface can be similar or identical to surface 1440 (FIG. 14). In a number of embodiments, the curved surface can extend from the base upward to the back surface. In many embodiments, the foliage displacement mechanism can include a channel. The channel can be similar or identical to channel 1450 (FIG. 14). In some embodiments, the channel can bisect a front portion of the base and extend upward through the curved surface. In several embodiments, the channel can be configured to surround a center of the plant when the foliage displacement mechanism is moved toward the plant. The center of the plant can be similar or identical to center 1513. In some embodiments, the foliage displacement mechanism can be configured, when moved toward the plant, to move the foliage upward and toward the center of the plant.

Figure 20:
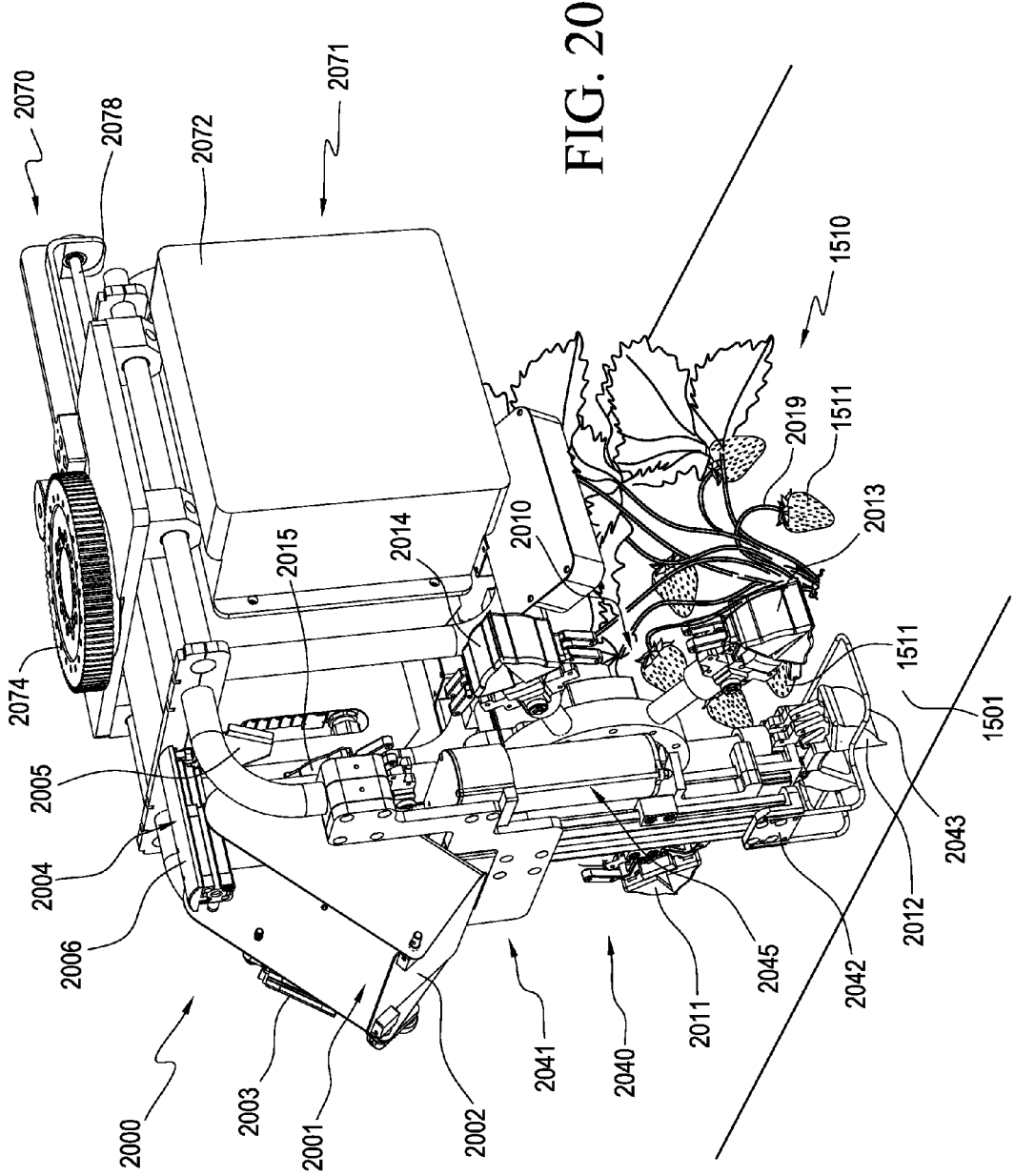
FIG. 20 illustrates a top, back, left side perspective view of a harvesting robot, according to an embodiment, hovering above the plant and growing bed of FIG. 15.

Turning ahead in the drawings, FIG. 20 illustrates a top, back, left side perspective view of a harvesting robot 2000 hovering above plant 1510 and growing bed 1501. FIG. 21 illustrates a bottom, front, right side perspective view of harvesting robot 2000. Harvesting robot 2000 is merely exemplary, and embodiments of the harvesting robot are not limited to embodiments presented herein. The harvesting robot can be employed in many different embodiments or examples not specifically depicted or described herein. Harvesting robot 2000 can be similar to harvesting robot 100 (FIGS. 1-2, 13, 15), and various components of harvesting robot 2000 can be similar or identical to various components of harvesting robot 100 (FIGS. 1-2, 13, 15).

In many embodiments, harvesting robot 2000 can include a picking apparatus 2010, a carriage assembly 2040, and/or a carrier assembly 2070. Picking apparatus 2010 can be similar to picking apparatus 110 (FIGS. 1-3, 10-11, 13, 15), and various components of picking apparatus 2010 can be similar or identical to various components of picking apparatus 110 (FIGS. 1-3, 10-11, 13, 15). Carriage assembly 2040 can be similar to carriage assembly 140 (FIGS. 1-2, 6-8, 13, 15), and various components of carriage assembly 2040 can be similar or identical to various components of carriage assembly 140 (FIGS. 1-2, 6-8, 13, 15). Carrier assembly 2070 can be similar to carrier assembly 170 (FIGS. 1-2, 12-13, 15), and various components of carrier assembly 2070 can be similar or identical to various components of carrier assembly 170 (FIGS. 1-2, 12-13, 15). In several embodiments, harvesting robot 2000 can be configured to harvest crops from plants. In some embodiments, harvesting robot 2000 can be used to harvest crops such as strawberries from strawberry plants. In the same or other embodiments, harvesting robot 2000 can be used to harvest crops such as tomatoes, peppers (e.g., bell peppers, chili peppers, etc.), oranges, and/or other suitable crops. In a number of embodiments, harvesting robot 2000 can be configured to selectively pick crops (e.g., ripe crops) from plants, and leave other crops (e.g., unripe crops) on the plants. For example, harvesting robot can be used to pick crops 1511 (FIG. 20), when ripe, from plant 1510 (FIG. 20). In several embodiments, harvesting robot 2000 can pick crops and offload picked crops simultaneously. In other embodiments, harvesting robot 2000 can be used for picking other individual items that are not crops. For example, in some embodiments, harvesting robot 2000 can be used for picking and/or offloading recycled items in a recycling plant.

In several embodiments, picking apparatus 2010 can be rotatable around a central axis, which can be similar or identical to central axis 311 (FIG. 3). In many embodiments, picking apparatus 2010 can include grippers, such as grippers 2011-2014 (FIGS. 20-21), gripper 2015 (FIG. 20), and gripper 2116 (FIG. 21), which can be similar or identical to grippers 312-315 (FIG. 3). In various embodiments, each of the grippers can be used to pick a different individual one of the crops. In the embodiment of picking apparatus 2010 shown in FIGS. 20-21 and FIGS. 22-27 (described below), picking apparatus 2010 includes six grippers. In other embodiments, the number of grippers on picking apparatus 110 can be two, three, four, five, seven, eight, nine, ten, or another suitable number of grippers. In a number of embodiments, the grippers can be spaced apart and/or can extend radially from the central axis.

In many embodiments, carriage assembly 2040 can include a carriage support assembly 2041 and a carriage 2045. Carriage support assembly 2041 can be similar or identical to carriage support assembly 640 (FIGS. 6, 8), and various components of carriage support assembly 2041 can be similar or identical to carriage support assembly 640 (FIGS. 6, 8). Carriage 2045 can be similar or identical to carriage 650 (FIGS. 6, 8), and various components of carriage 2045 can be similar or identical to carriage 650 (FIGS. 6, 8). In several embodiments, carriage 2045 can include a rotational shaft 2146 (FIG. 21), which can be configured to couple to picking apparatus 2010, and which can be driven by a motor in carriage 2045 (which can be similar or identical to motor 654 (FIGS. 6-8) to rotate picking apparatus 2010. In many embodiments, carriage support assembly 2041 can control a vertical position of carriage 2045, similarly as shown in carriage assembly 140 (FIGS. 1-2, 6-8, 13, 15) and described above, which can raise and/or lower picking apparatus 2010. For example, carriage 2045 and picking apparatus 2010 can be adjusted in a lowered position, as shown in FIG. 20. Similarly, carriage 2045 and picking apparatus 2010 can be adjusted to a raised position, as shown in FIG. 21.

In many embodiments, carriage support assembly 2041 can include a bottom base 2042. Bottom base 2042 can be similar or identical to bottom base 642 (FIGS. 6-8). In several embodiments, carriage support assembly 2041 can include a stem separation bar 2043, which can be attached to bottom base 2042. In a number of embodiments, stem separation bar 2043 can be configured to provide tension on a stem of an individual crop, such as one of crops 1511 (FIG. 20), when a gripper (e.g., gripper 2012) picks the crop (e.g., 1511 (FIG. 20)) from plant 1510 (FIG. 20). For example, in many embodiments, a crop (e.g., 1511 (FIG. 20)) can be separated from a stem (e.g., stem 2019 (FIG. 20)) of the crop that holds the crop (e.g., 1511 (FIG. 20)) to the plant (e.g., plant 1510 (FIG. 20)) by holding a portion of the stem down with stem separation bar 2043 while pulling upward on the crop (e.g., 1511 (FIG. 20)), which can provide a substantially perpendicular tension force to the stem (e.g., stem 2019 (FIG. 20)) of the crop from the attachment of the stem (e.g., stem 2019 (FIG. 20)) on the crop. In a number of embodiments, the crop can be raised upward by the gripper (e.g., gripper 2012) after it is picked, and the stem (e.g., stem 2019 (FIG. 20)) can extend downward to stem separation bar 2043, which can apply tension and result in the efficient separation of the stem (e.g., stem 2019 (FIG. 20)) from the crop (e.g., 1511 (FIG. 20)). In many embodiments, the gripper (e.g., 2012) picking the crop (e.g., 1511 (FIG. 20)) can be lowered through stem separation bar 2043, as shown in FIG. 20. Stem separation bar 2043 can be stationary with respect to carriage support assembly 2041, and can remain in place when carriage 2045, picking apparatus 2010, and the grippers (e.g., gripper 2012) are lowered to pick the crop (e.g., 1511 (FIG. 20)), as shown in FIG. 20. After the gripper (e.g., 2012) closes around a crop (e.g., 1511 (FIG. 20)), carriage 2045, picking apparatus 2010, and the grippers (e.g., gripper 2012) can be raised, as shown in FIG. 21. Because stem separation bar 2043 remains stationary when the gripper (e.g., 2012) is raised, stem separation bar 2043 tension can apply tension to the stem (e.g., stem 2019 (FIG. 20)) and snap the stem (e.g., stem 2019 (FIG. 20)) from the berry. In many embodiments, stem separation bar 2043 and/or bottom base 2042 can encircle the stem (e.g., stem 2019 (FIG. 20)) of the crop (e.g., 1511 (FIG. 20)) that is picked, such that stem separation bar 2043 will apply tension to the stem (e.g., stem 2019 (FIG. 20)) as the crop (e.g., 1511 (FIG. 20)) is raised and/or rotated in the gripper (e.g., 2012).

In many embodiments, carrier assembly 2070 can include a mounting bearing 2074 (FIG. 20). Mounting bearing 2074 (FIG. 20) can be similar or identical to mounting bearing 1274 (FIG. 12). In many embodiments, similarly as described above in connection with FIG. 12, carrier assembly 2070 and/or harvesting robot 2000 can be mounted above plant 1510 (FIG. 20) to be harvested at mounting bearing 2074, and mounting bearing can provide for rotation of harvesting robot 2000 with respect to plant 1510 (FIG. 20). Similarly as described above in connection with FIG. 12, in many embodiments, carrier assembly 2070 can include a motor (not shown), which can rotate mounting bearing 2074, and or a motor (not shown), which can rotate an adjustment shaft 2078 of carrier assembly 2070, which can adjust the position of a carriage attachment base (not shown) and/or carriage assembly 2040 with respect to mounting bearing 2074, which can adjust the distance of picking apparatus 2010 from the center of plant 1510 (FIG. 20).

In some embodiments, carrier assembly 2070 can include one or more imaging sensors, such as imaging sensors 2190 and/or 2191. Imaging sensors 2190 and/or 2191 can be cameras configured to detect optical image information. In several embodiments, carrier assembly 2070 can include one or more illumination sources, such as lights 2192 and/or 2193. In a number of embodiments, carrier assembly 2070 can include an electronics unit 2071. Electronics unit 2071 can be similar to electronics unit 1271 (FIG. 12), and various components of electronics unit 2071 can be similar or identical to various components of electronics unit 1271 (FIG. 12). In many embodiments, electronics unit 2071 can include a control unit 2072 and/or a processing unit 2173 (FIG. 21). Control unit 2072 can be similar or identical to control unit 1272 (FIG. 12), and processing unit 2173 can be similar or identical to processing unit 1273 (FIG. 12). For example, control unit 2072 can be a suitable programmable logic controller (PLC), which can control motors in harvesting robot 2000. In several embodiments, processing unit 2173 can be similar to an embodiment of computer system 1700 (FIG. 17), which can include one or more processors configured to receive information from imaging sensors 2190 and/or 2191 to determine the location of the crops to be harvested. For example, processing unit can be configured to determine that certain crops are ripe and ready to be harvested, and other crops are not yet ripe or are damaged, and should not be harvested.

In several embodiments, carriage assembly 2040 and/or carrier assembly 2070 can include a collection apparatus 2001. In many embodiments, after a gripper (e.g., gripper 2012) has picking a crop (e.g., 1511 (FIG. 20)) from a picking position, the gripper (e.g., gripper 2012) can be rotated while holding the crop (e.g., 1511 (FIG. 20), which can allow another gripper to pick another crop. In many embodiments, once the gripper (e.g., gripper 2012) has been rotated to an offload position, where the crop (e.g., 1511 (FIG. 20)) can be offloaded from the gripper (e.g., gripper 2012) into collection apparatus 2001. In many embodiments, collection apparatus 2001 can hold crops that have been offloaded from the grippers (e.g., gripper 2012). In many embodiments, collection apparatus 2001 can include a gate 2002 (FIG. 20), which can open to allow collection apparatus 2001 to be emptied, such as when collection apparatus is full or when harvesting robot 2000 is positioned such that collection apparatus can empty into a suitable collection container or collection conveyer, such as when harvesting robot 2000 has finished rotating around plant 1510 (FIG. 20) and returned to its starting position. In many embodiments, gate 2002 (FIG. 20) can be opened using an actuator 2003.

In several embodiments, carriage assembly 2040 and/or carrier assembly 2070 can include a crop ejector 2004 (FIG. 20), which can facilitate moving a crop (e.g., 1511 (FIG. 20)) from a gripper (e.g., 2012) in the offload position to collection apparatus 2001. In many embodiments, crop ejector 2004 can include an ejection plate 2005 (FIG. 20) and an actuator 2006 (FIG. 20). In a number of embodiments, ejection plate 2005 can prevent the crop (e.g., 1511 (FIG. 20)) from falling out of the gripper (e.g., 2012) when the gripper opens to offload the crop (e.g., 1511 (FIG. 20)). In several embodiments, ejection plate 2005 can push the crop out of the gripper (e.g., 2012) toward collection plate 2001 when the gripper (e.g., 2012) is in the open position. In many embodiments, actuator 2006 can move ejection plate 2005.

Figure 23:
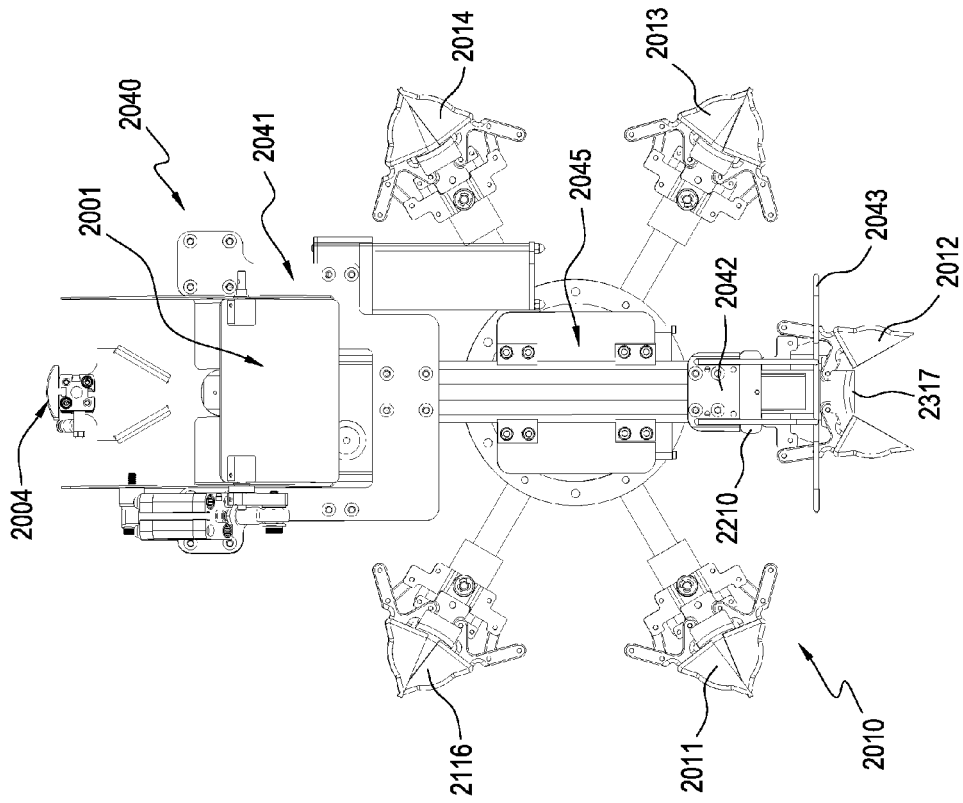
FIG. 23 illustrates a rear side view of the carriage assembly, the picking apparatus, the collection apparatus, and the crop ejector of FIG. 22.
Figure 22:
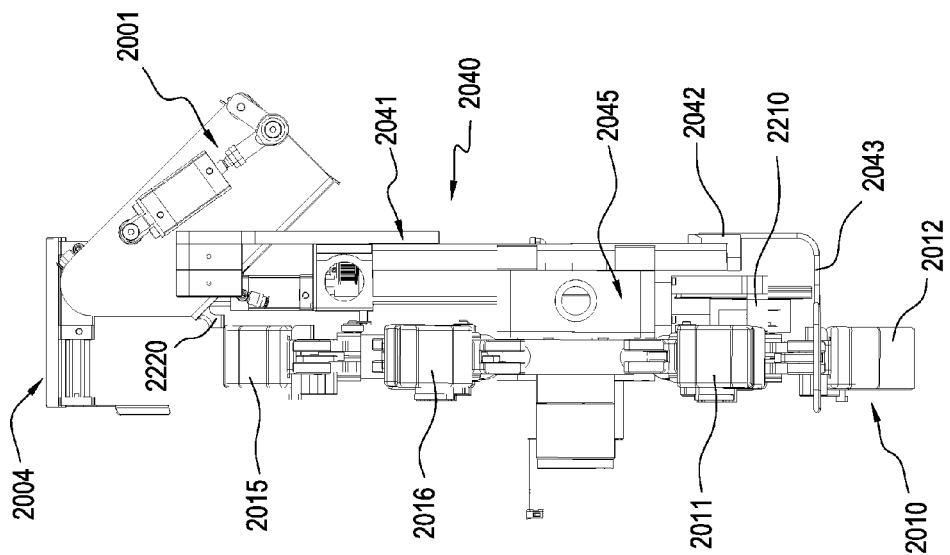
FIG. 22 illustrates a right side view of a carriage assembly, a picking apparatus, a collection apparatus, and a crop ejector of FIG. 20, in which the picking apparatus is in a lowered picking position and in which a gripper of the picking apparatus is in an open picking position.
Figure 27:
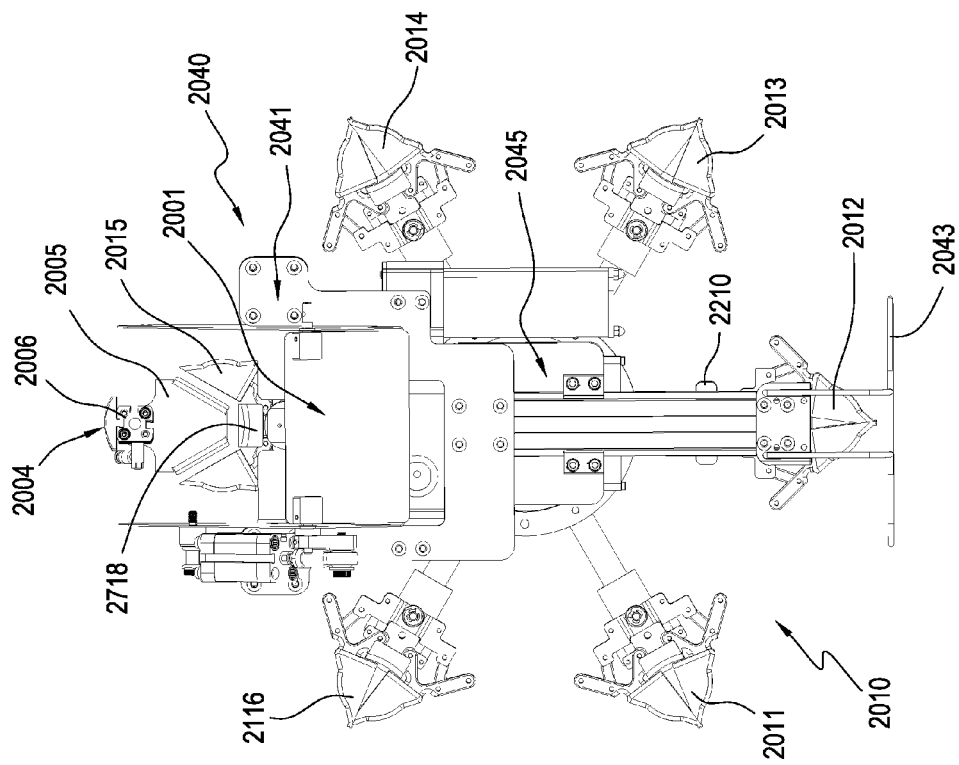
FIG. 27 illustrates a rear side view of the carriage assembly, the picking apparatus, the collection apparatus, and the crop ejector of FIG. 26.
Figure 26:
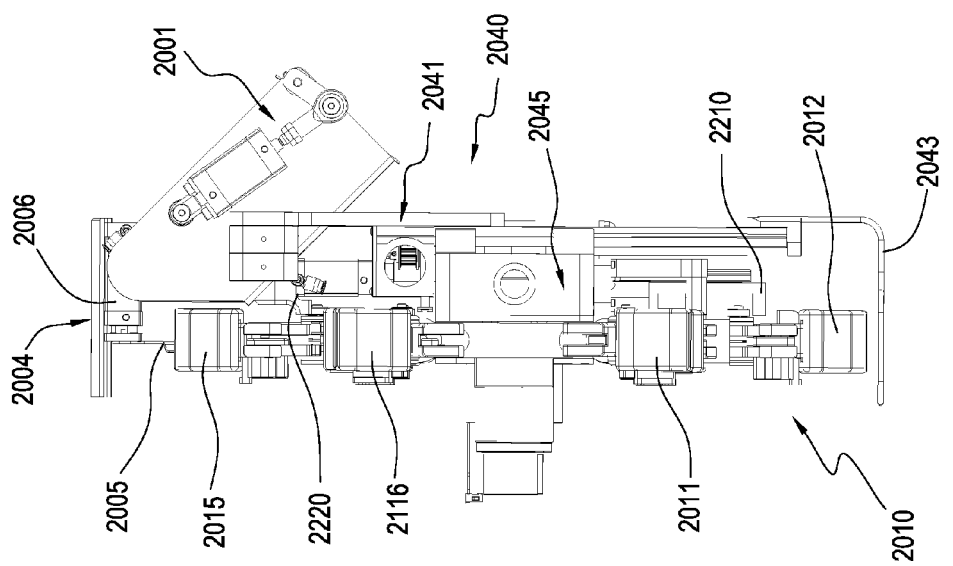
FIG. 26 illustrates a right side view of the carriage assembly, the picking apparatus, the collection apparatus, and the crop ejector of FIG. 20, in which the picking apparatus is in the raised offload position and the gripper of the picking apparatus is in an open offload position.

Turning ahead in the drawings, FIG. 22 illustrates a right side view of carriage assembly 2040, picking apparatus 2010, collection apparatus 2001, and crop ejector 2004, in which picking apparatus 2010 is in a lowered position and gripper 2012 in a picking position is in an open position. FIG. 23 illustrates a rear side view of carriage assembly 2040, picking apparatus 2010, collection apparatus 2001, and crop ejector 2004, in which the picking apparatus 2010 is in the lowered position and gripper 2012 in the picking position is in the open position. FIG. 24 illustrates a right side view of carriage assembly 2040, picking apparatus 2010, collection apparatus 2001, and crop ejector 2004, in which picking apparatus 2010 is in a raised position and gripper 2015 in the offload position is in a closed position. FIG. 25 illustrates a rear side view of carriage assembly 2040, picking apparatus 2010, collection apparatus 2001, and crop ejector 2004, in which picking apparatus 2010 is in the raised position and gripper 2015 in the offload position is in the closed position. FIG. 26 illustrates a right side view of carriage assembly 2040, picking apparatus 2010, collection apparatus 2001, and crop ejector 2004, in which picking apparatus 2010 is in the raised position and gripper 2015 in the offload position is in the open position. FIG. 27 illustrates a rear side view of carriage assembly 2040, picking apparatus 2010, collection apparatus 2001, and crop ejector 2004, in which picking apparatus 2010 is in the raised position and gripper 2015 in the offload position is in the open position.

In many embodiments, the grippers (e.g., 2011-2015, 2116) of picking apparatus 2010 can be spring biased in a closed configuration. For example, gripper 312 shown in FIG. 4, can be modified such that compression spring 432 (FIG. 4) can be situated on the other side of pin 431 to bias displacement block 430 outward along spoke 317 to adjust gripper 312 to the closed position, such as the closed position of gripper 312 in FIG. 5. In yet another embodiment, compression spring 432 can be situated in the same position shown in FIG. 4, but can be replaced with an extension spring, which can similarly bias displacement block 430 outward along spoke 317 to adjust gripper 312 to the closed position. In many embodiments, each of the grippers (e.g., 2011-2015, 2116) of picking apparatus 2010 can include a claw cushion, such as claw cushion 2317 shown on gripper 2012 in FIG. 23, or claw cushion 2718 shown on gripper 2015 in FIG. 27. In many embodiments, the claw cushion (e.g., 2317 (FIG. 23), 2718 (FIG. 27)) can provide a surface on the inside of the gripper (e.g., 2011-2015, 2116) to prevent a picked crop in the gripper (e.g., 2011-2015, 2116) from being displaced from between the claw pieces (e.g., 410, 420 (FIG. 4)) and falling into a hinge region proximate to the hinges (e.g., 419, 429 (FIG. 4)). For example, when gripper 2015 opens in the offload position in FIG. 27, crop cushion 2718 can prevent a crop within gripper 2015 from falling into the hinges of gripper 2015.

In many embodiments, picking apparatus 2010 can move the grippers (e.g., 2011-2015, 2116) in a rotational path centered with respect to the central axis of picking apparatus 2010. In several embodiments, a picking position can be located at the bottom of the rotational path, such as the position of gripper 2012 shown in FIGS. 22-27. In other embodiments, the picking position can be located at a different location of the rotational path, such as a side of the rotational path, or a top of the rotational path. In many embodiments, each of the grippers (e.g., 2011-2015, 2116) can be configured to be opened to an open position, such as the open position of gripper 312 in FIG. 4, when the gripper (e.g., 2012) is located at the picking position, as shown in FIGS. 22-23. In many embodiments, the gripper (e.g., 2012) located at the picking position can be opened to the open position to pick a crop.

In several embodiments, the gripper (e.g., 2012) located at the picking position can be opened to the open position before or while picking apparatus 2010 and the gripper (e.g., 2012) in the picking position is lowered to pick the crop. In many embodiments, the gripper (e.g., 2012) in the picking position can be opened using an actuator, such as actuator 2210. In many embodiments, actuator 2210 can be configured to engage with a pin of the gripper, such as pin 431 in FIG. 4 or displacement pin 1032 in FIG. 10, described above, and move the pin to adjust the position of the claw pieces (e.g., 410, 420 (FIG. 4)) of the gripper (e.g., 2012) and adjust the gripper (e.g., 2012) to the open position. In many embodiments, actuator 2210 can pull the pin inward along the spoke (e.g., pulling pin 413 inward along spoke 317 in FIG. 4) to open the gripper (e.g., 2012). In many embodiments, actuator 2210 can be configured to adjust the position of the claw pieces (e.g., 410, 420 in FIG. 4) in order to fit around the individual crop to be picked, as such described above in connection with actuator 661 in FIG. 10.

In a number of embodiments, before picking apparatus 2010 and the gripper (e.g., 2012) in the picking position is lowered to pick the crop, and after picking apparatus 2010 and the gripper (e.g., 2012) in the picking position is raised (e.g., with the crop in the gripper (e.g., 2012)), picking apparatus 2010 and the gripper (e.g., 2012) in the picking position can be positioned in the raised position, as shown in FIGS. 24-25. In many embodiments, when picking apparatus 2010 is in the raised position, each of the grippers (e.g., 2011-2015, 2116) can be in the closed position, which can allow picking apparatus 2010 to be rotated with one or more crops in one or more of the grippers (e.g., 2011-2015, 2116).

In many embodiments, when picking apparatus 2010 is in the raised position, one of the grippers (e.g., gripper 2015) can be opened to the open position to offload a crop from the gripper (e.g., 2015), such as shown in FIGS. 26-27. In a number of embodiments, an offload position can be located at the top of the rotational path, such as the position of gripper 2015 shown in FIGS. 22-27. In other embodiments, the offload position can be located at a different location of the rotational path, such as a side of the rotational path, or a bottom of the rotational path. In many embodiments, each of the grippers (e.g., 2011-2015, 2116) can be configured to be opened to an open position, such as the open position of gripper 312 in FIG. 4, when the gripper (e.g., 2015) is located at the offload position, as shown in FIGS. 26-27. In many embodiments, the gripper (e.g., 2015) located at the offload position be opened to the open position to offload a crop from the gripper (e.g., 2015).

In many embodiments, the gripper (e.g., 2015) in the offload position can be opened using an actuator, such as actuator 2220. In many embodiments, actuator 2220 can be configured to engage with a pin of the gripper, such as pin 431 in FIG. 4 or displacement pin 1032 in FIG. 10, described above, and move the pin to adjust the position of the claw pieces (e.g., 410, 420 (FIG. 4)) of the gripper (e.g., 2015) and adjust the gripper (e.g., 2015) to the open position. In many embodiments, actuator 2220 can pull the pin inward along the spoke (e.g., pulling pin 413 inward along spoke 317 in FIG. 4) to open the gripper (e.g., 2015).

In a number of embodiments, once the gripper (e.g., 2015) in the offload position is open, crop ejector 2004 can eject the crop in the opened gripper (e.g., 2015) in the offload position into collection apparatus 2001. For example, actuator 2006 can move ejection plate 2005 toward collection plate 2001, as shown in FIG. 26. In many embodiments, ejection plate 2005 can be configured to fit between the claw pieces (e.g., 410, 420 (FIG. 4)) of the gripper (e.g., 2015) in the offload position when the gripper (e.g., 2015) is in the open position.

In several embodiments, each of the grippers (e.g., 2011-2015, 2116) can pick a different individual crop, and picking apparatus 2010 can be configured to offload (e.g., continuously offload) the crops while picking apparatus 2010 is picking the crops in the individual grippers (e.g., 2011-2015, 2116). For example, crops can be offloaded during a time in which crops are being picked. In some embodiments, a gripper (e.g., 2011-2015, 2116) can pick a first crop at a first time. Later, a gripper different from the gripper that picked the first crop can pick a second crop, after which a gripper different from the gripper that picked the second crop can pick a third crop. During the time between the second crop and the third crop being picked, the first crop can be offloaded from the gripper that picked the first crop. In some embodiments, the gripper that picked the first crop can pick the third crop. In other embodiments, the gripper that picks the third crop can be different than the gripper that picked the first crop. In many embodiments, the second crops can be held in the gripper that picked the second crop when the first crop is offloaded from the gripper that picked the second crop. In a number of embodiments, the second crop and the third crop can be held the grippers that picked them respectively when the third crop has been picked.

In many embodiments, using picking apparatus 2010, as shown in FIGS. 20-27, gripper 2012 in the picking position can pick a crop and gripper 2015 in the offload position can offload a crop from gripper 2015. Picking apparatus 2010 can rotate such that gripper 2013 (of if rotated the other rotational direction, gripper 2011) can pick a crop while gripper 2012 holds the crop until it is rotated to the offload position. Picking apparatus 2010, in the embodiment shown in FIGS. 20-27, can hold up to four individual crops at a time when gripper 2012 has just picked a crop and gripper 2015 has not offloaded the crop, as gripper 2013 and gripper 2014 can also be holding crops. Gripper 2116 and gripper 2011 can be empty. In other embodiments, a crop in the gripper (e.g., 2015) in the offload position can be offloaded before the gripper (e.g., 2012) in the picking position is used to pick a crop, in which case picking apparatus can hold up to three crops. In several embodiments, a series of picks and offloads can be interleaved, with a pick followed by an offload, followed by a pick, followed by an offload, etc. In several embodiments, during this entire series of picks and offloads, picking apparatus can be holding at least one crop. In other embodiments, picking apparatus can be holding at least two crop, three crops, four crops, or another suitable number of crops each in individual grippers. In still other embodiments, a crop in the gripper (e.g., 2015) in the offload position can be offloaded simultaneously with the gripper (e.g., 2012) in the picking position picking a crop. In such embodiments, the gripper can be considered to have offloaded the first crop during the time period between the second crop and the third crop being picked, as described above. In yet other embodiments, picking apparatus 2010 can include a different number of grippers, as described above. For example, picking apparatus can include two grippers, and a pick in one of the two grippers can be followed by an offload in the other gripper, after which the other gripper can pick another individual crop.

In many embodiments, the continuous offload of crops from the grippers (e.g., 2011-2015, 2116) of picking apparatus 2010 can beneficially allow harvesting robot 2000 to pick many crops while rotating around a plant. For example, if a plant has seven ripe crops that are ready to be picked, harvesting robot 2000 can circle the plant, and pick the seven plants while simultaneously offload at least some of the crops while circling the plant and picking the seven crops. The offloaded crops can advantageously be collected in collection apparatus 2001.

Figure 29:
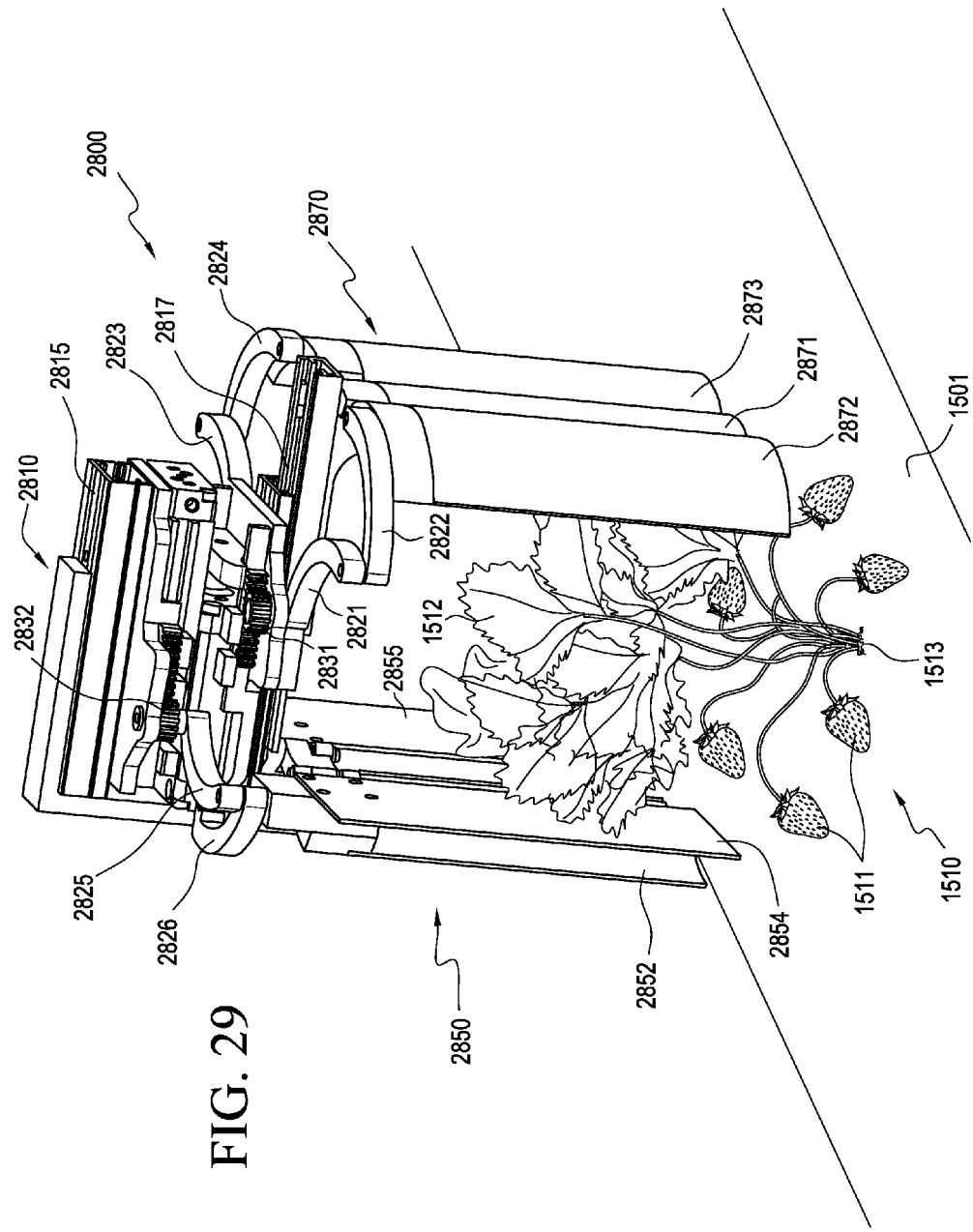
FIG. 29 illustrates a perspective view of the leaf displacement system of FIG. 28 hovering over the plant and growing bed of FIG. 15 and beginning to transition from the open configuration to a closed configuration.
Figure 30:
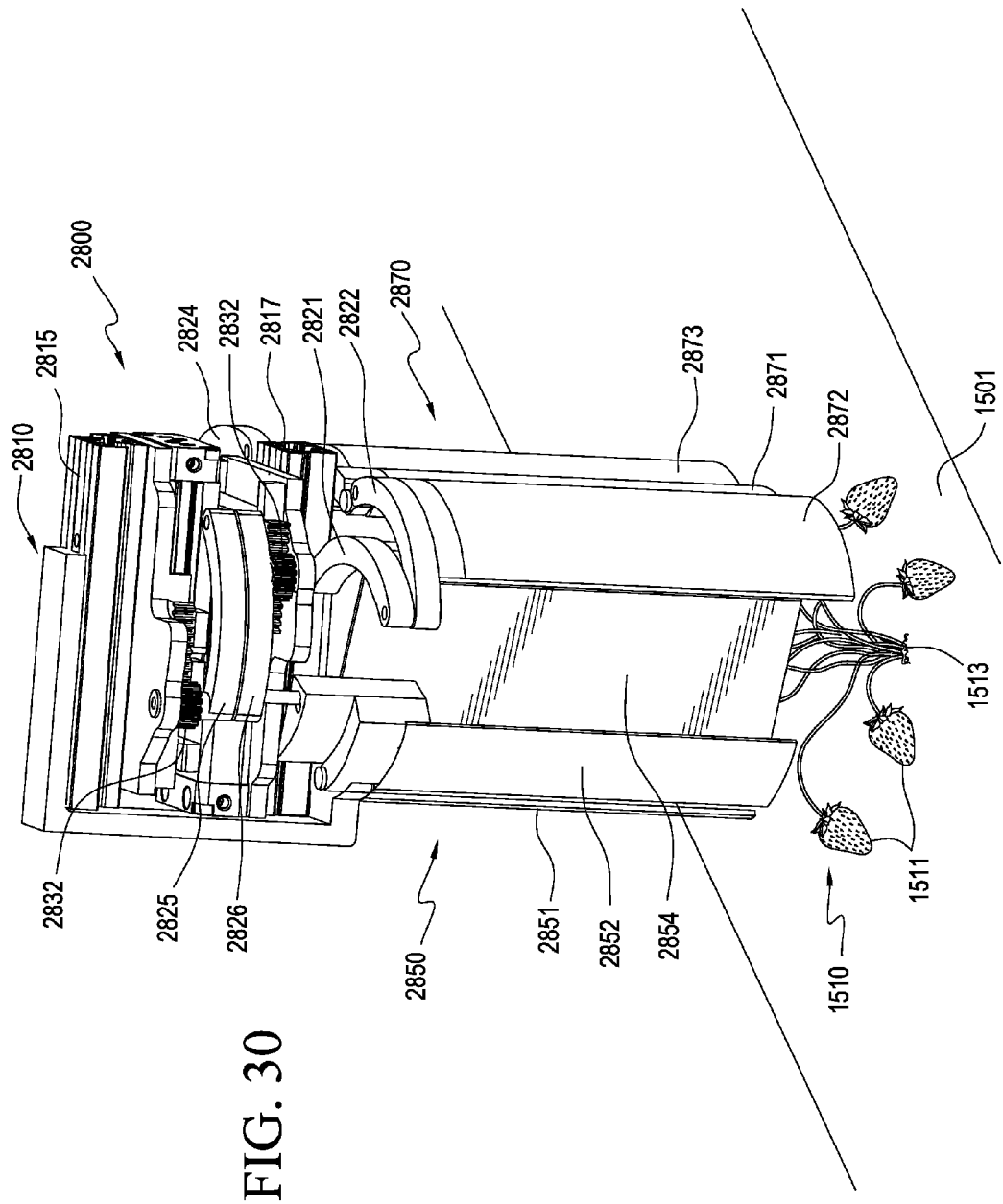
FIG. 30 illustrates a perspective view of the leaf displacement system of FIG. 28 hovering over the plant and growing bed of FIG. 15 and further transitioning from the open configuration to the closed configuration.
Figure 31:
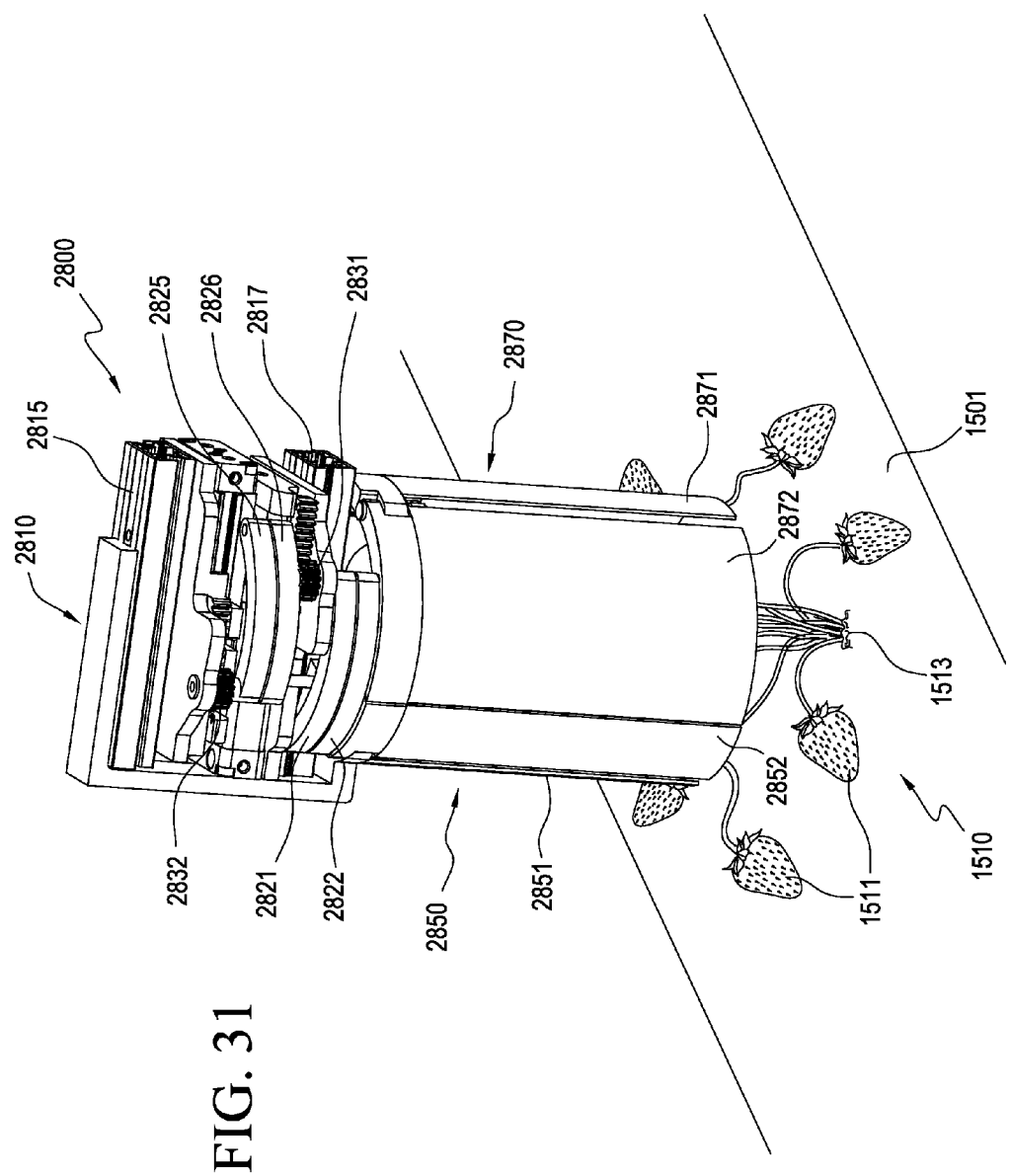
FIG. 31 illustrates a perspective view of the leaf displacement system of FIG. 28 hovering over the plant and growing bed of FIG. 15 in the closed configuration.

Turning ahead in the drawings, FIG. 28 illustrates a perspective view of a leaf displacement system 2800 hovering over plant 1501 in an open configuration. FIG. 29 illustrates a perspective view of leaf displacement system 2800 hovering over plant 1501 and beginning to transition from the open configuration to a closed configuration. FIG. 30 illustrates a perspective view of leaf displacement system 2800 hovering over plant 1501 and further transitioning from the open configuration to the closed configuration. FIG. 31 illustrates a perspective view of leaf displacement system 2800 hovering over plant 1501 in the closed configuration. Leaf displacement system 2800 is merely exemplary, and embodiments of the harvesting robot are not limited to embodiments presented herein. The leaf displacement system can be employed in many different embodiments or examples not specifically depicted or described herein. Leaf displacement system 2800 can be similar to foliage displacement mechanism 1400 (FIG. 14), and leaf displacement system can be configured to move foliage of a plant, such as foliage 1512 of plant 1510, to expose at least a portion of the crops under the foliage, which can allow imaging sensors 1290-1291 (FIGS. 12-13) and/or images sensors 2190-2191 (FIG. 21) to detect the crops and/or allow the grippers (e.g., 312-315 (FIGS. 3, 10-11), 2011-2015 (FIGS. 20-21), 2116 (FIG. 21)) to pick the crops, such as crops 1511.

In a number of embodiments, leaf displacement system 2800 can include a support structure 2810, a first assembly 2850, and/or a second assembly 2870. In many embodiments, first assembly 2850 and second assembly 2870 can each be movably coupled to support structure 2810, as shown in FIGS. 28-31. In other embodiments, one of first assembly 2850 and second assembly 2870 can be movably coupled to support structure 2810 and the other one of first assembly 2850 and second assembly 2870 can be fixedly coupled to support structure 2810. For example, leaf displacement system 2800 can include a first assembly rail 2815 to movably couple first assembly 2850 to support structure 2810 and allow first assembly 2850 to extend from and/or retract to support structure 2810. Leaf displacement system 2800 can include a second assembly rail 2817 to movably couple second assembly 2870 to support structure 2810 and allow second assembly 2870 to extend from and/or retract to support structure 2810. In several embodiments, support structure 2810 can include one or more motors (not shown) to drive the extension/retraction of first assembly 2850 along second assembly rail 2815 and/or the extension/retraction of second assembly 2870 along second assembly rail 2817.

In some embodiments, leaf displacement system 2800 can include two or more surfaces, which can be movable with respect to each other, and can push and/or hold foliage 1512 toward center 1513 of plant 1510. In some embodiments, for example, each of the two or more surfaces can be curved or flat surfaces, which can push foliage 1512 toward center 1513. As shown in FIG. 28, second assembly 2870 can include a second assembly base surface 2871, a second assembly first wing surface 2872, and a second assembly second wing surface 2873.

In many embodiments, second assembly base surface 2871 can be fixedly coupled to second assembly rail 2817, and second assembly first wing surface 2872 and second assembly second wing surface 2873 can each rotate with respect to second assembly base surface 2871. For example, in some embodiments, leaf displacement system 2800 can include arms 2821-2822 and gear 2831, with arm 2821 coupled to gear 2831 at one end of arm 2821 and coupled to arm 2822 at the other end of arm 2821, and arm 2822 coupled to arm 2821 at one end of arm 2822 and coupled to second assembly first wing surface 2872 at the other end of arm 2822, such that when gear 2831 rotates, second assembly first wing surface 2872 can be rotated. Similarly, leaf displacement system 2800 can include arms 2823-2824 and another gear (not shown), with arm 2823 coupled to the gear at one end of arm 2823 and coupled to arm 2824 at the other end of arm 2823, and arm 2824 coupled to arm 2823 at one end of arm 2824 and coupled to second assembly second wing surface 2873 at the other end of arm 2824, such that when the gear rotates, second assembly second wing surface 2873 can be rotated.

In some embodiments, leaf displacement system 2800 can rotate second assembly first wing surface 2872 and second assembly second wing surface 2873 when second assembly 2870 is extended and/or retracted along second assembly rail 2817. In many embodiments, as second assembly 2870 is retracted along second assembly rail 2817, second assembly base surface 2871, second assembly first wing surface 2872, and/or second assembly second wing surface 2873 can push foliage 1512 toward center 1513 of plant 1510.

As shown in FIG. 28, first assembly 2850 can include a first assembly base surface 2851, a first assembly first wing surface 2852, and a first assembly second wing surface 2853. In many embodiments, first assembly base surface 2851 can be fixedly coupled to first assembly rail 2815, and first assembly first wing surface 2852 and first assembly second wing surface 2853 can each rotate with respect to first assembly base surface 2851. For example, in some embodiments, leaf displacement system 2800 can include arms 2851-2826 and gear 2832, with arm 2825 coupled to gear 2833 at one end of arm 2825 and coupled to arm 2826 at the other end of arm 2825, and arm 2826 coupled to arm 2825 at one end of arm 2826 and coupled to first assembly first wing surface 2852 at the other end of arm 2826, such that when gear 2833 rotates, first assembly first wing surface 2852 can be rotated. Similarly, leaf displacement system 2800 can include a first arm (not shown), an arm 2828 and another gear (not shown), with the first arm coupled to the gear at one end of the first arm and coupled to arm 2828 at the other end of the first arm, and arm 2828 coupled to the first arm at one end of arm 2828 and coupled to first assembly second wing surface 2853 at the other end of arm 2828, such that when the gear rotates, first assembly second wing surface 2853 can be rotated.

In some embodiments, leaf displacement system 2800 can rotate first assembly first wing surface 2852 and first assembly second wing surface 2853 when first assembly 2850 is extended and/or retracted along first assembly rail 2815. In a number of embodiments, second assembly 2850 can include a first assembly first plate surface 2854 and/or a first assembly second plate surface 2855. In many embodiments, first assembly first plate surface 2854 can be fixedly coupled to first assembly first wing surface 2852, such that first assembly first plate surface 2854 can rotate when first assembly first wing surface 2852 is rotated. In various embodiments, first assembly second plate surface 2855 can be fixedly coupled to first assembly second wing surface 2853, such that first assembly second plate surface 2855 can rotate when first assembly second wing surface 2853 is rotated.

In many embodiments, as first assembly 2850 is retracted along first assembly rail 2815, first assembly base surface 2851, first assembly first plate surface 2854, and/or first assembly second plate surface 2855 can push foliage 1512 toward center 1513 of plant 1510. In many embodiments, first assembly base surface 2851, first assembly first wing surface 2852, first assembly second wing surface 2853, second assembly base surface 2871, second assembly first wing surface 2872, and second assembly second wing surface 2873 can each be rounded surfaces, such as a portion of a cylinder. In many embodiments, when leaf displacement system 2800 is in the closed configuration, as shown in FIG. 28, first assembly base surface 2851, first assembly first wing surface 2852, first assembly second wing surface 2853, second assembly base surface 2871, second assembly first wing surface 2872, and second assembly second wing surface 2873 can form a cylindrical shell that encloses first assembly first plate surface 2854, first assembly second plate surface 2855, and/or foliage 1512.

In several embodiments, second assembly first wing surface 2872 and second assembly second wing surface 2873 can each be larger than first assembly first wing surface 2852 and first assembly second wing surface 2853, to allow second assembly first wing surface 2872 and second assembly second wing surface 2873 to capture more of foliage 1512, as shown in FIG. 29. Because first assembly first wing surface 2852 and first assembly second wing surface 2853 are smaller, and unable to capture as much of foliage 1512, first assembly first plate surface 2874 and first assembly second plate surface 2855 can be used by first assembly 2850 to capture more of foliage 1512, as shown in FIG. 29. In many embodiments, first assembly first plate surface 2874 and first assembly second plate surface 2855 can capture foliage 1512 and sweep foliage 1512 within the cylindrical shell shown in FIG. 31. As partially shown in FIG. 30 by first assembly first plate surface 2854, as first assembly first plate surface 2854 and first assembly second plate surface 2855 are rotated inward as leaf displacement system 2800 transitions from the open configuration (as shown in FIG. 28) to the closed configuration (as shown in FIG. 31), first assembly first plate surface 2854 and first assembly second plate surface 2855 can sweep within second assembly first wing surface 2872 and second assembly second wing surface 2873, such that when leaf displacement system 2800 is in the closed configuration, as shown in FIG. 30, first assembly first plate surface 2854 and first assembly second plate surface 2855 can be fully enclosed within the cylindrical shell described above.

In many embodiments, foliage 1512 can be held within a circumference to expose crops 1511, and allow a harvesting robot (e.g., 100 (FIG. 1), 2000 (FIG. 20)) to rotate around plant 1510 and detect and pick crops 1511 without interference from foliage 1512. In many embodiments, the circumference can be dictated by the type of plant being harvested. For example, in some plants, such as strawberry plants, the circumference can be no more than approximately 8 inches (20.32 centimeters (cm)), 7 inches (17.78 cm), 6 inches (15.24 cm), 5 inches (12.7 cm), or another suitable circumference. For other plants, the circumference can be another suitable circumference.

In many embodiments, foliage displacement system 2800 can be carried such that a bottommost of foliage displacement system 2800, such as a bottommost part of first assembly base surface 2851, first assembly first wing surface 2852, first assembly second wing surface 2853, first assembly first plate surface 2874, first assembly second plate surface 2855, second assembly base surface 2871, second assembly first wing surface 2872, and/or second assembly second wing surface 2873 can be a first distance from growing bed 1501 when leaf displacement system 2800 transitions from the open configuration (shown in FIG. 28) to the closed configuration (shown in FIG. 31). In many embodiments, the distance can be dependent on the size of the crops (e.g., 1511) and/or the typical size of the foliage (e.g., 1512) when the crops are being harvested, such that the crops (e.g., 1511) are not captured by leaf displacement system 2800, but the foliage (e.g., 1512) is captured. For example, in some embodiments, such as when the crops are strawberries, the distance can be approximately 2 inches (5.08 cm) to 4 inches (10.16 cm). In other embodiments, the distance can be approximately 2.5 inches (6.35 cm) or approximately 3.0 inches (7.62 cm). In other embodiments, the distance can be another suitable distance.

In many embodiments, leaf displacement system 2800 can be held below carrier assembly 2070 (FIGS. 20-21) of harvesting robot 2000 (FIG. 20) or carrier assembly 170 (FIG. 1) of harvesting robot 100 (FIG. 1). For example, leaf displacement system 2800 can be held between mounting bearing 2074 (FIG. 20) and plant 1510 when mounting bearing 2074 is centered over plant 1510. In many embodiments, can be held stationary such that leaf displacement system 2800 does not rotate with respect to plant 1510 when harvesting robot 2000 (FIG. 20) or harvesting robot 100 (FIG. 1) rotates around plant 1510 to detect and pick crops, which can beneficially hold foliage 1512 in place without leaf displacement system 2800 damaging foliage 1512 or getting caught on foliage 1512.

In many embodiments, when the harvesting robot (e.g., 100 (FIG. 1), 2000 (FIG. 20)) corresponding to leaf displacement system 2800 approaches plant 1510, such as a plant along a row of plants, leaf displacement system 2800 can be in the open configuration, as shown in FIG. 28, and/or first assembly 2850 can be disposed on one side of plant 1510 and second assembly 2870 can be disposed on the opposite side of plant 1510, as shown in FIG. 28, which can beneficially allow the harvesting robot (e.g., 100 (FIG. 1), 2000 (FIG. 20)) and support structure 2810 of leaf displacement system 2800 to approach plant 1510 and become centered over plant 1510, after which leaf displacement system can transition from the open configuration to the closed configuration. After the harvesting robot (e.g., 100 (FIG. 1), 2000 (FIG. 20)) has finished rotating around plant 1510 (and finished detecting and picking crops on plant 1510), leaf detection system 2800 can transition from the closed configuration (as shown in FIG. 31) to the open configuration (as shown in FIG. 28).

In other embodiments, a leaf displacement system can have other configurations. For example, a base surface can be surrounded by two wing surfaces, which can each rotate with respect to the base surface and can capture foliage 1512 within the base surface the two wing surfaces, to close in a triangular shape and hold foliage 1512.

Figure 32:
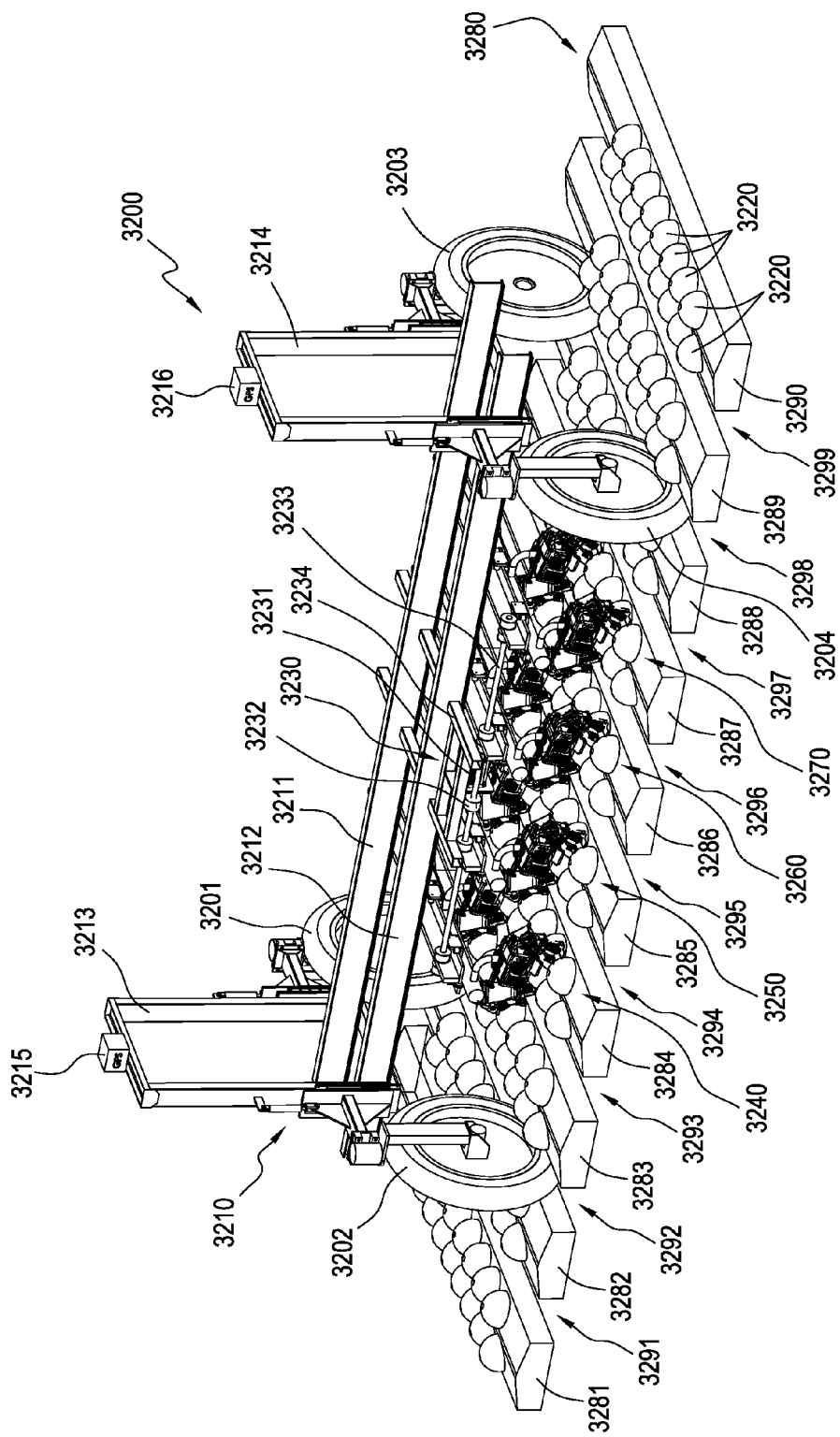
FIG. 32 illustrates a top, rear, left side perspective view of a portion of a harvesting vehicle, according to an embodiment, traveling through rows of plant beds.
Figure 33:
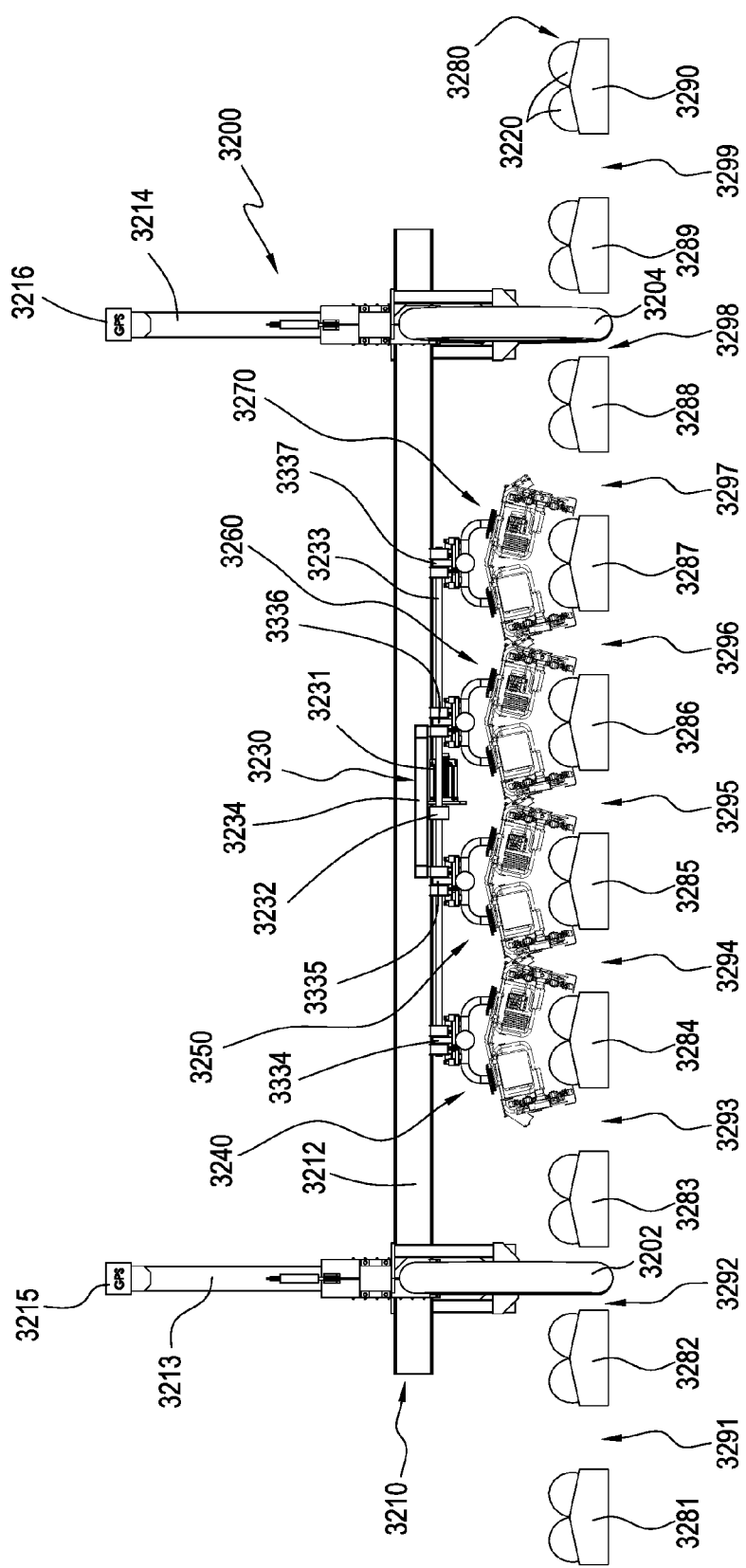
FIG. 33 illustrates a rear view of the portion of the harvesting vehicle of FIG. 32 traveling through the rows of plant beds of FIG. 32.
Figure 34:
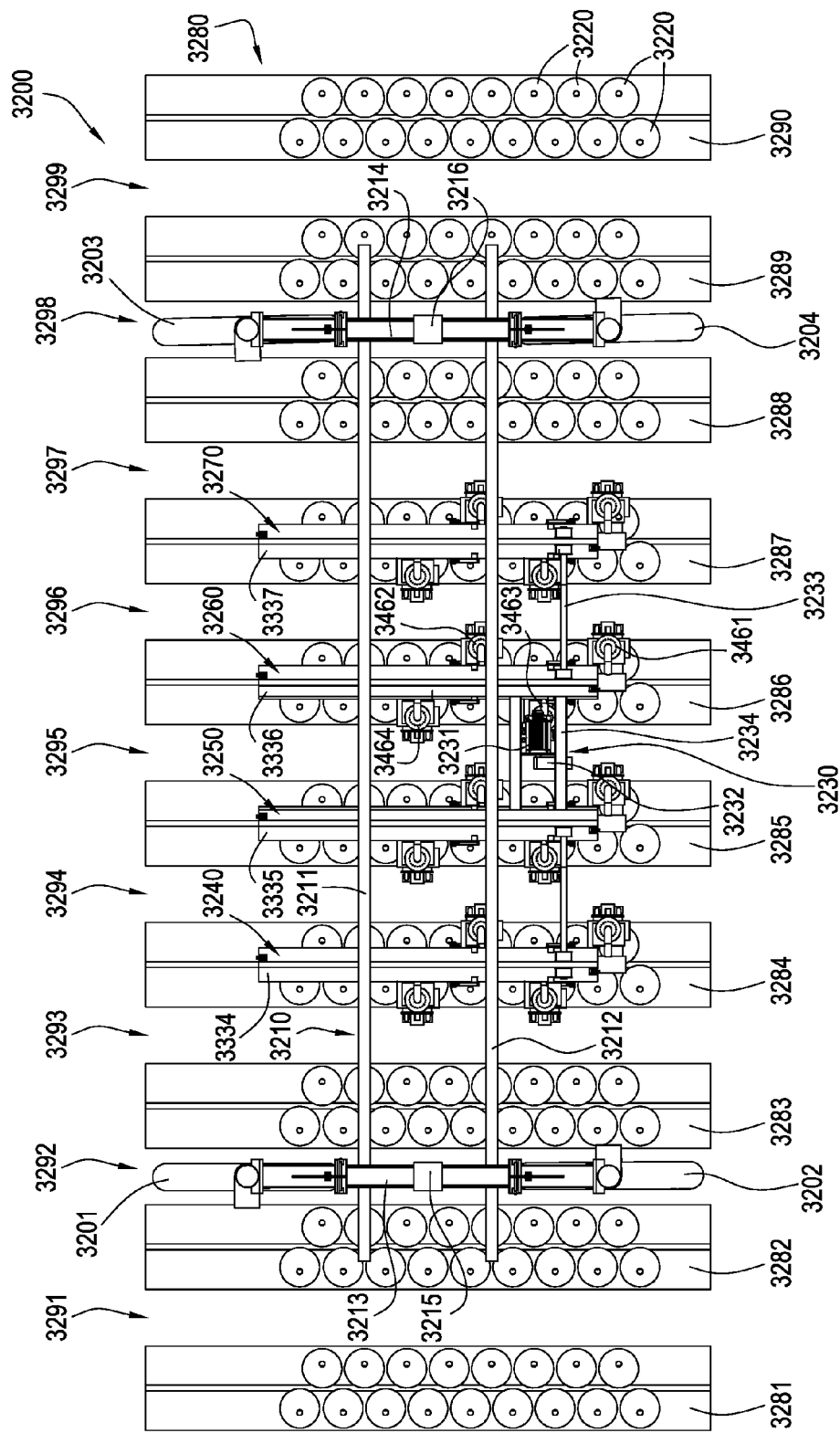
FIG. 34 illustrates a top view of the portion of the harvesting vehicle of FIG. 32 traveling through the rows of plant beds of FIG. 32.

Turning ahead in the drawings, FIG. 32 illustrates a top, rear, left side perspective view of a harvesting vehicle 3200 traveling through rows of plant beds 3280. FIG. 33 illustrates a rear view of harvesting vehicle 3200 traveling through rows of plant beds 3280. FIG. 34 illustrates a top view of harvesting vehicle 3200 traveling through rows of plant beds 3280. Harvesting vehicle 3200 is merely exemplary, and embodiments of the harvesting vehicle are not limited to embodiments presented herein. The harvesting vehicle can be employed in many different embodiments or examples not specifically depicted or described herein.

The rows of plant beds can include plant beds 3281-3290 which can be spaced apart to form rows 3291-3299. Plant beds 3281-3290 can include rows of plants, such as plants 3220. In some embodiments, plant beds 3280-3290 can be slightly angled, such as on each side of each of plant beds 3280-3290 to assist with water run-off. In many embodiments, each angled side of the bed can include rows of plants. Plants 3220 can be a strawberry plant, a tomato plant, a pepper (e.g., bell peppers, chili peppers, etc.) plant, an orange tree, or another suitable plant.

In many embodiments, harvesting vehicle 3200 can be used to harvest plants 3220. In many embodiments, harvesting vehicle 3200 can include wheels, such as wheels 3201-3204 and a body 3210. In many embodiments, the wheels can rolls along rows (e.g., 3291-3299) between the plant beds (e.g., 3281-3290). For example, in some embodiments, wheels 3201-3202 can roll along row 3292 and wheels 3203-3204 can roll along row 3298, such that harvesting vehicle 3200 straddles six plant beds (e.g., plant beds 3283-3288), and can be used to harvest four plant beds (e.g., plant beds 3284-3287) at a time. In other embodiments, harvesting vehicle 3200 can straddle more or fewer plant beds and can harvest more or fewer plant beds at a time. In the embodiment illustrated in FIG. 32, rows 3291-3299 can be straight, but in a different embodiment, the rows can be curved.

In many embodiments, body 3210 can include frame pieces 3211-3212, which in some embodiments can be I-beams or other suitable frame pieces to provide support for body 3210 across the plant beds (e.g., 3283-3288) straddled by body 3210. In several embodiments, body 3210 can include arms 3213 and 3214 on each side of harvesting vehicle 3200, which can include global positioning system (GPS) receivers 3215 and 3216, respectively.

In a number of embodiments, body 3210 can include robot positioning carrier (RPC) tracks 3334-3337 (FIGS. 33-34). In many embodiments, RPC tracks 3334-3337 can carry robot positioning carriers (RPCs) 3240, 3250, 3260, and 3270, respectively. In many embodiments, each RPC can carry robots, such as harvesting robots 3461-3464 (FIG. 34), as explained in greater detail below. In several embodiments, body 3210 can include an RPC drive system 3230, which can control the position of RPCs 3240, 3250, 3260, and 3270 with respect to RPC tracks 3334-3337.

In many embodiments, RPC drive system 3230 can include an RPC motor 3231, an RPC drive block 3232, an RPC drive shaft 3233, and an RPC frame 3234. In a number of embodiments, RPC drive frame 3234 can be mounted to body 3210, such as to frame pieces 3211-3212. In several embodiments, RPC motor 3231 can be mounted to RPC drive frame 3234, and can drive RPC drive block 3232 to rotate RPC shaft 3233. In many embodiments, RPC shaft 3233 can extend through each of RPC tracks 3334-3337 to control the position of RPCs 324, 3250, 3260, and 3270 with respect to RPC tracks 3334-3337, as explained below in greater detail.

Figure 35:
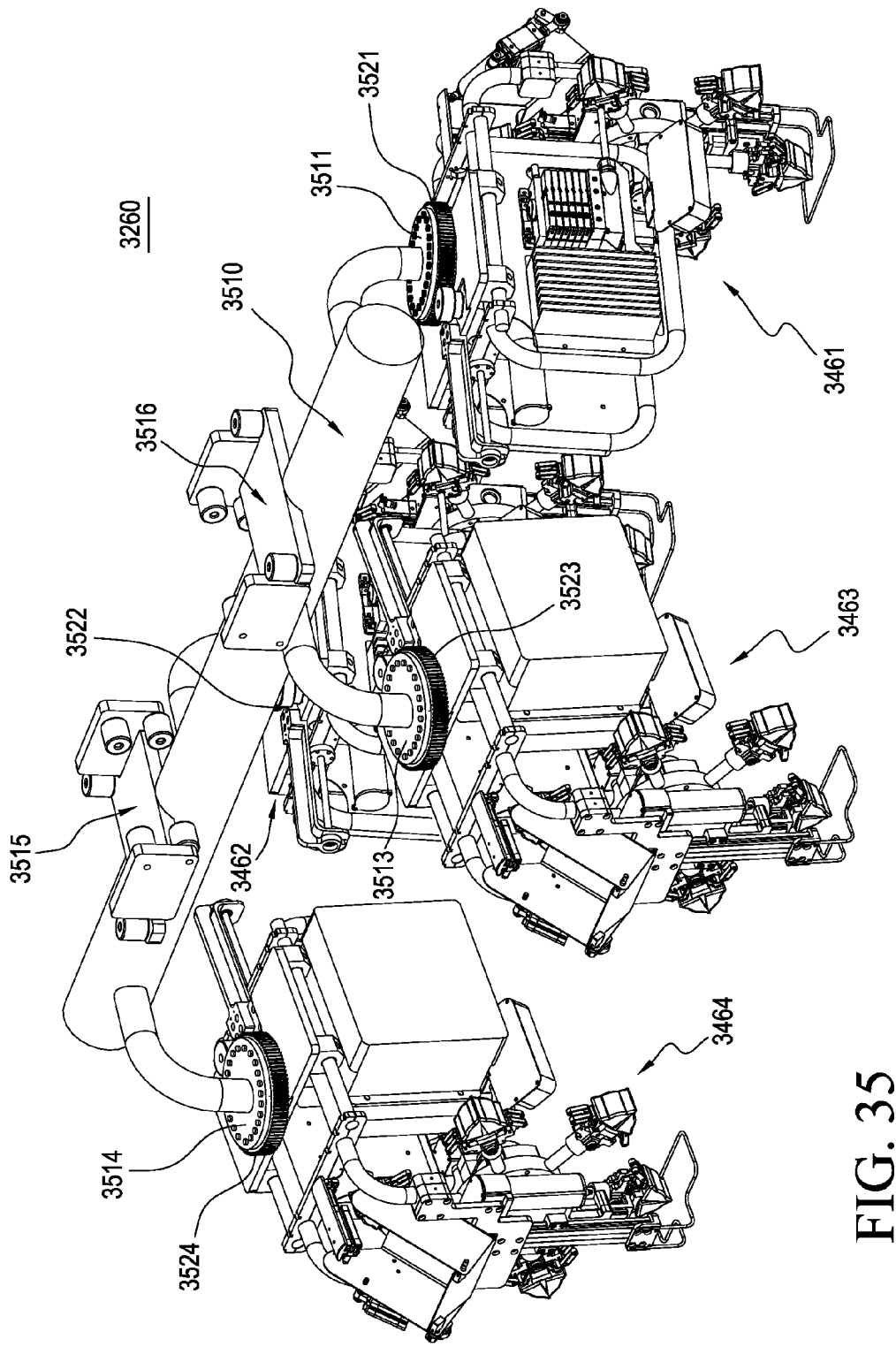
FIG. 35 illustrates a top, rear, right side perspective view of a robot positioning carrier (RPC) of FIG. 32.
Figure 36:
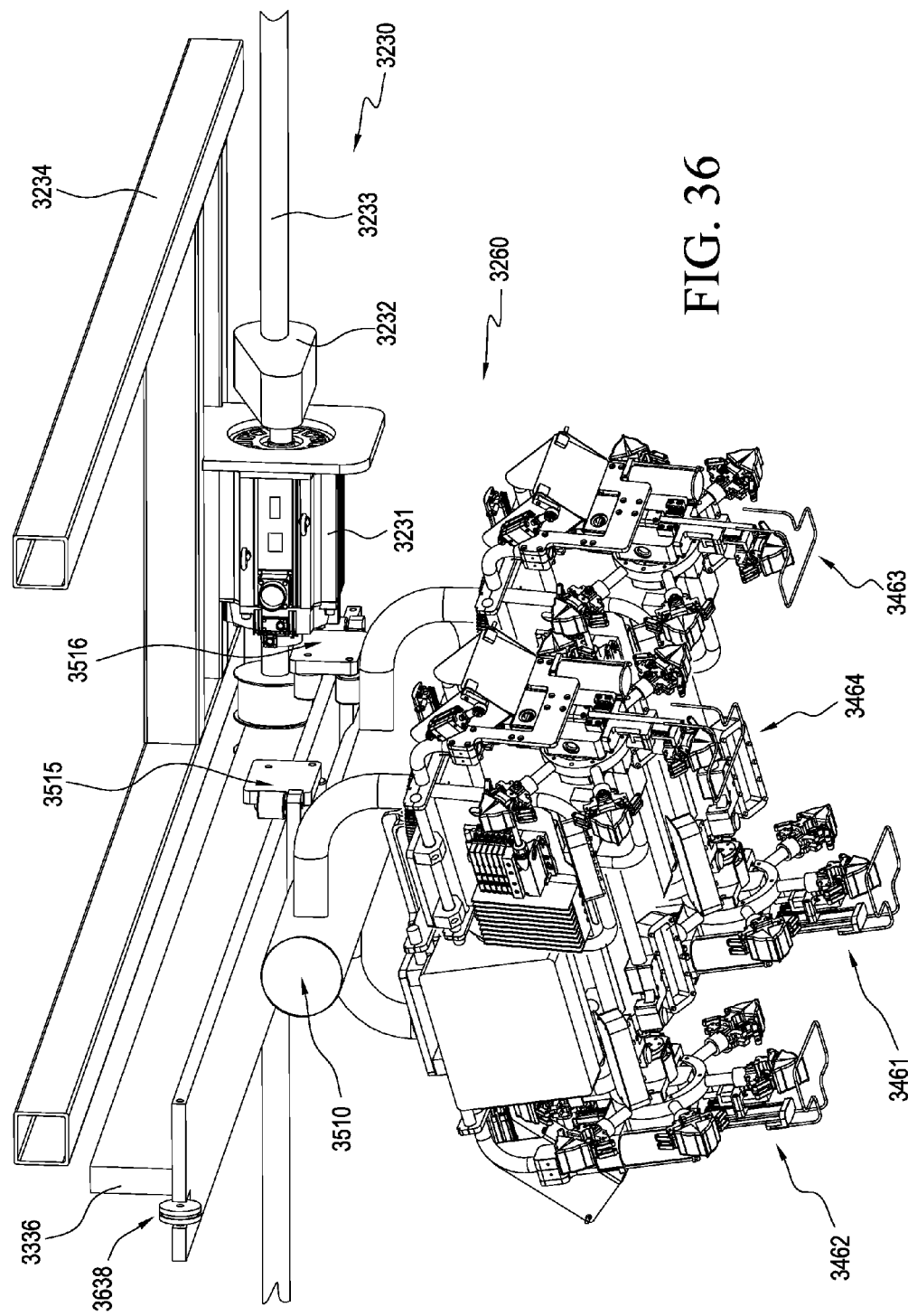
FIG. 36 illustrates a bottom, front, right side view of the RPC of FIG. 32 being carried by an RPC track of FIG. 33 and showing a portion of an RPC drive system of FIG. 32.
Figure 37:
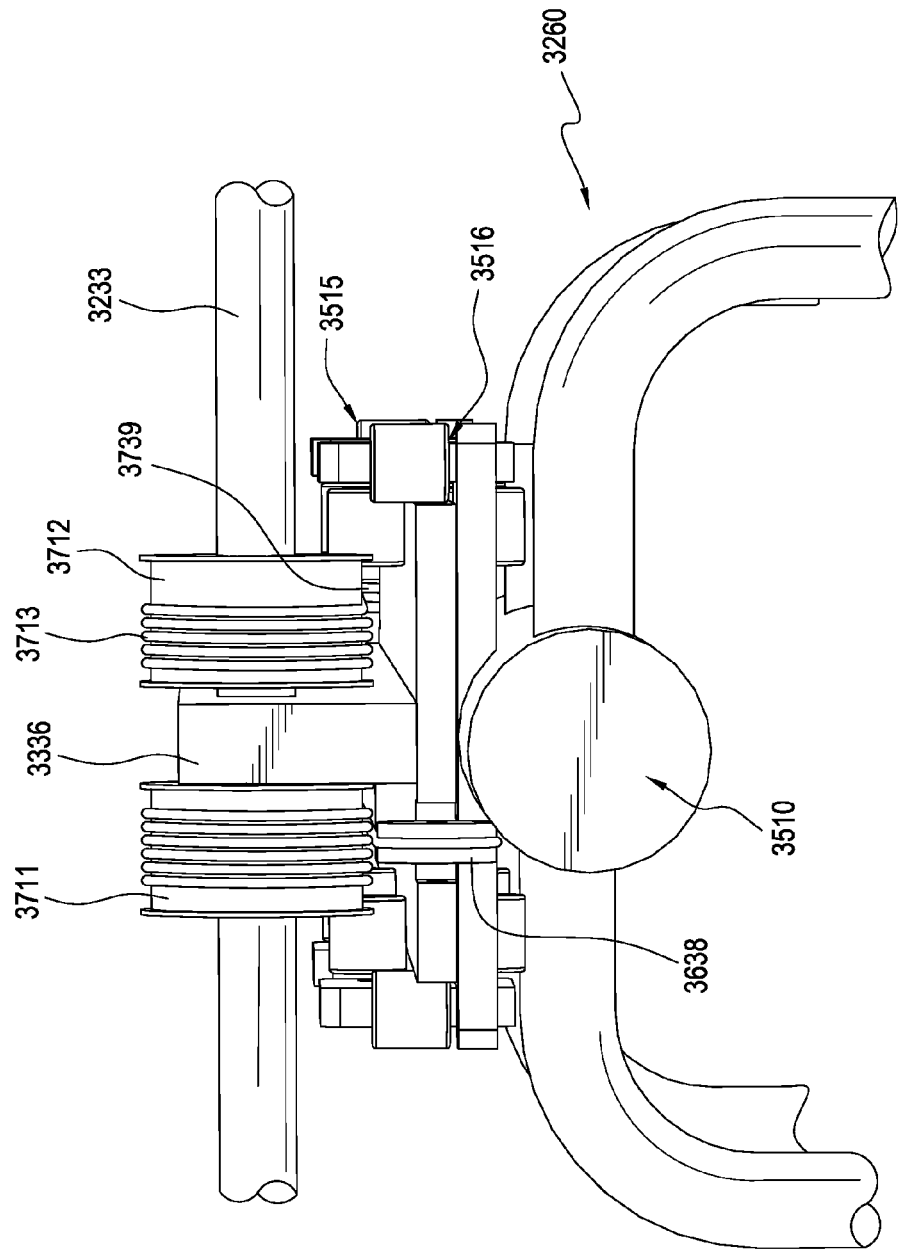
FIG. 37 illustrates a rear view of a portion of the RPC of FIG. 32 being carried by the RPC track of FIG. 33 and showing a drive mechanism of the RPC of FIG. 32 using an RPC drive shaft of FIG. 32.

Turning ahead in the drawings, FIG. 35 illustrates a top, rear, right side perspective view of RPC 3260. FIG. 36 illustrates a bottom, front, right side view of RPC 3260 being carried by RPC track 3336 and showing a portion of RPC drive system 3230. FIG. 37 illustrates a rear view of a portion of RPC 3260 being carried by RPC track 3336 and showing a drive mechanism of RPC 3260 using RPC drive shaft 3233. RPC 3260 is merely exemplary, and embodiments of the RPC are not limited to embodiments presented herein. The RPC can be employed in many different embodiments or examples not specifically depicted or described herein. RPC drive system 3230 is merely exemplary, and embodiments of the RPC drive system are not limited to embodiments presented herein. The RPC drive system can be employed in many different embodiments or examples not specifically depicted or described herein.

In many embodiments, each RPC (e.g., 3240, 3250, 3260, 3270) can be the same as each other, such as RPC 3260. In many embodiments, RPC 3260 can carry harvesting robots 3461-3464, which can be similar or identical to harvesting robot 100 (FIG. 1) and/or harvesting robot 2000 (FIG. 20). In some embodiments, each harvesting robot (e.g., 3461-3464) can be include a mounting bearing, such as mounting bearings 3521-3524, respectively. Mounting bearings 3521-3524 can be similar or identical to mounting bearings 1274 (FIG. 12) and/or 2074 (FIG. 20). In many embodiments, RPC 3260 can include a carrier frame 3510, which can include mounting pieces 3511-3514, which can attached to mounting bearings 3521-3524, respectively. In many embodiments, mounting pieces 3511-3514 can be modular attachment pieces, which can be removably coupled to harvesting robots 3461-3464, respectively, such as to quickly replace a harvesting robot (e.g., 3461-3464) in case of malfunction, or to attach different types of robots, such as hole punching robots, as described below in further detail.

In several embodiments, RPC 3260 can carry four robots, as shown in FIGS. 35-36. In other embodiments, RPC 3260 can carry another number of robots, such as 1, 2, 3, 5, 6, 7, 8, 9, 10, 11, 12, or another suitable number of robots. By carrying multiple robots, RPC 3260 can position multiple robots in place to each simultaneously perform tasks, such as harvesting plants or other suitable tasks. In many embodiments, RPC 3260 can position the robots such that the robots can perform the tasks simultaneously and independently without interfering with the other robots. For example, as shown in FIGS. 35-36, RPC 3260 can space the robots two on each side, with interleaved spacing, as further shown in FIG. 39 and described below.

In many embodiments, for ease of service, each robot (e.g., 3461-3464) can have its own self-contained controller and processors, which can have communications and/or power connections to the rest of the harvesting vehicle (e.g., 3200 (FIGS. 32-34)). Each one of these robots can include motor controls, position sensors, solenoid controls, cameras, vision processing, strobe controls, and/or other suitable components. The robots (e.g., 3461-3464) can act like a hive of bees that are orientated to perform certain tasks or functions when cued and report back when completed so that the higher-level system in the harvesting vehicle (e.g., 3200 (FIGS. 32-34)) can perform next steps. In many embodiments, the robots (e.g., 3461-3464) can perform these basic functions simultaneously and independently when commanded. In case of the malfunction of one of the robots (e.g., 3461-3464), it is advantageous to be able to trade out the robot (e.g., 3461-3464) quickly so that the rest of the robots (e.g., 3461-3464) can continue working. A quick change-out system for the robots (e.g., 3461-3464) can be implemented by minimizing the electrical and mechanical connections it takes to replace a robot (e.g., 3461-3464). By including multiple RPCs (e.g., 3240, 3250, 3260, 3270 (FIGS. 32-34)) each with multiple robots (e.g., 3461-3464) on harvesting vehicle 3200 (FIGS. 32-34), harvesting vehicle 3200 (FIGS. 32-34) can perform multiple operations (e.g., picking, hole punching) on multiple rows during picking operations, increasing picking efficiency of harvesting vehicle 3200 (FIGS. 32-34). For example, harvesting vehicle 3200 (FIGS. 32-34) show in FIGS. 32-34 includes 16 different harvesting robots, which can pick crops on 16 different plants simultaneously. In other embodiments, harvesting vehicle 3200 (FIGS. 32-34) can include more or fewer harvesting robots and/or robots of a different type (e.g., hole punching robots or other suitable robots).

In many embodiments, carrier frame 3510 of RPC 3260 can include track coupling mechanisms 3515 and 3516, which can be configured to slidably couple to RPC track 3336. For example, track coupling mechanisms 3515-3516 can each include a number of wheels to couple RPC 3260 to RPC track 3336 and facilitate movement of RPC 3260 with respect to RPC track 3336, as shown in FIG. 36.

In many embodiments, RPC drive shaft 3230 can extend through each RPC track, such as RPC track 3336, and can include two drums on each side of the RPC track, such as drums 3711 and 3712 (FIG. 37) on each side of RPC track 3336. In several embodiments, track 3336 can include a track wheel 3638 (FIGS. 36-37) at one end of RPC track 3336 and a track wheel 3739 (FIG. 37) at the other end of RPC track 3336. In some embodiments, track wheel 3638 can be of a one side of RPC track 3336, such as on the same side as drum 3711, and track wheel 3739 can be on the other side of RPC track 3336, such as drum 3712.

As shown in FIG. 37, in several embodiments, a cable 3713 (FIG. 37, not shown in other FIGS. for clarity) can be wrapped around drum 3711, extend from the front side of drum 3711 under drum 3711 and be wound around track wheel 3638, extend under RPC track 3336 to track wheel 3739, and be wound around track wheel 3739 to extend under and around drum 3712. In many embodiments, cable 3712 can be attached to RPC 3260 under RPC track 3336, such as on carrier frame 3510 (attachment not shown). In many embodiments, cable 3713 can create a positive engagement system, such that when RPC drive shaft 3233 rotates in a first rotational direction and rotates drums 3711-3712 in the first rotational direction, drum 3711 can further wind cable 3713 while drum 3712 unwinds cable 3713, which can result in cable 3713 moving RPC 3260 in a rearward direction. Similarly, when RPC drive shaft 3233 rotates in a second direction and rotates drums 3711-3712 in the second rotational direction, drum 3712 can further wind cable 3713 while drum 3711 unwinds cable 3713, which can result in cable 3713 moving RPC 3260 in a frontward direction. As shown in FIG. 36, RPC motor 3231 can use RPC drive block to drive RPC drive shaft 3230 in either rotational direction.

In many embodiments, each RPC (e.g., 3240, 3250, 3260, 3270 (FIGS. 32-34)) on harvesting vehicle 3200 can be driven by RPC drive shaft 3233, which is in common, and which can move and position each RPC (e.g., 3240, 3250, 3260, 3270 (FIGS. 32-34)) together to the same position above the different plant beds (e.g., 3284-3287 (FIGS. 32-34)).

Figure 38:
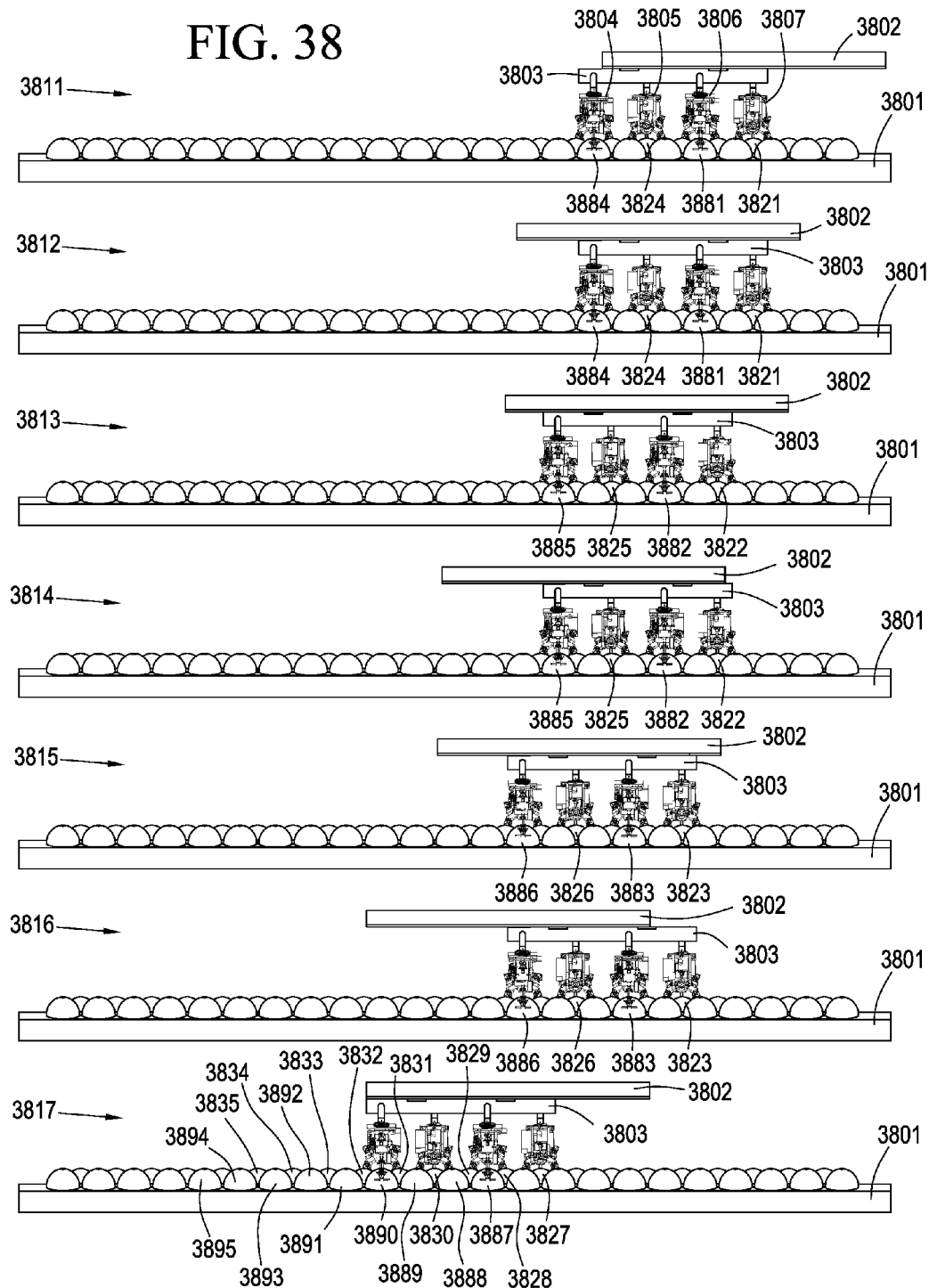
FIG. 38 illustrates a set of time views over time showing side views of a progression of an RPC on a track over a plant bed, according to an embodiment.
Figure 39:
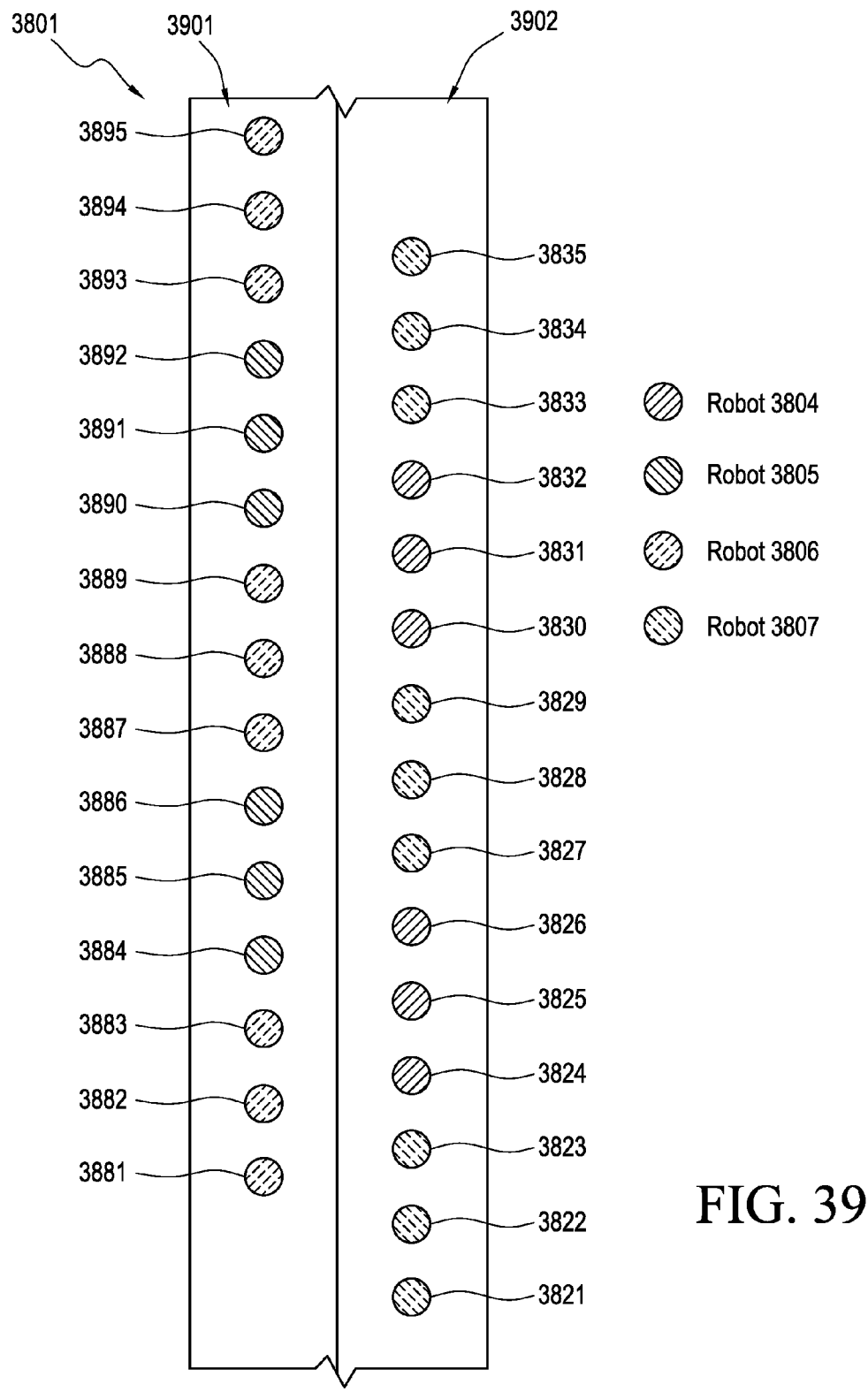
FIG. 39 illustrates a schematic of a portion of the plant bed of FIG. 38, showing the position of robots carried by the RPC of FIG. 38 over time.

Turning ahead in the drawings, FIG. 38 illustrates a set of time views 3811-3817 over time showing side views of a progression of an RPC 3803 on a track 3802 over a plant bed 3801. FIG. 39 illustrates a schematic of a portion of plant bed 3801, showing the position of robots carried by RPC 3803 over time. RPC 3803 can be similar or identical to RPCs 3240, 3250, 3260, or 3270 (FIGS. 32-34). Track 3802 can be similar or identical to RPC tracks 3334-3337 (FIGS. 33-34). In many embodiments, RPC 3802 can carry robots 3804-3807, which can each by similar or identical to harvesting robot 100 (FIG. 1) or harvesting robot 2000 (FIG. 1), or another suitable robot. For example, robots 3804-3807 can be hole punching robots. Time views 3811-3817 can proceed sequentially, showing the progression of RPC 3803 and track 3802 over plant bed 3801.

Plant bed can include a plant row 3901 (FIG. 39) and a plant row 3902 (FIG. 39), which can each be a straight or curved row of plants. For example, plant row 3901 can include plants 3881-3895 and plant row 3902 can include plants 3821-3835. In some embodiments, robots 3804-3807 can pick plants 3881-3895 and 3821-3835, based on the pattern legend shown in FIG. 39, and as described below in further detail.

In many embodiments, track 3802 be attached to a vehicle, such as harvesting vehicle 3200 (FIGS. 32-34), or another suitable vehicle. In many embodiments, the vehicle can proceed at an approximately constant velocity, such that track 3802 proceeds at an approximately constant velocity in a first direction (e.g., right to left in FIG. 38) with respect to plant bed 3801. In many embodiments, RPC 3803 can move with respect to track 3802, such as explained above for RPC 3260 and RPC track 3336 in connection with FIGS. 36-37. In many embodiments, the movement of RPC 3803 with respect to track 3802 can beneficially keep robots 3804-3807 in a stationary position with respect to plant bed 3801.

As shown in FIG. 38, time views 3811 and 3812 are progressive time views during a first time period in which RPC 3803 is held in a first carrier position and stationary with respect to plant bed 3801 while track 3802 moves in the first direction with respect to plant bed 3801. While in the first carrier position, the robots (e.g., 3804-3807) can be carried in a stationary manner at a first set of robot positions, such that robot 3807 is carried in a stationary manner at plant 3821, robot 3806 is carried in a stationary manner at plant 3881, robot 3805 is carried in a stationary manner at plant 3824, and robot 3804 is carried in a stationary manner at plant 3884. As shown in time views 3811 and 3812, RPC 3803 is held in the first carrier position and the first set of robot positions remains constant as track 3802 proceeds in the first direction. To achieve this station-keeping of RPC 3803, RPC 3803 can move with respect to track 3802 in a second direction that is opposite the first direction at the same velocity that track 3802 moves in the first direction with respect to plant bed 3801.

At a time period extending between the time views shown in time views 3812-3813, RPC 3802 can move from the first carrier position to a second carrier position. The movement of RPC 3802 from the first carrier position to the second carrier position can be an adjacent progression. Adjacent progression can refer to the robots moving to a position immediately next to the previous position, such as moving to the next plant in a row of plants. To achieve this adjacent progression of RPC 3803, RPC 3803 can move with respect to track 3802 in the first direction while track 3802 continues to move in the first direction respect to plant bed 3801, such that RPC 3803 moves fasted in the first direction with respect to plant bed 3801 than track 3802 moves in the first direction with respect to plant bed 3801.

Time views 3813 and 3814 are progressive time views during a second time period in which RPC 3803 is held in the second carrier position and stationary with respect to plant bed 3801 while track 3802 moves in the first direction with respect to plant bed 3801. While in the second carrier position, the robots (e.g., 3804-3807) can be carried in a stationary manner at a second set of robot positions, such that robot 3807 is carried in a stationary manner at plant 3822, robot 3806 is carried in a stationary manner at plant 3882, robot 3805 is carried in a stationary manner at plant 3825, and robot 3804 is carried in a stationary manner at plant 3885. As shown in time views 3813 and 3814, RPC 3803 is held in the second carrier position and the second set of robot positions remains constant as track 3802 proceeds in the first direction. To achieve this station-keeping of RPC 3803, RPC 3803 can move with respect to track 3802 in a second direction that is opposite the first direction at the same velocity that track 3802 moves in the first direction with respect to plant bed 3801.

At a time period extending between the time views shown in time views 3814-3815, RPC 3802 can move from the second carrier position to a fourth carrier position. The movement of RPC 3802 from the second carrier position to the fourth carrier position can be an adjacent progression. To achieve this adjacent progression of RPC 3803, RPC 3803 can move with respect to track 3802 in the first direction while track 3802 continues to move in the first direction respect to plant bed 3801, such that RPC 3803 moves fasted in the first direction with respect to plant bed 3801 than track 3802 moves in the first direction with respect to plant bed 3801.

Time views 3815 and 3816 are progressive time views during a fourth time period in which RPC 3803 is held in the fourth carrier position and stationary with respect to plant bed 3801 while track 3802 moves in the first direction with respect to plant bed 3801. While in the fourth carrier position, the robots (e.g., 3804-3807) can be carried in a stationary manner at a fourth set of robot positions, such that robot 3807 is carried in a stationary manner at plant 3823, robot 3806 is carried in a stationary manner at plant 3883, robot 3805 is carried in a stationary manner at plant 3826, and robot 3804 is carried in a stationary manner at plant 3886. As shown in time views 3815 and 3816, RPC 3803 is held in the fourth carrier position and the fourth set of robot positions remains constant as track 3802 proceeds in the first direction. To achieve this station-keeping of RPC 3803, RPC 3803 can move with respect to track 3802 in a second direction that is opposite the first direction at the same velocity that track 3802 moves in the first direction with respect to plant bed 3801.

At a time period extending between the time views shown in time views 3816-3817, RPC 3802 can move from the fourth carrier position to a third carrier position. The movement of RPC 3802 from the fourth carrier position to the third carrier position can be a leap-frog progression. Leap-frog progression can refer to the robots moving to a position that is not immediately next to the previous position and which skips (or "leap over") other positions that have already been serviced, such as moving from a plant in a row of plants to another plant in a row of plants that is beyond other plants that have already been picked. To achieve this leap-frog progression of RPC 3803, RPC 3803 can move with respect to track 3802 in the first direction while track 3802 continues to move in the first direction respect to plant bed 3801, such that RPC 3803 moves fasted in the first direction with respect to plant bed 3801 than track 3802 moves in the first direction with respect to plant bed 3801. In many embodiments, RPC 3803 can move faster in the first direction with respect to track 3802 during the leap-frog progression than during the adjacent progression.

Time view 3817 is a time view during a third time period in which RPC 3803 is held in the third carrier position and stationary with respect to plant bed 3801 while track 3802 moves in the first direction with respect to plant bed 3801. While in the third carrier position, the robots (e.g., 3804-3807) can be carried in a stationary manner at a third set of robot positions, such that robot 3807 is carried in a stationary manner at plant 3827, robot 3806 is carried in a stationary manner at plant 3887, robot 3805 is carried in a stationary manner at plant 3830, and robot 3804 is carried in a stationary manner at plant 3890. RPC 3803 is held in the third carrier position and the third set of robot positions remains constant as track 3802 proceeds in the first direction. To achieve this station-keeping of RPC 3803, RPC 3803 can move with respect to track 3802 in a second direction that is opposite the first direction at the same velocity that track 3802 moves in the first direction with respect to plant bed 3801. In many embodiments, the process can repeat similarly as explained in the progression of time views 3811-3817 in the progressed robot positions to continue positioning the robots at progressed plant positions for plants 3828, 3829, 3831-3835, and so forth for plant row 3902, for plants 3888, 3889, 3891-3895, and so forth for plant row 3901.

At each set of robot positions, the robots (e.g., 3804-3807) can perform tasks simultaneously. For example, if robots 3804-3807 are harvesting robots (e.g., harvesting robot 100 (FIG. 1), harvesting robot 2000 (FIG. 20)), robots 3804-3807 can each independently and simultaneously rotate around the plants at the set of robot positions to detect and pick crops from the plants. In many embodiments, the times at which the robots (e.g., 3804-3807) are kept at each of the set of robot positions can depend on the nature of the task. For example, for picking crops using harvesting robots, RPC 3803 can remain at each set of robot positions for a set time, such as 8 seconds, or another suitable time required for picking crops. For another type of robots, such as hole-punching robots, the time at each position can be shorter, such as 1 second, or another suitable time period. In many embodiments, the movement from a set of robot positions to the next set of robot positions for an adjacent progression can be a suitable time required to move RPC 3803 to the next set of robots positions. For example, for picking crops using harvesting robots, RPC 3803 can perform the adjacent progression during a set time, such as 1.5 seconds, or another suitable time required for moving RPC 3803 in the adjacent progression. In many embodiments, the movement from a set of robot positions to the next set of robot positions for a leap-frog progression can be a suitable time required to move RPC 3803 to the next set of robots positions when leap-frogging other sets of robot positions. For example, for picking crops using harvesting robots, RPC 3803 can perform the leap-frog progression during a set time, such as 2.5 seconds, or another suitable time required for picking crops, or another suitable time required for moving RPC 3803 in the leap-frog progression.

In many embodiments, the station-keeping of RPC 3803 in each set of robot positions can advantageously allow the vehicle (e.g., harvesting vehicle 3200 (FIGS. 32-34) to move at an approximately constant velocity, such that the vehicle does not need to start and stop between each set of robot positions, and such that the vehicle can avoid wasted time required to start and stop and the large amount of wasted energy necessary to accelerate and decelerate the vehicle at each start and stop.

Figure 40:
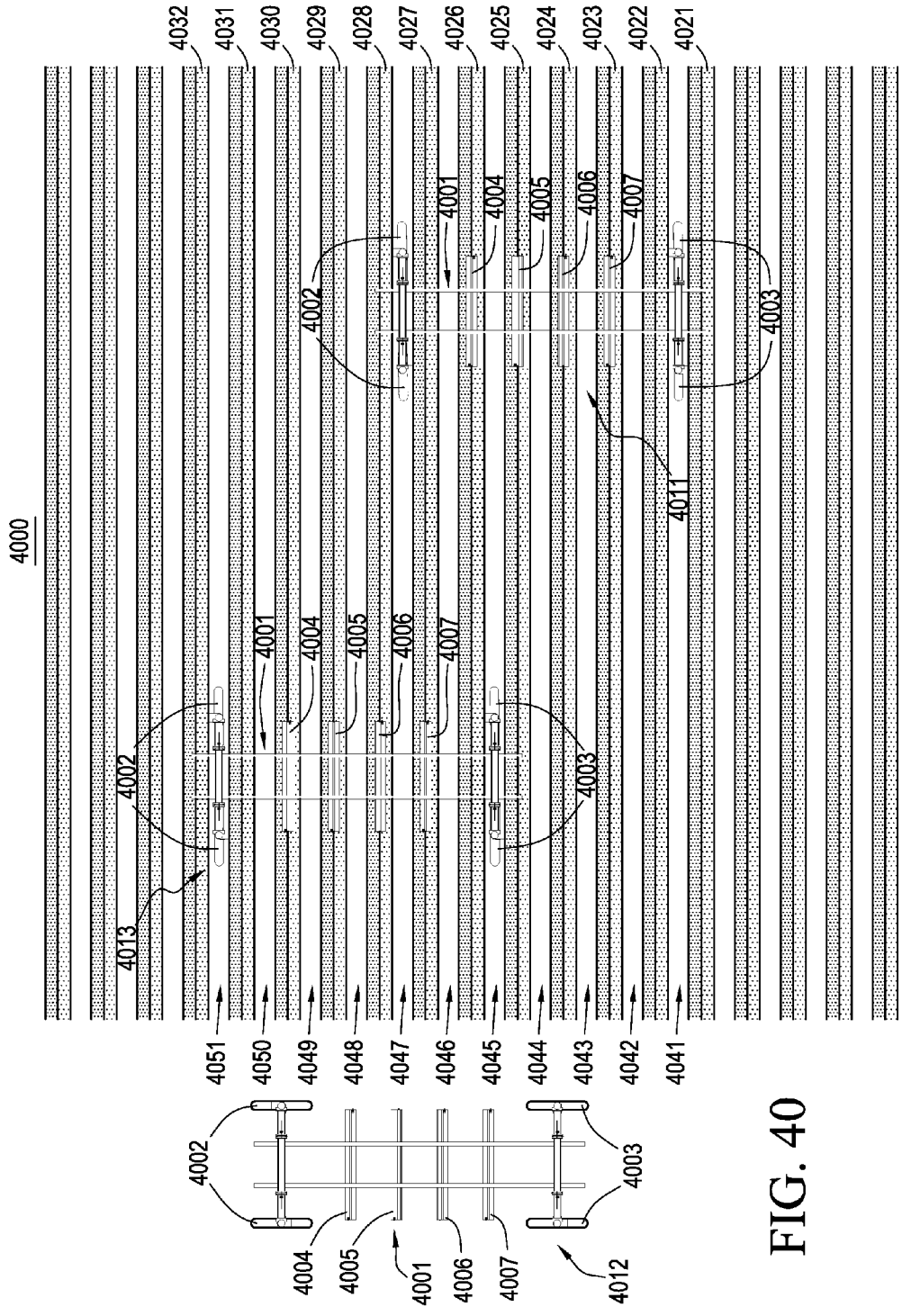
FIG. 40 illustrates a top view of a portion of a vehicle over rows of plant beds, according to an embodiment, in a progression of time views as the vehicle moves through the rows of plant beds.

Turning ahead in the drawings, FIG. 40 illustrates a top view of rows of plant beds 4000 showing a vehicle 4001 in a progression of time views 4011-4013 as vehicle 4001 moves through rows of plant beds 4000. Vehicle 4001 is merely exemplary, and embodiments of the vehicle are not limited to embodiments presented herein. The vehicle can be employed in many different embodiments or examples not specifically depicted or described herein. Vehicle 4001 can be similar or identical to vehicle 3200 (FIGS. 32-34), and can show only portions of vehicle 3200 for clarity. For example, vehicle 4001 can include a body with four RPC tracks 4004-4007, which can be similar or identical to RPC tracks 3334-3337 (FIGS. 33-34), and can carry RPCs, such as RPCs 3240, 3250, 3260, and 3270 (FIGS. 32-34), respectively, but not shown here in FIG. 40. In many embodiments, vehicle 4001 can include wheels at each side of vehicle 4001, such as wheels 4002 at a first side of vehicle 4001 and wheels 4003 at a second side of vehicle 4001.

In many embodiments, vehicle 4001 can move through rows of plant beds 4000, which can include plant beds, such as plant beds 4021-4032, and rows, such as rows 4041-4051, between the plant beds (e.g., 4021-4032). In several embodiments, wheels 4002-4003 can roll along rows (e.g., 4041-4051) between the plant beds (e.g., 4021-4032). For example, in some embodiments, as shown in time view 4011, wheels 4002 can roll along row 4047 and wheels 4003 can roll along row 4041, such that vehicle 4001 straddles six plant beds (e.g., plant beds 4021-4027), and can be used to harvest and/or punch holes in four plant beds (e.g., plant beds 4023-4026) at a time. For example, track 4004 can be positioned over plant bed 4026, track 4005 can be positioned over plant bed 4025, track 4006 can be positioned over plant bed 4024, and track 4007 can be positioned over plant bed 4023. In other embodiments, vehicle 4001 can straddle more or fewer plant beds and can harvest more or fewer plant beds at a time. Vehicle 4001 can progress along the rows (e.g., 4041, 4047) in a first direction to harvest and/or punch holes on the plant beds (e.g., 4023-4026), such as right to left in FIG. 40. The rows can be straight or curved.

As shown in time view 4012, after reaching the end of the rows (e.g., 4023-4026), vehicle 4001 can turn wheels 4002 and 4003 at a right angle to proceed to a next set of rows. After reaching the next set of rows, vehicle 4001 can again turn wheels 4002 and 4003 at a right angle to proceed along the next set of rows in a second direction that is opposite the first direction, such as left to right in FIG. 40. In many embodiments, each wheel (e.g., 4002, 4003) can turn independently.

As shown in time view 4013, wheels 4002 can roll along row 4045 and wheels 4003 can roll along row 4051, such that vehicle 4001 straddles six plant beds (e.g., plant beds 4026-4031), and can be used to harvest and/or punch holes in four plant beds (e.g., plant beds 4027-4030) at a time. For example, track 4004 can be positioned over plant bed 4030, track 4005 can be positioned over plant bed 4029, track 4006 can be positioned over plant bed 4028, and track 4007 can be positioned over plant bed 4027. Vehicle 4001 can similarly progress along rows of plant beds 4000 in a serpentine fashion to process each row of plant beds 4000. In many embodiments, vehicle 4001 can be guided by a guidance control system, as explained below in greater detail.

Figure 43:
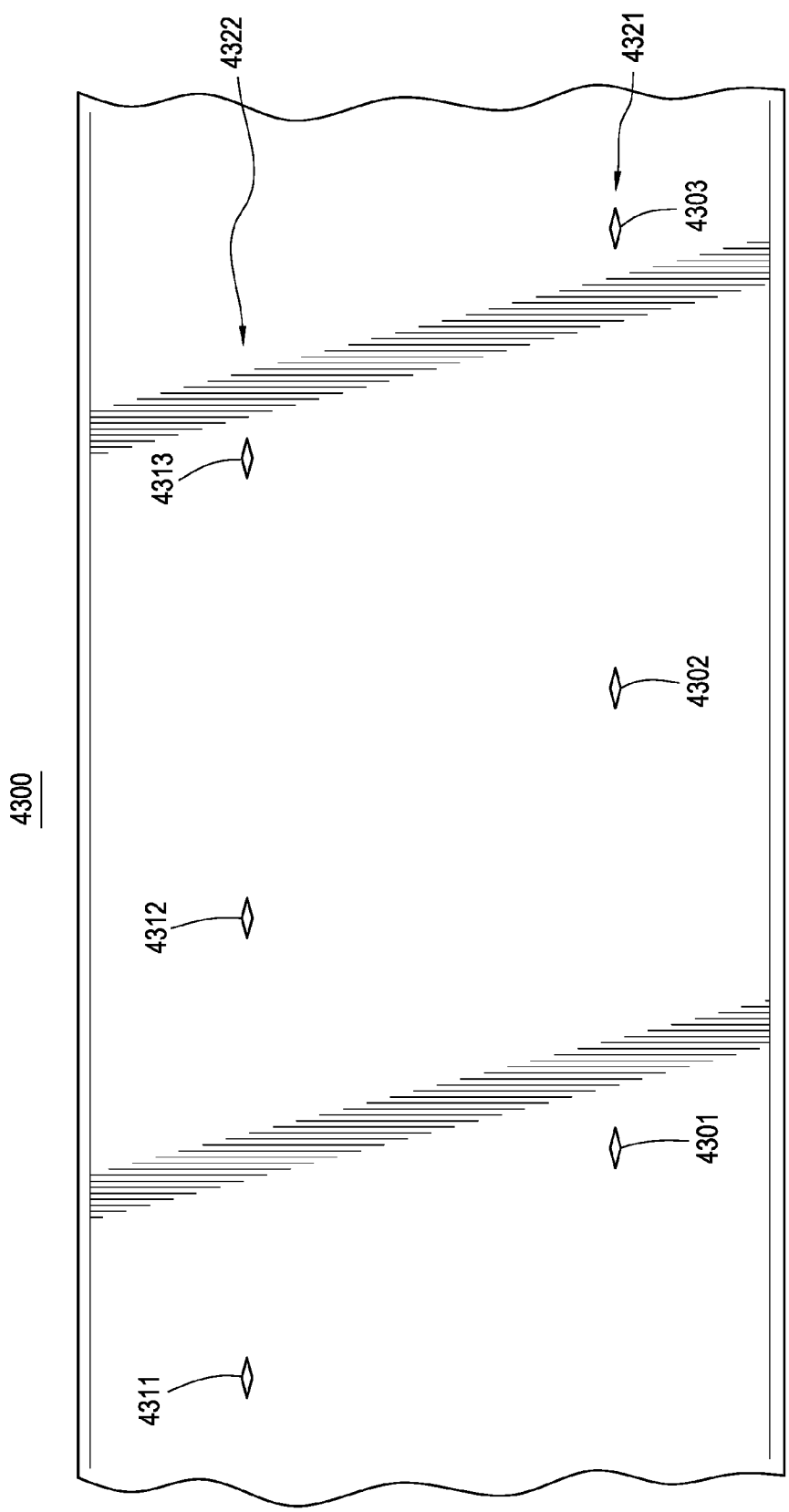
FIG. 43 illustrates a top view of a plant bed, showing holes punched for growing plants.

In many embodiments, vehicle 4001 can be used to punch holes for planting plants for crops (e.g., strawberries or other crops) carry harvesting robots (e.g., 100 (FIG. 1), 2000 (FIGS. 20-21)) for picking crops (e.g., strawberries or other crops). In many embodiments, a guidance control system can position RPCs (e.g., 3240, 3250, 3260, 3270 (FIGS. 32-34)), which can carry hole-punching robots to punch holes, as shown in FIG. 43 and described below, to carry harvesting robots (e.g., 100 (FIG. 1), 2000 (FIGS. 20-21)), or other suitable robots. In many embodiments, the robots can be positioned to perform tasks (e.g., hole punching, picking crops, etc.) by the guidance control system based on a location from GPS receivers (e.g., GPS receivers 3215-3216 (FIGS. 32-34)) and/or other approaches, such as those described below.

For many types of plants, there are three phases in a lifecycle of the plants in the field, namely planting, growing, and harvesting. At the outset, there are no plants in the field, and as such the placement and positioning of the plants is not established. In some embodiments, the guidance control system can calculate target plant locations based on an initial reference position and a heading. These target plant locations can then be used to position the RPCs (e.g., 3240, 3250, 3260, 3270 (FIGS. 32-34)) and robots carried by the RPCs to punch the holes for the actual plants. In a number of embodiments, the actual plant locations can be stored in a database for later use. In some embodiments, the plant locations can be stored based on a reference position and a heading, with offsets calculated based on fixed spacing between plants.

Knowing the plant locations accurately can be an important aspect in facilitating the positioning of vehicle 4001 over the center of the plants in a repeatable manner. However, the nature of commercial, stand-alone GPS generally contains error sources that combine to influence the position error of the GPS solution over time. Standard Positioning Service (SPS) GPS positioning can contain horizontal errors on the order of 10 meters. Wide-area augmentation types, such as WAAS (Wide Area Augmentation System) in the United States, can reduce that error to meter-level, with additional augmentation services and techniques reducing the error even further, down to decimeter-level for local-area differential GPS (LADGPS), and centimeter-level accuracy for Real-Time Kinematic (RTK) systems.

Accurate positioning of vehicle 4001 facilitates accurate determination of the RPCs (e.g., 3240, 3250, 3260, 3270 (FIGS. 32-34)) and robots carried by the RPCs, which, when combined with knowledge of the multiple robot positions on the RPC and/or plant locations, can be used to perform tasks with multiple robots at the same time (e.g., picking multiple plants at the same time).

A potential challenge when trying to hold sub-inch accuracy with GPS alone is that commercially available GPS systems are generally only accurate down to 0.433 inches (1.10 cm) when using RTK, and may have a slow refresh rate. While moving at approximately 1 mile per hour (mph) (1.61 kilometers per hour (kph)), with a 20 Hertz (Hz) position output from the GPS, vehicle 4001 can move 0.12 inch (0.30 cm) every second, and 0.0061 inch (0.0154 cm) between each GPS position refresh. Slower refresh rates, or a faster harvester speed, can result in a greater distance traveled between each GPS position refresh. Some embodiments may work around a slower refresh rate by using a combination of GPS and dead reckoning using a velocity of vehicle 4001 to estimate the current position of the harvester.

When rows (e.g., rows 4041-4051) are on 50 inch (127 cm) centers, with the distance between plants being even smaller, such distances can lead to inaccuracies due to floating point rounding during the computation process utilizing a purely latitude and longitude-based reference system. Computing geographical distance using the law of cosines can cause such errors over small distances, as the cosine value approaches 1.0. Alternatives, such as the Haversine formula, can suffer from error derived from treatment of the Earth as a sphere, rather than an oblate spheroid. Vincenty's solutions can offer advantages suited to the needs of plant location calculations. Vincenty's solutions are derived as two iterative methods: (a) a direct solution, which computes a second point given an initial position, a bearing (heading), and a distance; and (b) an inverse solution, which computes the distance and bearing between two points The start location of a row can be given by either an area around a start point or by a start line defined by two points. A distance can then be calculated from the start location for each of the plants in the row. The distance traveled can then be calculated as the tractor moves down the row by using a number of different inputs such as GPS-based velocity, ground-based velocity, the time from last GPS update, last GPS location, and/or direction of travel. With this, a more accurate estimate of the distance travelled can be calculated than with just using GPS locations alone.

In the eyes of advance planning, some embodiments may traverse the row with vehicle 4001 to get the start and stop coordinates for each row along with the travel direction (heading) of the row. From there, the start locations of each row can be calculated from the start location of the first row in the set.

When calculating the plant locations using a latitude/longitude system, the use of Vincenty's direct solution allows for calculation of a position given an initial position, a bearing, and a distance. This can form a two-part solution to find the origin of each row, given the field starting point and the direction the rows are to run, and the distance between each row, and the location of each plant in the row, given the direction the rows are to run and the distance between each plant.

For the first step of the process, the equation below gives the origin position for each row:

$$(\phi_{row,i}, \lambda_{row,i}) = v\left(\phi_0, \lambda_0, \psi_{field} \pm \frac{\pi}{2}, \delta row\right)$$

where $\phi_{row,i}$ and $\lambda_{row,i}$ are the latitude and longitude, respectively, of the start of the row, $\phi_0$ and $\lambda_0$ are the latitude and longitude, respectively, of the field origin point, $\psi_{field}$ is the heading of the field's rows, $\delta row$ is the distance between rows, and the function V(x) is Vincenty's direct solution.

Once the origin position for each row is known, the position of each plant in the row can be calculated:

$$(\phi_{plt,n}, \lambda_{plt,n}) = V(\phi_{row,i}, \lambda_{row,i}, \psi_{field}, \delta plt)$$

where $\phi_{plt,n}$ and $\lambda_{plt,n}$ are the latitude and longitude, respectively, of the n$^{th}$ plant in the row, $\phi_{row,i}$ and $\lambda_{row,i}$ are the latitude and longitude, respectively, of the start of the row, $\psi_{field}$ is the heading of the field's rows, $\delta plt$ is the distance between plants in the row, and the function V(x) is Vincenty's direct solution.

In order to accurately place the robots over each plant, the location of the GPS with respect to each row as well as the location of the RPC (Robot Position Carrier) with respect to the phase center of the GPS antenna can be determined. Accurately knowing all these values in order to hold +/−0.75 inch (1.90 cm) tolerance on the robots can present challenges. As discussed above, the accuracy of GPS is at best 0.433 inch (1.10 cm), which uses up most of the tolerance. Another possible issue is that a slow refresh rate for GPS position output can cause uncertainty with the current position and velocity of vehicle 4001 if the drive system of vehicle 4001 causes unanticipated acceleration or deceleration to occur between updates.

Turning ahead in the drawings, FIG. 41 illustrates a top view of a vehicle 4001, showing an X-axis and a Y-axis in a coordinate system for a guidance control system. FIG. 42 illustrates a rear view of a vehicle 4001, showing a Y-axis and a Z-axis in the coordinate system of FIG. 41 for a guidance control system. When discussing items such as platform attitude and lever arms, the guidance control system can use a defined reference frame from which to derive measurements and to assign axes of rotation for the platform attitude parameters. Viewing movement and translations from the perspective of a theoretical driver on vehicle 4001 can be defined by a "body frame" of vehicle 4001, denoted by B with a subscript for each axis (e.g., $B_x$, $B_y$, $B_y$). The body frame B can be defined as a right-hand coordinate system, with the positive X-axis pointing in the direction shown in FIG. 41, which can be in the same direction of tracks 4004-4007, and the positive Y-axis pointing in a direction from wheels 4003 to wheels 4002, as shown in FIG. 41. As the coordinate system is right-handed, the positive Z axis can point downward from the bottom of the platform towards the ground, as shown in FIG. 42.

The direction of travel can change if the harvester platform is driven along a row in the opposite direction, but the body frame axes described here will not change with the direction of travel. With the body frame axes defined, as shown in FIGS. 41-42, attitude parameters, specifically, roll, pitch, and yaw, can be defined. Roll is a rotation about the body-X axis, tilting the platform from side to side. Pitch is a rotation about the body-Y axis, and is equivalent to tilting the platform forward or backward. Yaw is about the body-Z axis, and is the direction the platform is facing.

Each GPS receiver (e.g. 3215-3216 (FIGS. 32-34)) can provide the calculated position of the phase center of the antenna of the GPS receiver (e.g. 3215-3216 (FIGS. 32-34)). This calculated position can be used to navigate vehicle 4001, although the physical mounting location of the GPS receiver (e.g. 3215-3216 (FIGS. 32-34)) on the frame pieces (e.g., 3211-3212 (FIGS. 32-34)) are is usually not ideal for this purpose because of clear-sight line blockages. In many embodiments, GPS receivers (e.g., 3215-3216 (FIGS. 32-35)) can be mounted on the top of vehicle 4001, such as on arms 3213-3214 (FIGS. 32-34), respectively, as shown on harvesting vehicle 3200 (FIGS. 32-34) to allow for clear sight lines, which can facilitate improved GPS reception In order to provide a position that is conducive for autonomous navigation, the GPS position can be referenced to a guidance control point (GCP) 4100. GCP 4100 can serve as a reference for calculating other locations on vehicle 4001, such as positions of each RPC (e.g., 3240, 3250, 3260, 3270 (FIGS. 32-34)) and each robot (e.g., 3461-3464 (FIG. 34)) carried by each RPC (e.g., 3240, 3250, 3260, 3270 (FIGS. 32-34)). The GCP can be used as the reference point when navigating vehicle 4001. Calculating the position of GCP 4100 from the GPS position can involve incorporating lever arm information for each of the GPS receivers (e.g., 3215-3216 (FIGS. 32-34)) on arms 3213-3214 (FIGS. 32-34) with respect to GCP 4100.

The lever arm information for the GPS receivers (e.g., 3215-3216 (FIGS. 32-34)) can be determined through measurement, either on vehicle 4001 itself or through the use of a modeling program to determine the distances. In most embodiments, the guidance control system can incorporation additional lever arm information for each of the robots. This lever arm information for the robots, when used in conjunction with the lever arm information for the GPS receivers (e.g., 3215-3216 (FIGS. 32-34)) can allow for the position of each robot to be calculated based on the position of the GPS receivers (3215-3216 (FIGS. 32-34)). If the assumptions can be made that the RPC (e.g., 3240, 3250, 3260, 3270 (FIGS. 32-34)) is aligned with the body-forward (X) axis, the absolute position of each robot, u, can be determined.

The attitude, namely heading, pitch, and roll, of vehicle 4001 can be used to form a Direction Cosine Matrix (DCM) relating the attitude of vehicle 4001 to the north-pointing navigation frame. This DCM, called $C_B^N$, is shown below:

$$C_B^N = \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

where $\psi$ is the heading of the vehicle 4001, $\theta$ is the pitch, and $\phi$ is the roll.

Attitude measurement with only two GPS antennas can suffers from a lack of adequate degrees of freedom to truly measure all 3 axes of rotation. Since any rotation about the axis formed between the two receivers is invisible without external aiding, only two components of platform attitude (i.e., (a) heading and (b) either pitch or roll) can be measured.

In order to alleviate the missing degree of freedom, assumptions can be made about the platform, such that it is approximately level at all times, or that the platform's roll (as it exists across the longest dimension of the harvester platform) is negligible. However, this approach eliminates any possibility of GPS-only measurement of the missing axis to aid in leveling of the harvester platform itself, and does not allow for measurement of potentially sloped areas (e.g., California fields).

Error in determination of the horizontal position of the RPC (e.g., 3240, 3250, 3260, 3270 (FIGS. 32-34)) is dominated by heading error, rather than pitch or roll. Some embodiments may use two GPS receivers, or a dual-antenna GPS receiver, to calculate the platform heading. Using the accuracy of RTK GPS coupled with a separation of several meters between antennas (or receivers) can reduce the heading error to less than a few tenths of a degree.

In order to provide visibility to the remaining aspects of the attitude of vehicle 4001, namely pitch and roll, a low-cost Inertial Measurement Unit (IMU) consisting of a triad of orthogonal accelerometers ("accels") and gyroscopes ("gyros") to measure the inertial accelerations of vehicle 4001, allowing for a pitch and roll attitude solution to be calculated without the use of GPS data. In many embodiments, vehicle 4001 can include an IMU, such as in a GPS receiver (e.g., 3215 or 3216 (FIGS. 32-34)) or at another position.

By itself, an inertial measurement system using low-cost sensors can be not sensitive enough to determine the platform heading, as it can merely determine the offset from the initial starting point as measured by the gyros. Use of a multiple GPS (or a multi-antenna GPS) system can allow for an absolute heading reference, which can be aided by gyro measurements to account for a loss of GPS, if desired. The low dynamic environment of vehicle 4001 and the clear-sky nature of a farm combine to make this a low probability occurrence.

In order to compute the lever arm calculations using geodetic coordinates, some intermediary calculations can be performed by the guidance control system. These calculations can be made with the same assumptions described above. The body frame to navigation frame matrix can be applied to the lever arm information for the RPCs (e.g., 3240, 3250, 3260, 3270 (FIGS. 32-34)) (e.g. lever arm for RPC in the X axis ($LA_{RPC,X}$), lever arm for RPC in the Y axis ($LA_{RPC,Y}$), and lever arm for RPC in the Z axis ($LA_{RPC,Z}$), with the body-X axis adjusted based on the distance ($\delta Pos_{RPC}$) of the RPC (e.g., 3240, 3250, 3260, 3270 (FIGS. 32-34)) from home, to form the lever arm distance offsets in terms of the north, east, and downward (as with body frame, positive being downward) (NED) axes.

$$LA_{RPC,NED} = C_B^N \begin{bmatrix} LA_{RPC,X} + \delta Pos_{RPC} \\ LA_{RPC,Y} \\ LA_{RPC,Z} \end{bmatrix}$$

The equations for application of a lever arm to a position can be derived from equations used to calculate a change in position due to a velocity. If the assumption is made that the lever arm distances is actually a velocity over a 1 second period, the change in position formulas can be used to compute the change in latitude ($\delta\phi$) and longitude ($\delta\lambda$).

$$\delta\phi = \frac{v_N}{R_M + h}$$

$$\delta\lambda = \frac{v_E \sec\phi}{R_T + h}$$

where $\phi$ is the current latitude, h is the current elevation, $v_N$ is the velocity in the north direction, and $v_E$ is the velocity in the east direction. $R_M$ is the meridional radius of curvature, and $R_T$ is the transverse radius of curvature of the Earth, such that:

$$R_M = \frac{R_P(1-e^2)}{\sqrt{1-e^2\sin^2\phi}}$$

$$R_T = \frac{R_P}{\sqrt{1-e^2\sin^2\phi}}$$

where $R_P$ is the polar radius, $R_P$=6378137.0m, and $e^2$ is the eccentricity of the ellipsoid, $e^2 \approx 0.00669438$.

Once the position change due to the lever arm has been calculated, the position change can be applied to the GPS position:

$$\phi_{RPC} = \phi_{GPS} + \delta\phi$$

$$\lambda_{RPC} = \lambda_{GPS} + \delta\lambda$$

where $\phi_{RPU}$ is the latitude of the RPC, $\lambda_{RPU}$ is the longitude of the RPC, $\phi_{GPS}$ is the latitude of the GPS, and $\lambda_{GPS}$ is the longitude of the GPS.

Due to the length of the berry picking season, there is a source of positional error that slowly grows over time due to the movement of the continental plates. The plates themselves move anywhere from 1 to 10 cm per year, eating into the positioning error budget. Using standard GPS, this measurement error can be lost in the noise and uncertainty present in the system, but with RTK GPS, this error will show up as a position bias at a later time if no compensation is used. In order to compensate for this, the base station position can be surveyed before planting, and then surveyed again before harvesting is to be performed. Some embodiments may apply the position difference as an offset to the stored plant locations.

In many embodiments, the guidance control system advantageously can provide positioning accuracy for each robot within 0.5 inch (1.27 cm). In some embodiments, the positioning accuracy for each robot using the guidance control system can be more precise, such as within 0.25 in (0.635 cm), which has been measured in testing of the guidance control system. In many embodiments, the guidance control system can facilitate precision agriculture, such that each individual plant location (e.g., for plant, growing, and/or harvesting) is tracked. In several embodiments, precision agriculture provided by the guidance control system can allow picked crops to be traced to the individual plant or limited group of individual plants from which the crops were picked. For example, a package of strawberries can include an identifier that can be used to trace the strawberries picked to a group of plants (e.g., 8 plants, or another suitable number of plants) at tracked locations.

Turning ahead in the drawings, FIG. 43 illustrates a top view of a plant bed 4300, showing holes punched for growing plants. As explained above, in many embodiments, the robots of vehicle 4001 (FIG. 40) or harvesting vehicle 3200 (FIGS. 32-34) can include hole punching robots (e.g., in harvesting vehicle 3200 (FIGS. 32-34), the harvesting robots (e.g., 3461-3464 (FIGS. 34-35) can be replaced with hole punching robots). For example, each hole punching robot can be a pneumatic actuator of a cylindrical shaft which can punch a hole in a plant bed, such as through plastic on a plant bed, to create a hole in order to plant a plant (e.g., a strawberry plant or other type of plant). In many embodiments, the vehicle (e.g., vehicle 4001 (FIG. 40) or harvesting vehicle 3200 (FIGS. 32-34)) can carry the hole punch robots on the RPCs (e.g., 3240, 3250, 3260, 3270 (FIGS. 32-24)) to punch rows of holes, such as rows of holes 4321 and 4322. For example, row of holes 4321 can include holes 4301, 4302, and 4303 in a row, and ow of holes 4322 can include holes 4311, 4312, and 4313 in a row. In many embodiments, each of the holes in a row can be approximately equally spaced. As indicated previously, the row can be straight or curved.

Figure 44:
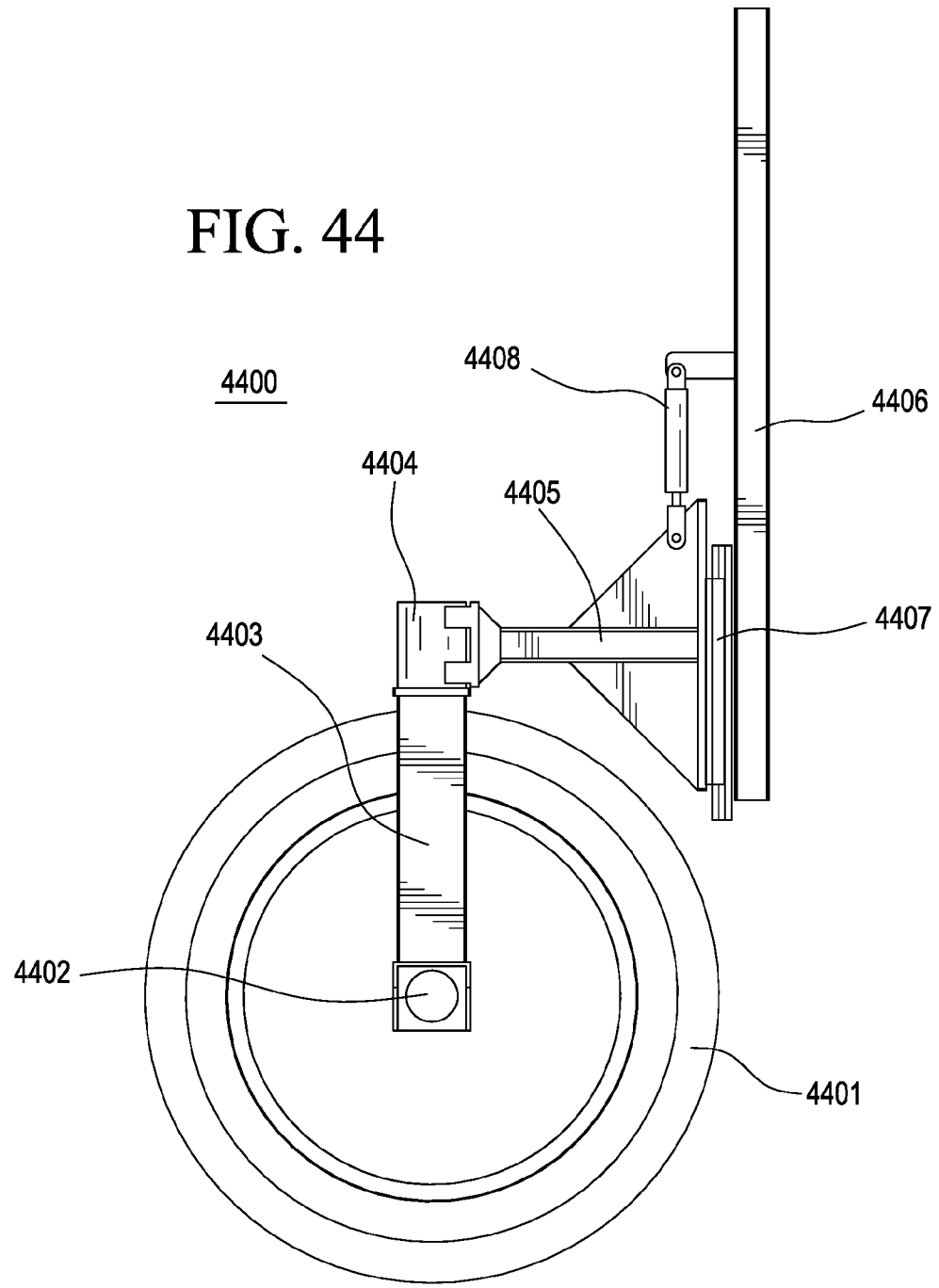
FIG. 44 illustrates a side view of suspension components for adjusting a vertical position of a wheel with respect to a body, according to an embodiment.

Turning ahead in the drawings, FIG. 44 illustrates a side view of suspension components 4400 for adjusting a vertical position of a wheel 4401 with respect to a body 4406. Suspension components 4400 are merely exemplary, and embodiments of the suspension components are not limited to embodiments presented herein. The suspension components can be employed in many different embodiments or examples not specifically depicted or described herein. In a number of embodiments, suspension components 4400 can include wheel 4401, an axle 4402, a wheel stanchion 4403, a turning assembly 4404, a wheel mount 4405, body 4406, adjustment mechanism 4407, and/or actuator 4408. Wheel 4401 can be similar or identical to wheels 3201-3204 (FIGS. 32-34) and/or 4002-4003 (FIGS. 40-43). Body 4406 can be a portion of body 3210 (FIGS. 32-34), such as a portion of arms 3213-3214 (FIGS. 32-24).

In many embodiments, wheel 4401 can be coupled to and rotate around axle 4402, which can be coupled to wheel stanchion 4403. In various embodiments, wheel stanchion 4403 can be movably coupled to wheel mount 4405 by turning assembly 4404, which can allow wheel 4401 to be turned in a different direction. In several embodiments, wheel mount 4405 can be movably coupled to body 4406 by adjustment mechanism 4407, which can be a slidably coupling or another suitable coupling, which can allow wheel mount 4405 to adjust vertically with respect to body 4406. In several embodiments, wheel mount 4405 can be adjusted vertically up or down with respect to body 4406 with actuator 4408. Actuator 4408 can be a hydraulic or electric actuator, for example. In several embodiments, actuator 4408 can be controlled by a suspension control system, such as suspension control system 5803 (FIG. 58, described below), which in some embodiments can be an active suspension system.

In various embodiments, the suspension control system (e.g., 5803 (FIG. 58, described below)) can control the vertical position of wheel 4401 with respect to body 4406. When wheel 4001 is on a surface, adjusting the vertical position of wheel 4001 with respect to body 4406 can raise or lower body 4406 with respect to the surface. In many embodiments, the assembly for each wheel on the vehicle (e.g., wheels 3201-3204 (FIGS. 32-34) on harvesting vehicle 3200 (FIG. 32) and/or 4002-4003 (FIGS. 40-43) on vehicle 4001 (FIG. 40)) can include suspension components 4400. In some embodiments, suspension components can provide for a range of vertical adjustment of wheel 4401 with respect to body 4406. For example, in some embodiments, the range of vertical adjustment of wheel 4401 with respect to body 4406 can be 10 inches (25.4 cm). In other embodiments, the range of vertical adjustment can be more or less than 10 inches (25.4 cm).

Figure 46:
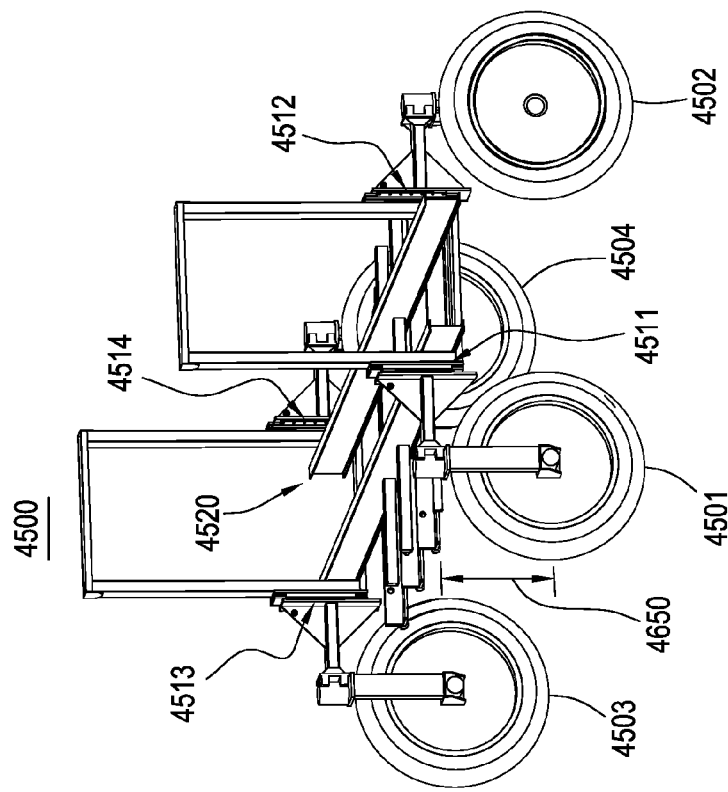
FIG. 46 illustrates a perspective view of the portion of the vehicle of FIG. 45, showing the body of the vehicle in a raised suspension position.
Figure 45:
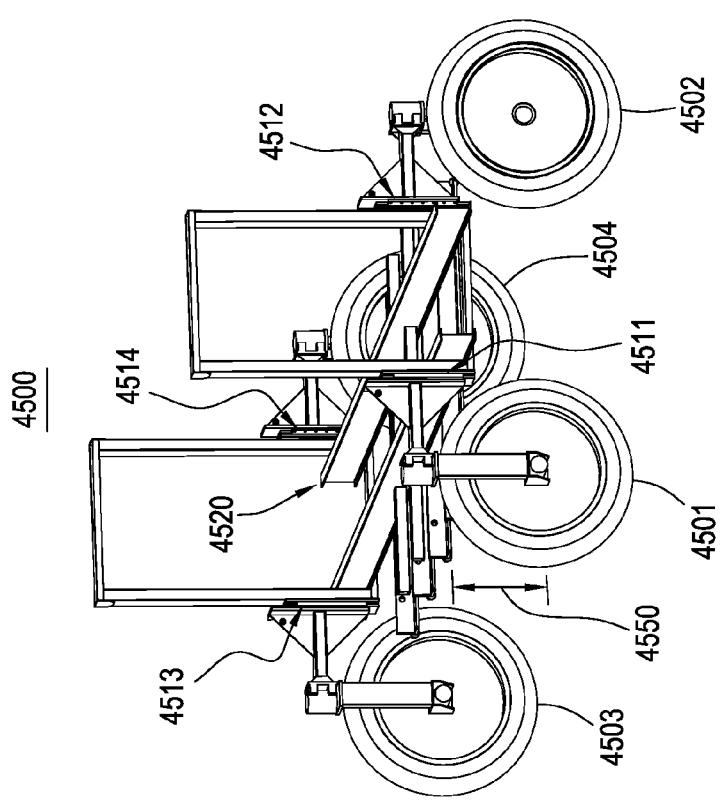
FIG. 45 illustrates a perspective view of a portion of a vehicle, according to an embodiment, showing a body of the vehicle in a lowered suspension position.

Turning ahead in the drawings, FIG. 45 illustrates a perspective view of a vehicle 4500, showing a body 4520 of vehicle 4500 in a lowered suspension position. FIG. 46 illustrates a perspective view of vehicle 4500, showing a body 4520 of vehicle 4500 in a raised suspension position. Vehicle 4500 is merely exemplary, and embodiments of the vehicle are not limited to embodiments presented herein. The vehicle can be employed in many different embodiments or examples not specifically depicted or described herein. Vehicle 4500 can be similar or identical to vehicle 4001 (FIG. 40) and/or harvesting vehicle 3200 (FIGS. 32-34), and various components of vehicle 4500 can be similar or identical to vehicle 4001 (FIG. 40) and/or harvesting vehicle 3200 (FIGS. 32-34).

In many embodiments, vehicle 4500 can include a body 4520 and wheels 4501-4504, which can each be part of associated suspension components 4511-4514, respectively. Suspension components 4511-4514 each can be similar or identical to suspension components 4400 (FIG. 44), and can raise and/or lower the vertical position of wheels 4501-4504, respectively, with respect to body 4520.

In many embodiments, suspension components 4511-4514 for each wheel 4501-4504 can operate independently from the other suspension components (e.g., 4511-4514). In many embodiments, one or more of suspension components 4511-4514 can allow one or more of wheels 4501-4504 to be vertically adjusted with respect to the body while not adjusting other wheels (e.g., 4501-4504). In some embodiments, suspension components 4511-4514 can adjust wheels 4501-4504 at different vertical adjustment amounts. For example, as shown in FIG. 45 vehicle 4500 can be positioned lower than vehicle 4500 in FIG. 46.

In many embodiments, vehicle 4500 can carry one or more robots, such as harvesting robots 3461-3464 (FIGS. 34-35) in harvesting vehicle 3200 (FIGS. 32-34). In many embodiments, each robots can determine a height of the robot from the plant bed (e.g., plant beds 3281-3290 (FIGS. 32-34)), such as by using imaging sensors (e.g., imaging sensors 1290-1291 (FIGS. 12-13) and/or images sensors 2190-2191 (FIG. 21)) on the robots. For example, the imaging sensors can determine that a robot (not shown) on vehicle 4500 in FIG. 45 is at a height 4550 from the plant bed. Similarly, the imaging sensors can determine that a robot (not shown) on vehicle 4500 in FIG. 45 is at a height 4650 from the plant bed, such that height 4650 is greater than height 4550 (FIG. 45). In some embodiments, the height information can be determined by the robot based on the imaging sensors determining the distance from the imaging sensors to the crops to be picked. In other embodiments, the height information can be determined by the robot based on the distance from the imaging sensors to the plant bed.

In many embodiments, more than one robot attached to vehicle 4500 can provide height information to the suspension control system (FIG. 58, described below)). For example, in some embodiments, each robot can provide height information to the suspension control system (FIG. 58, described below)). In many embodiments, the suspension control system (FIG. 58, described below)) can receive the height information from the robots and determine how to control the adjustment of the vertical position of one or more of wheels 4501-4504. In a number of embodiments, the adjustment of one or more wheels (e.g., 4501-4504) can be based on the height information of one or more robots close to the one or more wheels (e.g., 4501-4504). In other embodiments, the adjustment of one or more wheels (e.g., 4501-4504) can be based on an average of height information from all of the robots. In other embodiments, the adjustment of each wheel (e.g., 4501-4504) can be the same for each wheel (e.g., 4501-4504) based on the height information received from one or more robots.

In some embodiments, the height information can be received from the robots regularly, such as on a cycle, and the suspension control system (FIG. 58, described below)) can provide adjustment control for the one or more wheels (e.g., 4501-4504) regularly based on updated information received each cycle and/or over a period of cycles. For example, the height information can be sent from the robots to the suspension control system (FIG. 58, described below)) on a 1 Hz cycle, a 2 Hz cycle, a 4 Hz cycle, or another suitable cycle.

In a number of embodiments, vehicle 4500 (FIG. 45) can operate in an open field subject to weather. The fields can be leveled and setup initially to relatively tight specifications upon initiation, but due to this weather exposure, various areas of the field can be subject to settling or washout due to water and/or wind erosion. To deal with this issue and keep the robots within preferred inspection distances for picking speed considerations, vehicle 4500 can be equipped in several embodiments with the suspension control system (FIG. 58, described below)) to maintain a level of vehicle 4500, row orientation, and/or proper height above the plant beds for the robots.

In many embodiments, the adjustment of the vertical position of one or more wheels (e.g., 4501-4504), as controlled by the suspension control system (FIG. 58, described below)), can beneficially keep the robots from crashing into the plant beds as they are carried by vehicle 4500, for example. For example, if a wheel (e.g., 4501-4504) of vehicle 4500 start to dip into a washed out area, the suspension control system (FIG. 58, described below)) can detect the lowering of the height information from one or more of the robots, and can adjust at least the wheel (e.g., 4501-4504) to compensate and level body 4520 and/or keep the robots a distance from the plant beds.

In some embodiments, for example, a bottom most part of each of the picking system, excluding the gripper in the picking position that is being lowered to pick the crop, can be kept at a distance above the plant bed. For example, the distance can be 2.0 inches (5.08 cm) to 5.0 inches (12.7 cm). In other embodiments, the distance can be another suitable distance. In a number of embodiments, the suspension control system (FIG. 58, described below)) can keep the bottommost part of the robot from the plant bed when the robot is moving with respect from the plant bed and/or when the robot is being held stationary with respect to the plant bed by the RPC (e.g., 3240, 3250, 3260, 3270 (FIG. 32)).

Strawberry plants can benefit from trimming off the dead, older growth that gets pushed out from the center of the plant as new growth appears. This trimming can prevent diseases caused by the rotting of older-organic debris. Typically, the resources available to do this trimming by hand are not available on farms due to the labor-intensive process. One of the issues with trimming the plants is that, if diseases are present on one plant, the disease can spread to adjacent plants by using common trimming utensils.

In some embodiments, a robot, such as harvesting robots 100 (FIG. 1) and/or 2000 (FIG. 20), and/or leaf displacement system 2800 (FIGS. 28-31), can include a cauterizing cutting hot wire or mechanical sickle bar that can slice off the outside older growth as the robot circles the plant or the leaf displacement system captures and holds the foliage (e.g., 1512, as shown in FIG. 20). The razor action and heating of the wire moving across the old outer growth can slice off the vines, which can trim the plant back to the newer inner growth. The older growth can then fall away from the plant after being mechanically stimulated by the robot and/or environmental factors, such as wind or rain. The hot wire can beneficially sterilize the wire so that, if diseases are present on the trimmed growth, they will not be passed to plants trimmed downstream of the diseased plant.

Figure 47:
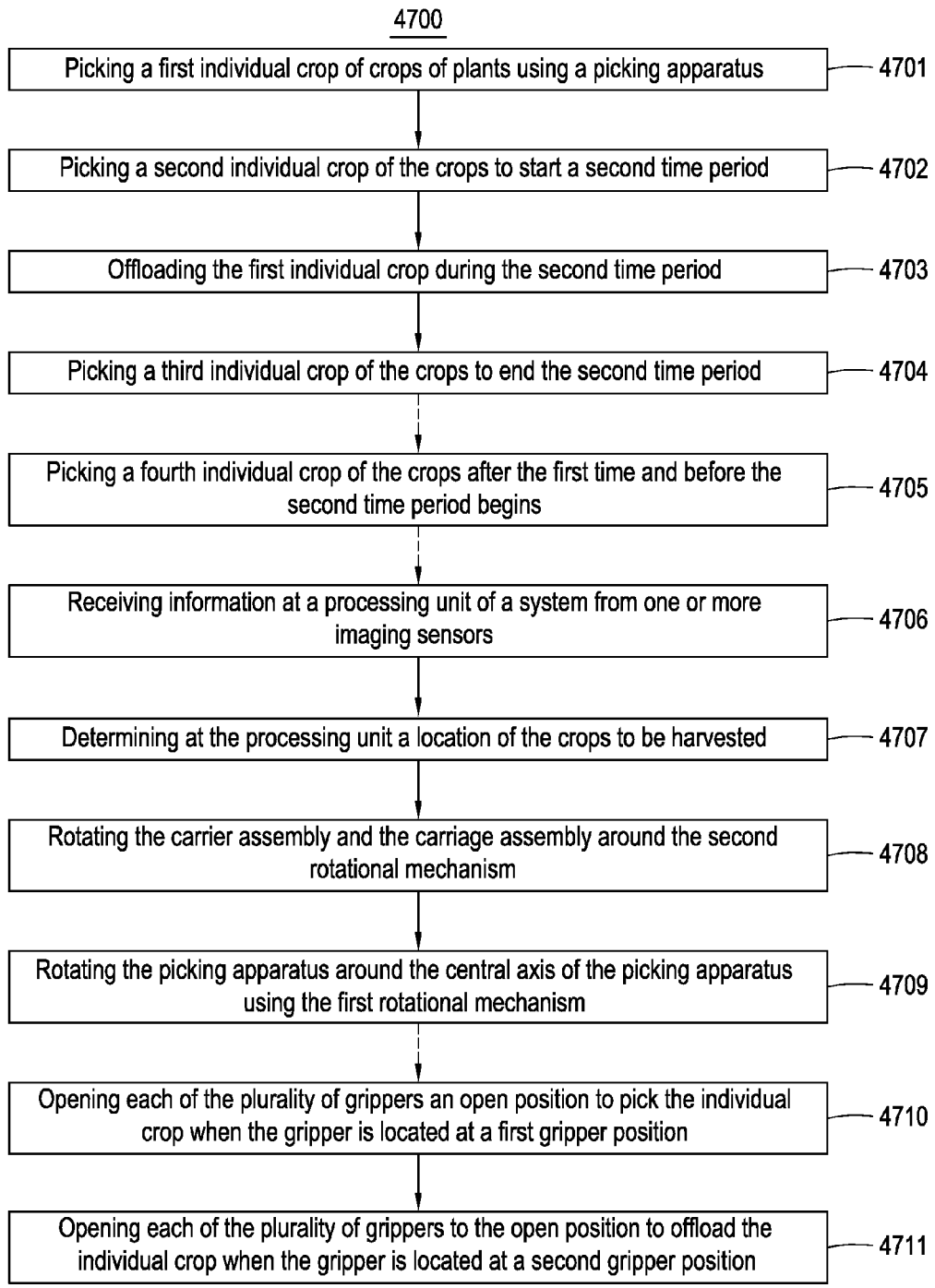
FIG. 47 illustrates a flow chart for a method of selectively harvesting crops, according to an embodiment.

Turning ahead in the drawings, FIG. 47 illustrates a flow chart for a method 4700. Method 4700 can be a method of selectively harvesting crops. Method 4700 is merely exemplary and is not limited to the embodiments presented herein. Method 4700 can be employed in many different embodiments or examples not specifically depicted or described herein. In some embodiments, the procedures, the processes, and/or the activities of method 4700 can be performed in the order presented. In other embodiments, the procedures, the processes, and/or the activities of method 4700 can be performed in any suitable order. In still other embodiments, one or more of the procedures, the processes, and/or the activities of method 4700 can be combined or skipped. In some embodiments, method 4700 can be performed by a harvesting robot (e.g., 100 (FIG. 1), 2000 (FIGS. 20-21)) and/or a picking apparatus (e.g., 110 (FIG. 1), 2010 (FIG. 20)).

Referring to FIG. 47, method 4700 can include a block 4701 of picking, at a first time, a first individual crop of crops of plants using a picking apparatus. The picking apparatus can be similar or identical to picking apparatus 110 (FIG. 1) and/or picking apparatus 2010 (FIGS. 20-21). The first individual crop can be similar or identical to one of crops 1511 (FIG. 15). The plants can be similar or identical to plant 1510 (FIG. 15). In some embodiments, the plants can be strawberry plants and each of the crops can be a strawberry. In other embodiments, each of the plants can be another suitable type of plant, such as a tomato plant, a pepper plant, etc., and each of the crops can be another suitable type of crop, such as a tomato, a pepper, etc. In many embodiments, the picking apparatus can include a plurality of grippers each spaced apart and extending radially from a central axis of the picking apparatus. The central axis can be similar or identical to central axis 311 (FIG. 3). The grippers can be similar or identical to grippers 312-315 (FIG. 3), grippers 2011-2015 (FIG. 20) and/or gripper 2116 (FIG. 21). In various embodiments, each gripper can be configured to pick a different individual crop of the crops of the plants.

In a number of embodiments, method 4700 also can include a block 4702 of picking a second individual crop of the crops to start a second time period, the second time period starting after the first time.

In several embodiments, method 4700 additionally can include a block 4703 of offloading the first individual crop during the second time period.

In a number of embodiments, method 4700 further can include a block 4704 of picking a third individual crop of the crops to end the second time period. In many embodiments, the picking apparatus can hold the second and third individual crops at the end of the second time period. In a number of embodiments, the first, second, and third individual crops can be picked from a first plant of the plants.

In a several embodiments, method 4700 optionally can include a block 4705 of picking a fourth individual crop of the crops after the first time and before the second time period begins. In several embodiments, the picking apparatus can be holding the second, third, and fourth individual crops at the end of the second time period.

Figure 58:
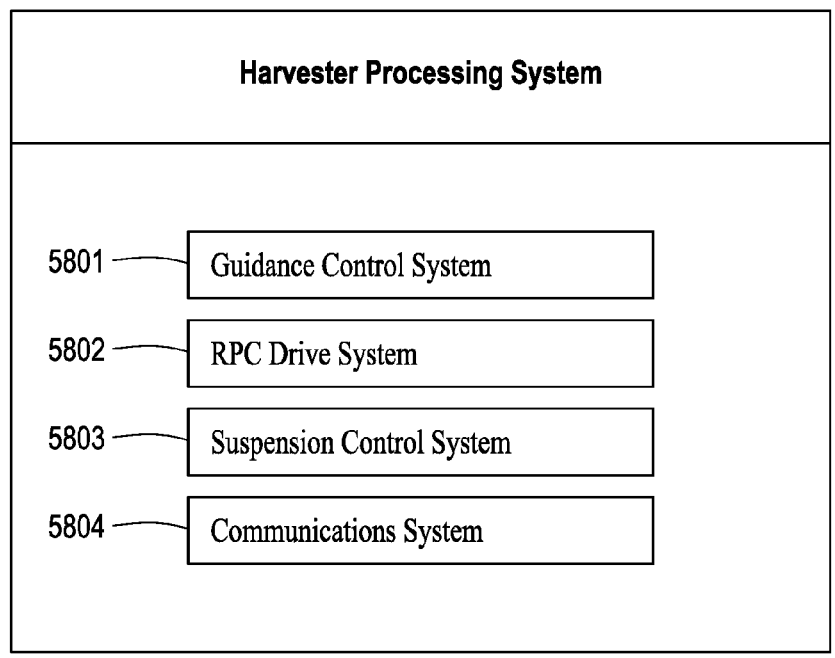
FIG. 58 illustrates a block diagram of a harvester processing system, according to an embodiment.

In a number of embodiments, method 4700 optionally can include a block 4706 of receiving information at a processing unit of a system from one or more imaging sensors. The system can be similar or identical to harvesting robot 100 (FIG. 1) and/or harvesting robot 2000 (FIG. 2000). The processing unit can be similar or identical to processing unit 1273 (FIGS. 12-13), processing unit 2173 (FIG. 21), control unit 1272, control unit 2072 (FIGS. 20-21), and/or harvester processing system 5800 (FIG. 58, described below). The imaging sensors can be similar or identical to imaging sensors 1290-1291 (FIGS. 12-13) and/or images sensors 2190-2191 (FIG. 21).

In many embodiments, the system can include the picking apparatus, a carriage assembly, a carrier assembly, the one or more imaging sensors, and the processing unit. The carriage assembly can be similar or identical to carriage assembly 140 (FIG. 1) and/or carriage assembly 2040 (FIG. 20). The carrier assembly can be similar or identical to carrier assembly 170 (FIG. 1) and/or carrier assembly 1070 (FIG. 20). In some embodiments, the carriage assembly can include a first rotational mechanism. In many embodiments, the first rotational mechanism can be similar or identical to rotational shaft 655 (FIGS. 6-7), motor 654 (FIGS. 6-8), gear 854 (FIG. 8), gear 855 (FIG. 8), and/or rotational shaft 2146 (FIG. 21). In some embodiments, the carrier assembly can include a second rotational mechanism. The second rotational mechanism can be similar or identical to mounting bearing 1274 (FIGS. 12-13), and/or mounting bearing 2074 (FIG. 20). In a number of embodiments, the carriage assembly can be coupled to the carrier assembly. In several embodiments, the picking apparatus can be coupled to the first rotational mechanism.

In a number of embodiments, the system further comprises a stem separation bar. The stem separation bar can be similar or identical to stem separation bar 2043 (FIGS. 20-27). In many embodiments, the stem separation bar can be configured to provide tension on a stem of the different individual crop when each of the plurality of grippers picks the different individual crop. The stem can be similar or identical to stem 2019 (FIG. 20).

In a several embodiments, method 4700 additionally can include a block 4707 of determining at the processing unit a location of the crops to be harvested.

In a number of embodiments, method 4700 further can include a block 4708 of rotating the carrier assembly and the carriage assembly around the second rotational mechanism such that the picking apparatus is rotated around a single plant of the plants when the second rotational mechanism is centered above the single plant.

In a several embodiments, method 4700 additionally can include a block 4709 of rotating the picking apparatus around the central axis of the picking apparatus using the first rotational mechanism of the carriage assembly. In some embodiments, rotating the picking apparatus around the central axis can include moving the plurality of grippers in a rotational path centered with respect to the central axis of the picking apparatus.

In a number of embodiments, method 4700 optionally can include a block 4710 of opening each of the plurality of grippers to an open position to pick the different individual crop when the gripper is located at a first gripper position of the rotational path. In several embodiments, the first gripper position can be located at a bottom of the rotational path. The open position can be similar or identical to the position of gripper 312 in FIG. 4, gripper 2012 in FIGS. 20, 22-23, and/or gripper 2015 in FIGS. 26-27. The first gripper position can be similar or identical to the position of gripper 2012 in FIGS. 20-27. In other embodiments, the first gripper position can be at a different position, as described above.

In a several embodiments, method 4700 additionally can include a block 4711 of opening each of the plurality of grippers to the open position to offload the different individual crop when the gripper is located at a second gripper position of the rotational path. The second gripper position can be similar or identical to the position of gripper 2015 in FIGS. 20, 22-27. In other embodiments, the second gripper position can be at a different position, as described above. In many embodiments, each of the plurality of grippers can be spring-closed.

In some embodiments, the system further can include one or more actuators configured to open each of the plurality of grippers when the gripper is located at the first and second gripper positions of the rotational path. The actuators can be similar or identical to actuators 2210 and/or 2220 (FIGS. 22-27). In several embodiments, a first actuator of the one or more actuators can be configured to open each of the plurality of grippers when the gripper is located at the first gripper position of the rotational path. The first actuator can be similar or identical to actuator 2210 (FIGS. 22-27). In many embodiments, the first actuator can be further configured to vary an opening width of the gripper located at the first gripper position based on a size of the individual crop to be picked by the gripper.

Figure 48:
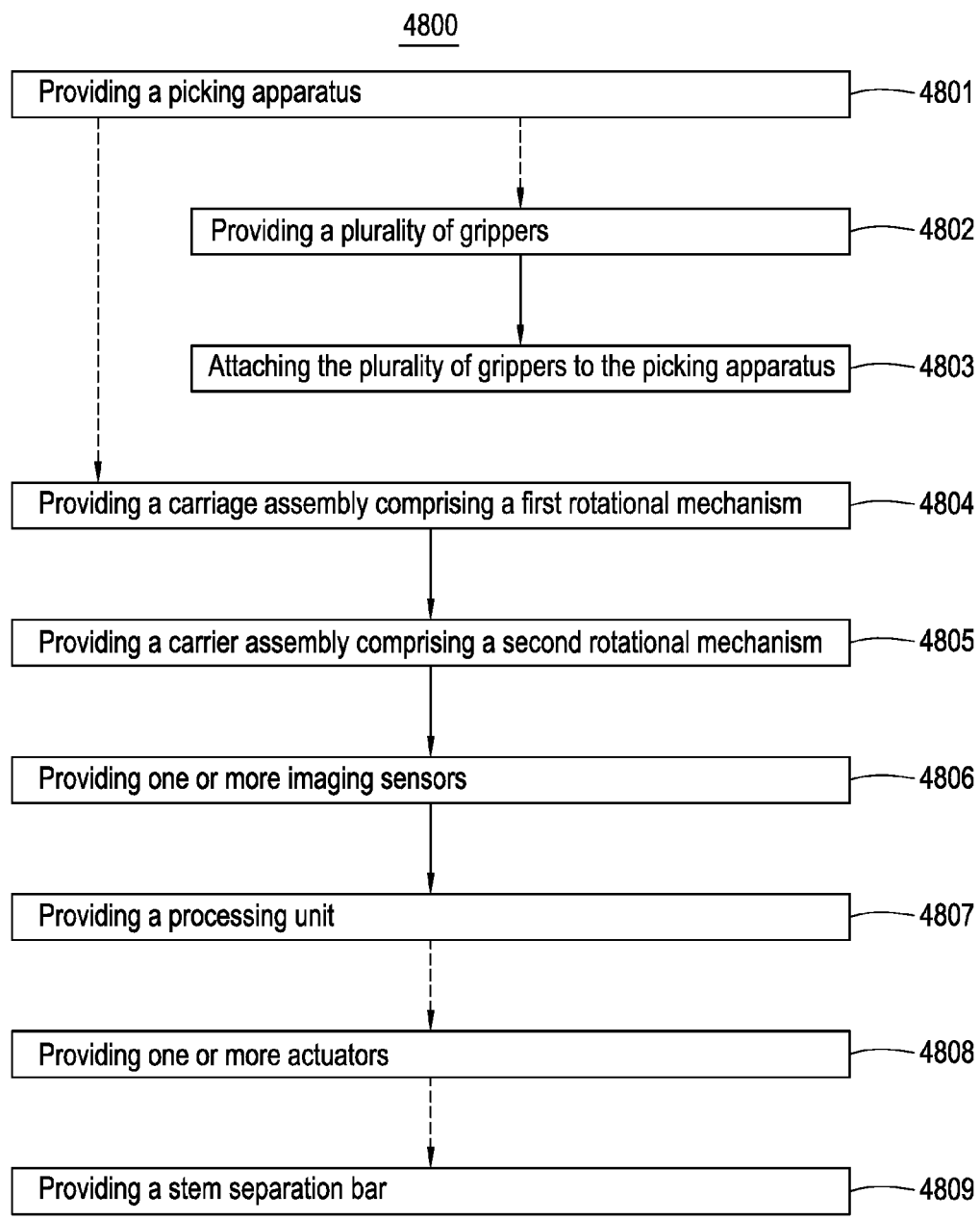
FIG. 48 illustrates a flow chart for a method of providing a system for selectively harvesting crops, according to an embodiment.

Turning ahead in the drawings, FIG. 48 illustrates a flow chart for a method 4800. Method 4800 can be a method of providing a system for selectively harvesting crops. Method 4800 is merely exemplary and is not limited to the embodiments presented herein. Method 4800 can be employed in many different embodiments or examples not specifically depicted or described herein. In some embodiments, the procedures, the processes, and/or the activities of method 4800 can be performed in the order presented. In other embodiments, the procedures, the processes, and/or the activities of method 4800 can be performed in any suitable order. In still other embodiments, one or more of the procedures, the processes, and/or the activities of method 4800 can be combined or skipped.

Referring to FIG. 48, method 4800 can include a block 4801 of providing a picking apparatus. The picking apparatus can be similar or identical to picking apparatus 110 (FIG. 1) and/or picking apparatus 2010 (FIGS. 20-21).

In a number of embodiments, block 4801 can include a block 4802 of providing a plurality of grippers. The grippers can be similar or identical to grippers 312-315 (FIG. 3), grippers 2011-2015 (FIG. 20) and/or gripper 2116 (FIG. 21). In some embodiments, the plurality of grippers each can be configured to pick a different individual crop of crops of plants. Each different individual crop can be similar or identical to one of crops 1511 (FIG. 15). The plants can be similar or identical to plant 1510 (FIG. 15). In some embodiments, the plants can be strawberry plants and each of the crops can be a strawberry. In other embodiments, each of the plants can be another suitable type of plant, such as a tomato plant, a pepper plant, etc., and each of the crops can be another suitable type of crop, such as a tomato, a pepper, etc. In some embodiments, the picking apparatus can be configured to use a first one of the plurality of grippers to pick a first individual crop of the crops at a first time.

In several embodiments, block 4801 additionally can include a block 4803 of attaching the plurality of grippers to the picking apparatus such that the plurality of grippers are each spaced apart and extend radially from a central axis. The central axis can be similar or identical to central axis 311 (FIG. 3). In many embodiments, during a second time period that starts with a second one of the plurality of grippers picking a second individual crop of the crops and ends with a third one of the plurality of grippers picking a third individual crop of the crops, the picking apparatus can be configured to offload the first individual crop from the first one of the plurality of grippers. In many embodiments, the second time period can starts after the first time.

In a number of embodiments, the second and third ones of the plurality of grippers can be configured to hold the second and third individual crops, respectively, at the end of the second time period. In several embodiments, the picking apparatus is configured to pick the first, second, and third individual crops from a first plant of the plants. In many embodiments, a fourth one of the plurality of grippers can be configured to pick a fourth individual crop of the crops after the first time and before the second time period begins. In several embodiments, the second, third, and fourth ones of the plurality of grippers can be configured to hold the second, third, and fourth individual crops, respectively, at the end of the second time period.

In many embodiments, the picking apparatus can be configured to move the plurality of grippers in a rotational path centered with respect to the central axis of the picking apparatus. In various embodiments, each of the plurality of grippers can be configured to be opened to an open position to pick the different individual crop when the gripper is located at a first gripper position of the rotational path. In some embodiments, the first gripper position can be located at a bottom of the rotational path. The first gripper position can be similar or identical to the position of gripper 2012 in FIGS. 20-27. In other embodiments, the first gripper position can be at a different position, as described above. The open position can be similar or identical to the position of gripper 312 in FIG. 4, gripper 2012 in FIGS. 20, 22-23, and/or gripper 2015 in FIGS. 26-27.

In many embodiments, each of the plurality of grippers can be configured to be opened to the open position to offload the different individual crop when the gripper is located at a second gripper position of the rotational path. The second gripper position can be similar or identical to the position of gripper 2015 in FIGS. 20, 22-27. In other embodiments, the second gripper position can be at a different position, as described above. In many embodiments, each of the plurality of grippers can be spring-closed.

In a number of embodiments, method 4800 optionally can include a block 4804 of providing a carriage assembly comprising a first rotational mechanism. The carriage assembly can be similar or identical to carriage assembly 140 (FIG. 1) and/or carriage assembly 2040 (FIG. 20). In many embodiments, the first rotational mechanism can be similar or identical to rotational shaft 655 (FIGS. 6-7), motor 654 (FIGS. 6-8), gear 854 (FIG. 8), gear 855 (FIG. 8), and/or rotational shaft 2146 (FIG. 21). In some embodiments, the picking apparatus can be configured to be coupled to the first rotational mechanism. In many embodiments, the first rotational mechanism can be configured to rotate the picking apparatus around the central axis.

In a several embodiments, method 4800 additionally can include a block 4805 of providing a carrier assembly comprising a second rotational mechanism. The carrier assembly can be similar or identical to carrier assembly 170 (FIG. 1) and/or carrier assembly 1070 (FIG. 20). The second rotational mechanism can be similar or identical to mounting bearing 1274 (FIGS. 12-13), and/or mounting bearing 2074 (FIG. 20). In some embodiments, the carriage assembly can be coupled to the carrier assembly. In a number of embodiments, the second rotational mechanism can be configured to rotate the carrier assembly and the carriage assembly around the second rotational mechanism such that the picking apparatus is rotated around a single plant of the plants when the second rotational mechanism is centered above the single plant.

In a number of embodiments, method 4800 further can include a block 4806 of providing one or more imaging sensors. The imaging sensors can be similar or identical to imaging sensors 1290-1291 (FIGS. 12-13) and/or images sensors 2190-2191 (FIG. 21).

In a several embodiments, method 4800 additionally can include a block 4807 of providing a processing unit. The processing unit can be similar or identical to processing unit 1273 (FIGS. 12-13), processing unit 2173 (FIG. 21), control unit 1272, control unit 2072 (FIGS. 20-21), and/or harvester processing system 5800 (FIG. 58, described below). In some embodiments, the system can include the carriage, the carrier, the one or more imaging sensors, the processing unit, and the picking apparatus. In several embodiments, the processing unit can be configured to receive information from the one or more imaging sensors to determine a location of the crops to be harvested. In several embodiments, each of the plurality of grippers can be spring-closed In a number of embodiments, method 4800 optionally can include a block 4808 of providing one or more actuators. The actuators can be similar or identical to actuators 2210 and/or 2220 (FIGS. 22-27). In some embodiments, the system further can include the one or more actuators. In a number of embodiments, the one or more actuators can be configured to open each of the plurality of grippers when the gripper is located at the first and second gripper positions of the rotational path. In some embodiments, a first actuator of the one or more actuators is configured to open each of the plurality of grippers when the gripper is located at the first gripper position of the rotational path. The first actuator can be similar or identical to actuator 2210 (FIGS. 22-27). In many embodiments, the first actuator can be further configured to vary an opening width of the gripper located at the first gripper position based on a size of the individual crop to be picked by the gripper.

In a several embodiments, method 4800 optionally can include a block 4809 of providing a stem separation bar. The stem separation bar can be similar or identical to stem separation bar 2043 (FIGS. 20-27). In some embodiments, the system further can include the stem separation bar. In many embodiments, the stem separation bar can be configured to provide tension on a stem of the different individual crop when each of the plurality of grippers picks the different individual crop. The stem can be similar or identical to stem 2019 (FIG. 20).

Figure 49:
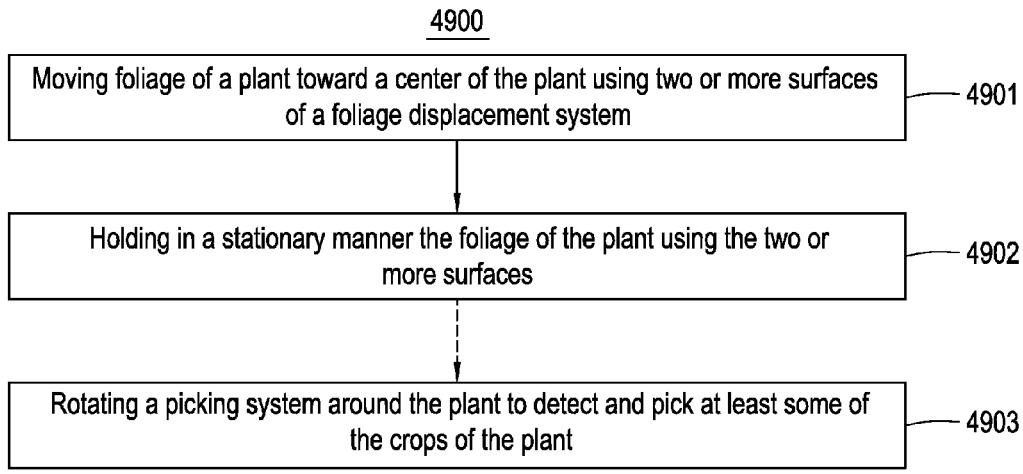
FIG. 49 illustrates a flow chart for a method of holding foliage, according to an embodiment.

Turning ahead in the drawings, FIG. 49 illustrates a flow chart for a method 4900. Method 4900 can be a method of holding foliage. Method 4900 is merely exemplary and is not limited to the embodiments presented herein. Method 4900 can be employed in many different embodiments or examples not specifically depicted or described herein. In some embodiments, the procedures, the processes, and/or the activities of method 4900 can be performed in the order presented. In other embodiments, the procedures, the processes, and/or the activities of method 4900 can be performed in any suitable order. In still other embodiments, one or more of the procedures, the processes, and/or the activities of method 4900 can be combined or skipped. In some embodiments, method 4900 can be performed by a foliage displacement system (e.g., leaf displacement system 2800 (FIGS. 28-31)).

Referring to FIG. 49, method 4900 can include a block 4901 of moving foliage of a plant toward a center of the plant using two or more surfaces of a foliage displacement system such that crops of the plant that underlie the foliage are exposed when the foliage displacement system moves from an open configuration of the foliage displacement system to a closed configuration of the foliage displacement system. The foliage displacement system can be similar or identical to leaf displacement system 2800 (FIGS. 28-31). The foliage can be similar or identical to foliage 1512 (FIGS. 15, 20, 28-29). The crops can be similar or identical to crops 1511 (FIGS. 15, 20, 28-31). The plant can be similar or identical to plant 1510 (FIG. 15). In some embodiments, the plant can be a strawberry plant and each of the crops can be a strawberry. In other embodiments, the plant can be another suitable type of plant, such as a tomato plant, a pepper plant, etc., and the crops can be another suitable type of crop, such as a tomato, a pepper, etc. The two or more surfaces can be similar or identical to first assembly base surface 2851 (FIG. 28), first assembly first wing surface 2852 (FIG. 28), first assembly second wing surface 2853 (FIG. 28), first assembly first plate surface 2874 (FIG. 28), first assembly second plate surface 2855 (FIG. 28), second assembly base surface 2871 (FIG. 28), second assembly first wing surface 2872 (FIG. 28), and/or second assembly second wing surface 2873 (FIG. 28). The open configuration can be similar or identical to the configuration of leaf displacement system 2800 shown in FIG. 28. The closed configuration can be similar or identical to the configuration of leaf displacement system 2800 shown in FIG. 31.

In many embodiments, the foliage displacement system can include a support structure and the two or more surfaces. The support structure can be similar or identical to support structure 2810 (FIG. 28). In various embodiments, the two or more surfaces can be movably coupled to the support structure and configured to move between the open configuration to the closed configuration.

In a number of embodiments, method 4900 also can include a block 4902 of holding in a stationary manner the foliage of the plant using the two or more surfaces when the foliage displacement system is in the closed configuration to keep the crops of the plant exposed, such as shown in FIG. 31, for example In some embodiments, holding in the stationary manner the foliage of the plant using the two or more surfaces can include holding in a stationary manner the foliage of the plant within a first circumference approximately centered at the center of the plant when the foliage displacement system is in the closed configuration. In some embodiments, the first circumference can be no more than 15.24 cm. In other embodiments, the first circumference can be another suitable circumference, such as described above.

In several embodiments, the foliage displacement system further can include a first surface assembly and a second surface assembly movably coupled to the support structure. The first surface assembly can be similar or identical to first assembly 2850 (FIGS. 28-31). The second surface assembly can be similar or identical to second assembly 2870 (FIGS. 28-31). In several embodiments, the foliage displacement system can be configured in the open configuration to dispose the first surface assembly on a first side of the plant and dispose the second surface assembly on a second side of the plant opposite the first side of the plant, such as shown in FIG. 28. In a number of embodiments, the first surface assembly and the surface second assembly each can be slidably coupled to the support structure.

In many embodiments, the first surface assembly can include at least a first surface of the two or more surfaces. For example, the first surface can be similar or identical to first assembly base surface 2851 (FIG. 28). In many embodiments, the second surface assembly can include at least a second surface of the two or more surfaces. For example, the second surface can be similar or identical to second assembly base surface 2871 (FIG. 28), second assembly first wing surface 2872 (FIG. 28), and/or second assembly second wing surface 2873 (FIG. 28).

In some embodiments, the first surface assembly can include two or more first assembly surfaces movable with respect to each other. The two or more first assembly surfaces can be similar or identical to first assembly base surface 2851 (FIG. 28), first assembly first wing surface 2852 (FIG. 28), first assembly second wing surface 2853 (FIG. 28). In various embodiments, the second surface assembly can include two or more second assembly surfaces movable with respect to each other. In some embodiments, the two or more second assembly surface can be similar or identical to second assembly base surface 2871 (FIG. 28), second assembly first wing surface 2872 (FIG. 28), and/or second assembly second wing surface 2873 (FIG. 28). In several embodiments, the two or more first assembly surfaces and the two or more second assembly surfaces can be configured to comprise a cylindrical shell in the closed configuration. The cylindrical shell can be similar or identical to the cylindrical shell formed by first assembly base surface 2851 (FIG. 28), first assembly first wing surface 2852 (FIG. 28), first assembly second wing surface 2853 (FIG. 28), second assembly base surface 2871 (FIG. 28), second assembly first wing surface 2872 (FIG. 28), and second assembly second wing surface 2873 (FIG. 28) in the closed configuration as shown in FIG. 31.

In various embodiments, the first surface assembly further can include a third surface of the two or more surfaces. The third surface can be similar or identical to first assembly second plate surface 2855 (FIG. 28). In some embodiments, the first surface of the two or more surfaces and the third surface of the two or more surfaces can be movable with respect to each other. In a number of embodiments, the foliage displacement system can be configured in the closed configuration to enclose the first surface of the two or more surfaces and the third surface of the two or more surfaces within the cylindrical shell of the two or more first assembly surfaces and the two or more second assembly surfaces.

In many embodiments, the foliage displacement system can be configured to keep a bottommost part of each of the two or more surfaces a first distance from a bed of the plant when the foliage displacement system moves from the open configuration to the closed configuration. In some embodiments, the first distance can be approximately 5.08 cm to approximately 10.16 cm. In other embodiments, the first distance can be a different suitable distances, such as described above.

In several embodiments, method 4900 optionally can include a block 4903 of rotating a picking system around the plant to detect and pick at least some of the crops of the plant that are exposed when the foliage displacement system is holding the foliage in the closed configuration. The picking system can be similar or identical to harvesting robot 100 (FIG. 1) and/or harvesting robot 2000 (FIGS. 20-21)). In several embodiments, the foliage displacement system does not rotate with the picking system.

Figure 50:
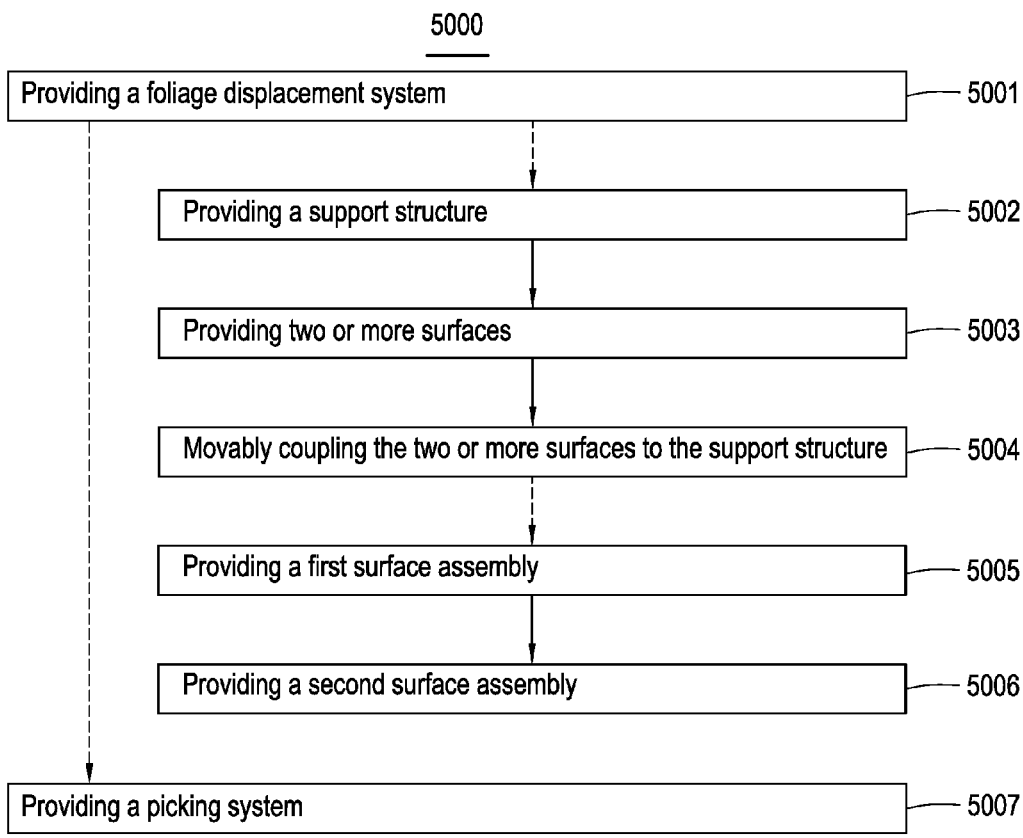
FIG. 50 illustrates a flow chart for a method of providing a system for foliage holding, according to an embodiment.

Proceeding to the next drawing, FIG. 50 illustrates a flow chart for a method 5000. Method 5000 can be a method of providing a system for foliage holding. Method 5000 is merely exemplary and is not limited to the embodiments presented herein. Method 5000 can be employed in many different embodiments or examples not specifically depicted or described herein. In some embodiments, the procedures, the processes, and/or the activities of method 5000 can be performed in the order presented. In other embodiments, the procedures, the processes, and/or the activities of method 5000 can be performed in any suitable order. In still other embodiments, one or more of the procedures, the processes, and/or the activities of method 5000 can be combined or skipped.

Referring to FIG. 50, method 5000 can include a block 5001 of providing a foliage displacement system. The foliage displacement system can be similar or identical to leaf displacement system 2800 (FIGS. 28-31).

In a number of embodiments, block 5001 can include a block 5002 of providing a support structure. The support structure can be similar or identical to support structure 2810 (FIG. 28).

In several embodiments, block 5001 additionally can include a block 5003 of providing two or more surfaces. The two or more surfaces can be similar or identical to first assembly base surface 2851 (FIG. 28), first assembly first wing surface 2852 (FIG. 28), first assembly second wing surface 2853 (FIG. 28), first assembly first plate surface 2874 (FIG. 28), first assembly second plate surface 2855 (FIG. 28), second assembly base surface 2871 (FIG. 28), second assembly first wing surface 2872 (FIG. 28), and/or second assembly second wing surface 2873 (FIG. 28).

In a number of embodiments, block 5001 further can include a block 5004 of movably coupling the two or more surfaces to the support structure, such that the two or more surfaces are configured to move between an open configuration of the foliage displacement system and a closed configuration of the foliage displacement system. The open configuration can be similar or identical to the configuration of leaf displacement system 2800 shown in FIG. 28. The closed configuration can be similar or identical to the configuration of leaf displacement system 2800 shown in FIG. 31.

In some embodiments, the two or more surfaces can be configured to move foliage of a plant toward a center of the plant such that crops of the plant that underlie the foliage are exposed when the foliage displacement system moves from the open configuration to the closed configuration. The foliage can be similar or identical to foliage 1512 (FIGS. 15, 20, 28-29). The crops can be similar or identical to crops 1511 (FIGS. 15, 20, 28-31). The plant can be similar or identical to plant 1510 (FIG. 15). In some embodiments, the plant can be a strawberry plant and each of the crops can be a strawberry. In other embodiments, the plant can be another suitable type of plant, such as a tomato plant, a pepper plant, etc., and the crops can be another suitable type of crop, such as a tomato, a pepper, etc.

In some embodiments, the two or more surfaces can be configured to hold in a stationary manner the foliage of the plant within a first circumference approximately centered at the center of the plant when the foliage displacement system is in the closed configuration. In some embodiments, the first circumference can be no more than 15.24 cm. In other embodiments, the first circumference can be another suitable circumference, such as described above.

In many embodiments, the foliage displacement system can be configured to keep a bottommost part of each of the two or more surfaces a first distance from a bed of the plant when the foliage displacement system moves from the open configuration to the closed configuration. In some embodiments, the first distance can be approximately 5.08 cm to approximately 10.16 cm. In other embodiments, the first distance can be a different suitable distances, such as described above.

In a several embodiments, block 5001 additionally can include a block 5005 of providing a first surface assembly movably coupled to the support structure. The first surface assembly can be similar or identical to first assembly 2850 (FIGS. 28-31). In some embodiments, the first surface assembly can include at least a first surface of the two or more surface. For example, the first surface can be similar or identical to first assembly base surface 2851 (FIG. 28).

In a number of embodiments, block 5001 further can include a block 5006 of providing a second surface assembly movably coupled to the support structure. The second surface assembly can be similar or identical to second assembly 2870 (FIGS. 28-31). The second surface assembly can include at least a second surface of the two or more surfaces. For example, the second surface can be similar or identical to second assembly base surface 2871 (FIG. 28), second assembly first wing surface 2872 (FIG. 28), and/or second assembly second wing surface 2873 (FIG. 28).

In many embodiments, the foliage displacement system can be configured in the open configuration to dispose the first surface assembly on a first side of the plant and dispose the second surface assembly on a second side of the plant opposite the first side of the plant, such as shown in FIG. 28. In various embodiments, the first surface assembly and the second surface assembly each can be slidably coupled to the support structure.

In some embodiments, the first surface assembly can include two or more first assembly surfaces movable with respect to each other. The two or more first assembly surfaces can be similar or identical to first assembly base surface 2851 (FIG. 28), first assembly first wing surface 2852 (FIG. 28), first assembly second wing surface 2853 (FIG. 28). In various embodiments, the second surface assembly can include two or more second assembly surfaces movable with respect to each other. In some embodiments, the two or more second assembly surface can be similar or identical to second assembly base surface 2871 (FIG. 28), second assembly first wing surface 2872 (FIG. 28), and/or second assembly second wing surface 2873 (FIG. 28). In several embodiments, the two or more first assembly surfaces and the two or more second assembly surfaces can be configured to comprise a cylindrical shell in the closed configuration. The cylindrical shell can be similar or identical to the cylindrical shell formed by first assembly base surface 2851 (FIG. 28), first assembly first wing surface 2852 (FIG. 28), first assembly second wing surface 2853 (FIG. 28), second assembly base surface 2871 (FIG. 28), second assembly first wing surface 2872 (FIG. 28), and second assembly second wing surface 2873 (FIG. 28) in the closed configuration as shown in FIG. 31.

In various embodiments, the first surface assembly further can include a third surface of the two or more surfaces. The third surface can be similar or identical to first assembly second plate surface 2855 (FIG. 28). In some embodiments, the first surface of the two or more surfaces and the third surface of the two or more surfaces can be movable with respect to each other. In a number of embodiments, the foliage displacement system can be configured in the closed configuration to enclose the first surface of the two or more surfaces and the third surface of the two or more surfaces within the cylindrical shell of the two or more first assembly surfaces and the two or more second assembly surfaces.

In a several embodiments, method 5000 optionally can include a block 5007 of providing a picking system configured to rotate around the plant to detect and pick at least some of the crops of the plant that are exposed when the foliage displacement system is holding the foliage in the closed configuration. The picking system can be similar or identical to harvesting robot 100 (FIG. 1) and/or harvesting robot 2000 (FIGS. 20-21)). In several embodiments, the foliage displacement system does not rotate with the picking system.

Figure 51:
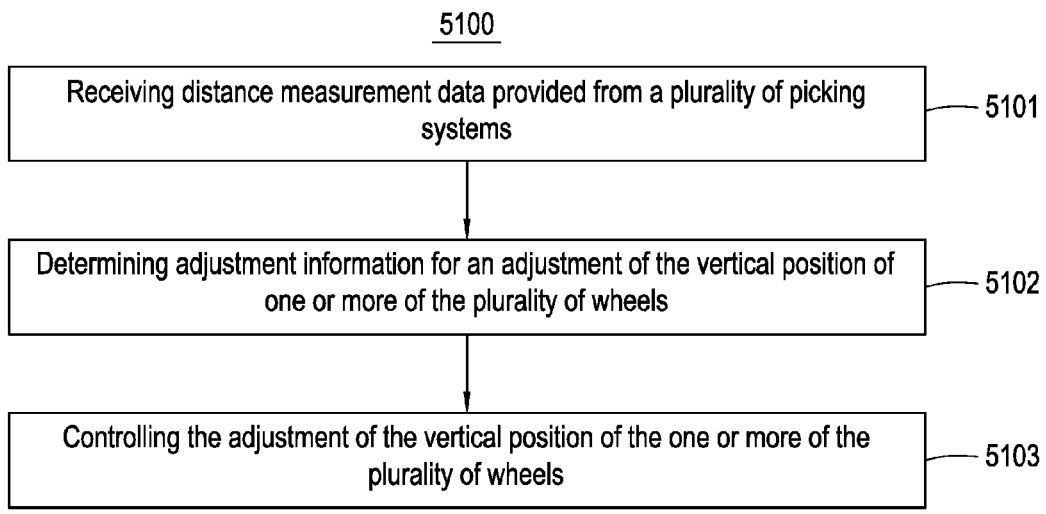
FIG. 51 illustrates a flow chart for a method of facilitating a suspension system for a vehicle, according to an embodiment.

Turning ahead in the drawings, FIG. 51 illustrates a flow chart for a method 5100. Method 5100 can be a method of facilitating a suspension system for a vehicle. Method 5100 is merely exemplary and is not limited to the embodiments presented herein. Method 5100 can be employed in many different embodiments or examples not specifically depicted or described herein. In some embodiments, the procedures, the processes, and/or the activities of method 5100 can be performed in the order presented. In other embodiments, the procedures, the processes, and/or the activities of method 5100 can be performed in any suitable order. In still other embodiments, one or more of the procedures, the processes, and/or the activities of method 5100 can be combined or skipped. In some embodiments, method 5100 can be performed by harvesting vehicle 3200 (FIGS. 32-34), vehicle 4001 (FIGS. 40-42), and/or vehicle 4500 (FIGS. 45-46), such as by various components of suspension components 4400 (FIG. 44) and/or suspension control system 5803 (FIG. 58, described below).

Referring to FIG. 51, method 5100 can include a block 5101 of receiving distance measurement data provided from a plurality of picking systems carried by a harvesting vehicle over plants growing in one or more plant beds to harvest crops of the plants. The picking systems can be similar or identical to harvesting robot 100 (FIG. 1) and/or harvesting robot 2000 (FIGS. 20-21)). The crops can be similar or identical to crops 1511 (FIGS. 15, 20, 28-31). The plants can be similar or identical to plant 1510 (FIG. 15). In some embodiments, the plants can be strawberry plants and each of the crops can be a strawberry. In other embodiments, the plants can be another suitable type of plants, such as a tomato plant, a pepper plant, etc., and the crops can be another suitable type of crop, such as a tomato, a pepper, etc. The plant beds can be similar or identical to plant beds 1501

(FIGS. 15-16, 20, 28-31), 3281-3290 (FIGS. 32-34), 3801 (FIGS. 38-39), 4021-4032 (FIG. 40), and/or 4300 (FIG. 43).

Figure 57:
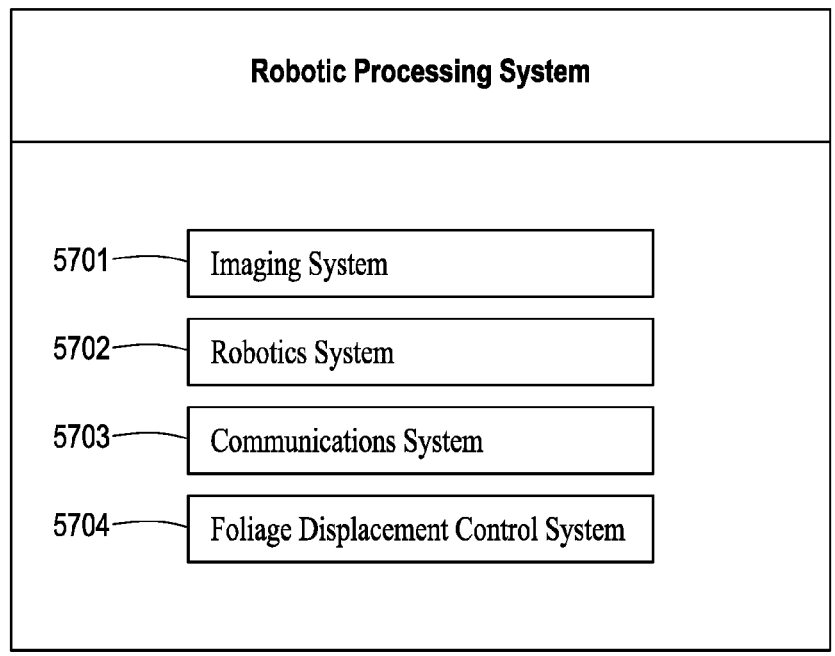
FIG. 57 illustrates a block diagram of a robotic processing system, according to an embodiment.

In several embodiments, each picking system can include an imaging system and can be configured to determine a height of the picking system over one of the one or more plant beds as the picking system is carried over the plants. The height can be similar or identical to heights 4550 (FIG. 45) or 4650 (FIG. 46). The imaging system can be similar or identical to imaging sensors imaging sensors 1290-1291 (FIGS. 12-13), imaging sensors 2190-2191 (FIG. 21) and/or imaging system 5701 (FIG. 57, described below). In some embodiments, the distance measurement data can be based on the height.

In various embodiments, the harvesting vehicle can include (a) a body including the plurality of picking systems and (b) a plurality of wheels each having a vertical position with respect to the body. The body can be similar or identical to body 3210 (FIGS. 32-34), body 4406 (FIG. 44), and/or body 4520 (FIGS. 45-46). The wheels can be similar or identical to wheels 3203-3204 (FIGS. 32-34), wheels 4002-4003 (FIGS. 40-42), wheel 4401 (FIG. 44), and/or wheels 4501-4504 (FIGS. 45-46). In many embodiments, each of the plurality of wheels can be slidably coupled to the body, such as with adjustment mechanism 4407 (FIG. 44).

In some embodiments, the height of the picking system over the one of the one or more plant beds can be determined based on a distance between the imaging system of the picking system and one or more of the crops of the plants in the one of the one or more plant beds. In many embodiments, each picking system can provide the distance measurement data at least twice per second. In other embodiments, the distance measurement data can be provided at another suitable rate, as described above.

In a number of embodiments, method 5100 also can include a block 5102 of determining adjustment information for an adjustment of the vertical position of one or more of the plurality of wheels with respect to the body based at least in part on the distance measurement data provided by at least one of the plurality of picking systems. In many embodiments, the harvesting vehicle further can include a plurality of suspension actuators each corresponding to a different wheel of the plurality of wheels and each configured to adjust the vertical position of the corresponding wheel of the plurality of wheels independent of adjustments to other wheels of the plurality of wheels by others of the plurality of suspension actuators. The suspension actuators can be similar or identical to actuator 4408 (FIG. 44). In many embodiments, block 5102 of determining the adjustment information further can include determining the adjustment information at least in part based on the distance measurement data provided by all of the plurality of picking systems. In the same or other embodiments, block 5102 of determining the adjustment information further can include determining the adjustment information at least in part based on an average of the distance measurement data provided by all of the plurality of picking systems.

In several embodiments, method 5100 additionally can include a block 5103 of controlling the adjustment of the vertical position of the one or more of the plurality of wheels with respect to the body based on the adjustment information. In a number of embodiments, block 5103 of controlling the adjustment of the vertical position of the one or more of the plurality of wheels can include controlling the adjustment of the vertical position of the one or more of the plurality of wheels such that a bottommost part of each of the plurality of picking systems can be kept at a first distance above a bed of the one or more plant beds when the picking system is being carried over the bed. In some embodiments, the first distance can be approximately 5.08 cm to approximately 12.7 cm. In other embodiments, the first distance can be another suitable distance or another suitable range of distances.

Figure 52:
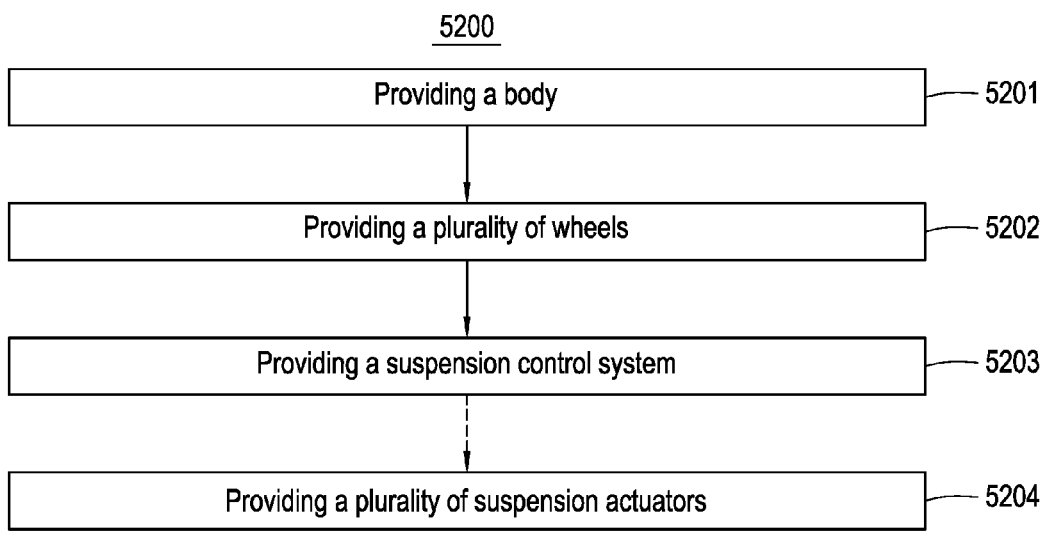
FIG. 52 illustrates a flow chart for a method of providing a harvesting vehicle with a suspension system, according to an embodiment.

Proceeding to the next drawing, FIG. 52 illustrates a flow chart for a method 5200. Method 5200 can be a method of providing a harvesting vehicle with a suspension system. Method 5200 is merely exemplary and is not limited to the embodiments presented herein. Method 5200 can be employed in many different embodiments or examples not specifically depicted or described herein. In some embodiments, the procedures, the processes, and/or the activities of method 5200 can be performed in the order presented. In other embodiments, the procedures, the processes, and/or the activities of method 5200 can be performed in any suitable order. In still other embodiments, one or more of the procedures, the processes, and/or the activities of method 5200 can be combined or skipped. In some embodiments, the harvesting vehicle can be similar or identical to harvesting vehicle 3200 (FIGS. 32-34), vehicle 4001 (FIGS. 40-42), and/or vehicle 4500 (FIGS. 45-46).

Referring to FIG. 52, method 5200 can include a block 5201 of providing a body comprising a plurality of picking systems configured to be carried over plants growing in one or more plant beds to harvest crops of the plants, each picking system comprising an imaging system and configured to (a) determine a height of the picking system over one of the one or more plant beds as the picking system is carried over the plants and (b) provide distance measurement data based on the height. The body can be similar or identical to body 3210 (FIGS. 32-34), body 4406 (FIG. 44), and/or body 4520 (FIGS. 45-46). The picking systems can be similar or identical to harvesting robot 100 (FIG. 1) and/or harvesting robot 2000 (FIGS. 20-21)). The crops can be similar or identical to crops 1511 (FIGS. 15, 20, 28-31). The plants can be similar or identical to plant 1510 (FIG. 15). In some embodiments, the plants can be strawberry plants and each of the crops can be a strawberry. In other embodiments, the plants can be another suitable type of plants, such as a tomato plant, a pepper plant, etc., and the crops can be another suitable type of crop, such as a tomato, a pepper, etc. The plant beds can be similar or identical to plant beds 1501 (FIGS. 15-16, 20, 28-31), 3281-3290 (FIGS. 32-34), 3801 (FIGS. 38-39), 4021-4032 (FIG. 40), and/or 4300 (FIG. 43).

In several embodiments, each picking system can provide the distance measurement data at least twice per second. In other embodiments, the distance measurement data can be provided at another suitable rate, as described above. In some embodiments, the height of the picking system over one of the one or more plant beds can be determined based on a distance between the imaging system of the picking system and one or more of the crops of the plants in the one of the one or more plant beds. The height can be similar or identical to heights 4550 (FIG. 45) or 4650 (FIG. 46).

In a number of embodiments, method 5200 also can include a block 5202 of providing a plurality of wheels each having a vertical position with respect to the body. The wheels can be similar or identical to wheels 3203-3204 (FIGS. 32-34), wheels 4002-4003 (FIGS. 40-42), wheel 4401 (FIG. 44), and/or wheels 4501-4504 (FIGS. 45-46). In many embodiments, each of the plurality of wheels can be slidably coupled to the body, such as with adjustment mechanism 4407 (FIG. 44).

In some embodiments, the suspension control system can be further configured to control the adjustment of the vertical position of the one or more of the plurality of wheels such that a bottommost part of each of the plurality of picking systems can be kept at a first distance above a bed of the one or more plant beds when the picking system is being carried over the bed. In some embodiments, the first distance can be approximately 5.08 cm to approximately 12.7 cm. In other embodiments, the first distance can be another suitable distance or another suitable range of distances.

In several embodiments, method 5200 additionally can include a block 5203 of providing a suspension control system. The suspension control system can be similar or identical to suspension control system 5803 (FIG. 58, described below). In many embodiments, the suspension control system can be configured to perform receiving the distance measurement data from the plurality of picking systems.

In many embodiments, the suspension control system additionally can be configured to perform determining adjustment information for an adjustment of the vertical position of one or more of the plurality of wheels with respect to the body based at least in part on the distance measurement data provided by at least one of the plurality of picking systems. In many embodiments, determining the adjustment information further can include determining the adjustment information at least in part based on the distance. In several embodiments, determining the adjustment information further can include determining the adjustment information at least in part based on an average of the distance measurement data provided by all of the plurality of picking systems.

In many embodiments, the suspension control system can be further configured to perform controlling the adjustment of the vertical position of the one or more of the plurality of wheels with respect to the body based on the adjustment information.

In a number of embodiments, method 5200 optionally can include a block 5204 of providing a plurality of suspension actuators each corresponding to a different wheel of the plurality of wheels and each configured to adjust the vertical position of the corresponding wheel of the plurality of wheels independent of adjustments to other wheels of the plurality of wheels by others of the plurality of suspension actuators. The suspension actuators can be similar or identical to actuator 4408 (FIG. 44).

Figure 53:
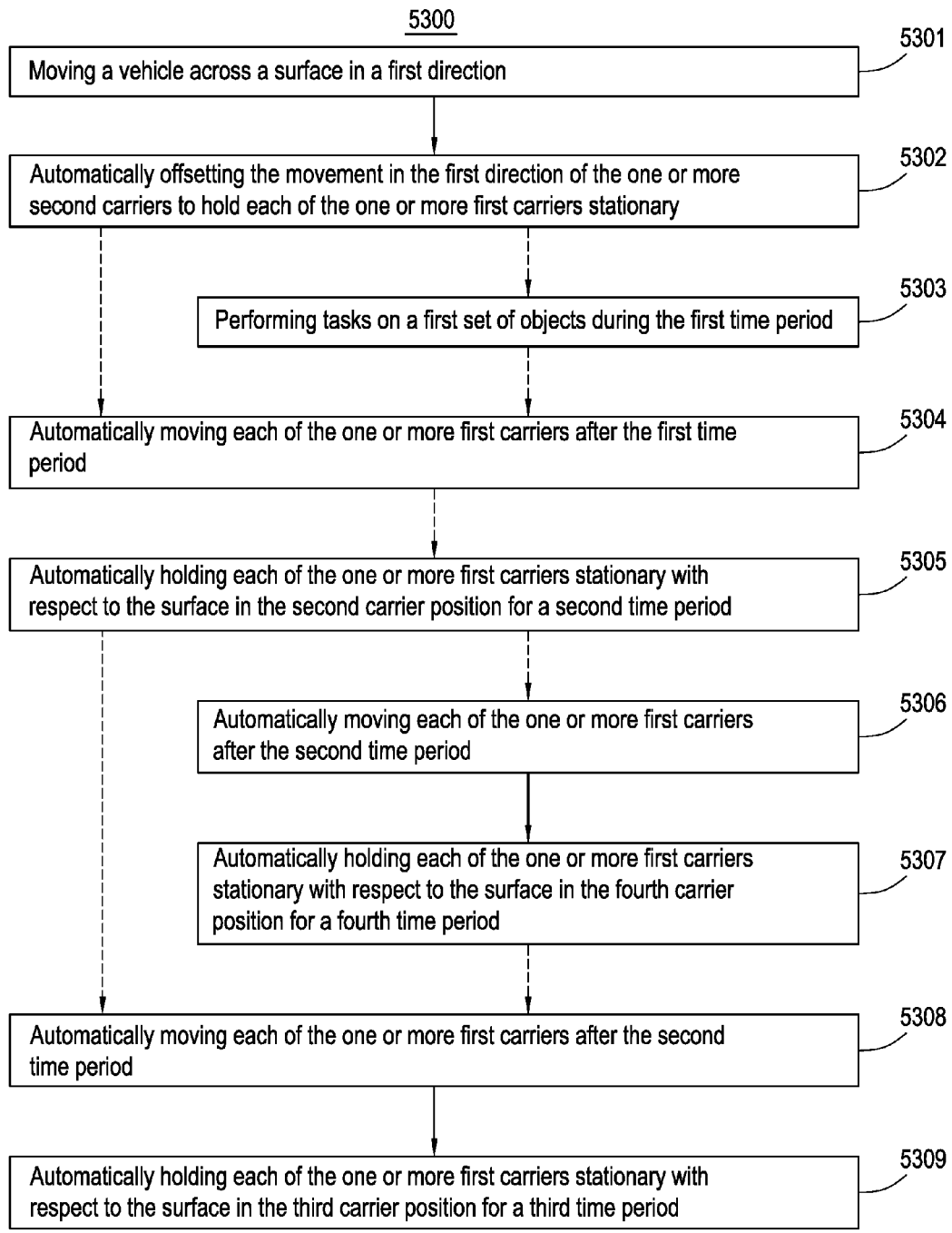
FIG. 53 illustrates a flow chart for a method of performing robot positioning with station-keeping, according to an embodiment.

Turning ahead in the drawings, FIG. 53 illustrates a flow chart for a method 5300. Method 5300 can be a method of performing robot positioning with station-keeping. Method 5300 is merely exemplary and is not limited to the embodiments presented herein. Method 5300 can be employed in many different embodiments or examples not specifically depicted or described herein. In some embodiments, the procedures, the processes, and/or the activities of method 5300 can be performed in the order presented. In other embodiments, the procedures, the processes, and/or the activities of method 5300 can be performed in any suitable order. In still other embodiments, one or more of the procedures, the processes, and/or the activities of method 5300 can be combined or skipped. In some embodiments, method 5300 can be performed by harvesting vehicle 3200 (FIGS. 32-34), vehicle 4001 (FIGS. 40-42), and/or vehicle 4500 (FIGS. 45-46).

Referring to FIG. 53, method 5300 can include a block 5301 of moving a vehicle across a surface in a first direction, such that one or more second carriers coupled to the vehicle are moved in the first direction with respect to the surface. The vehicle can be similar or identical to harvesting vehicle 3200 (FIGS. 32-34), vehicle 4001 (FIGS. 40-42), and/or vehicle 4500 (FIGS. 45-46). The first direction can be the X-axis direction shown in FIG. 41, the right-to-left direction of travel of track 3802 in FIG. 38, and/or the right-to-left direction of vehicle 4001 in FIG. 40 from time view 4011 to time view 4012. The surface can be plant beds 1501 (FIGS. 15-16, 20, 28-31), plant beds 3281-3290 (FIGS. 32-34), plant beds 3801 (FIGS. 38-39), plant beds 4021-4032 (FIG. 40), and/or 4300 (FIG. 43), rows 3291-3299 (FIGS. 32-34), rows 4041-4051 (FIG. 40), and/or another suitable surface, such as a work surface. The second carriers can be similar or identical to RPC tracks 3334-3337 (FIGS. 33-34), track 3802 (FIG. 38), and/or RPC tracks 4004-4007 (FIGS. 40-42).

In some embodiments, the one or more second carriers can be movably coupled to and can carry one or more first carriers each configured to carry two or more robotic systems. The first carriers can be similar or identical to RPCs 3240, 3250, 3260, 3270 (FIGS. 32-34), and/or RPC 3803 (FIG. 38). The robotic systems can be similar or identical to harvesting robot 100 (FIG. 1), harvesting robot 2000 (FIG. 20), harvesting robots 3461-3464 (FIGS. 34-36), robots 3804-3807 (FIG. 38), and/or other suitable robotic systems, such as the hole-punching robot described above.

In a number of embodiments, method 5300 also can include a block 5302 of automatically offsetting the movement in the first direction of the one or more second carriers to hold each of the one or more first carriers in a first carrier position and stationary with respect to the surface for a first time period while the vehicle moves the one or more second carriers in the first direction, such that the two or more robotic systems carried by each of the one or more first carriers are carried in a stationary manner with respect to the surface for the first time period by each of the one or more first carriers. For example, as shown in FIG. 38, the first carrier position can be the position of RPC 3803 in time views 3811-3812 during the first time period in which track 3802 moves in the first direction.

In several embodiments, the two or more robotic systems on each of the one or more first carriers can be removably coupled to the one or more first carriers. In some embodiments, each of the two or more robotic systems on each of the one or more first carriers can include hole puncher, as described above. In a number of embodiments, the vehicle can automatically move across the surface at an approximately constant velocity in the first direction.

In several embodiments, method 5300 optionally can include a block 5303 of performing tasks on a first set of objects during the first time period using the two or more robotic systems carried by each of the one or more first carriers. In some embodiments, the first set of objects can include plants. In other embodiments, the first set of objects can be other suitable object on which a robotic system can perform work. In several embodiments, the tasks can include picking crops from the plants. The crops can be similar or identical to crops 1511 (FIGS. 15, 20, 28-31). The plants can be similar or identical to plant 1510 (FIG. 15). In some embodiments, the plants can be strawberry plants and each of the crops can be a strawberry. In other embodiments, the plants can be another suitable type of plants, such as a tomato plant, a pepper plant, etc., and the crops can be another suitable type of crop, such as a tomato, a pepper, etc.

In some embodiments, block 5303 of performing tasks on the first set of objects during the first time period using the two or more robotic systems carried by each of the one or more first carriers can include simultaneously and independently detecting and picking ripe strawberries from the strawberry plants using the two or more robotic systems carried by each of the one or more first carriers.

In a number of embodiments, method 5300 optionally can include, after block 5302 or block 5303, a block 5304 of automatically moving each of the one or more first carriers after the first time period from the first carrier position relative to the surface to a second carrier position relative to the surface. For example, as shown in FIG. 38, RPC 3803 can move from the first carrier position of RPC 3803 in time view 3812 to the second carrier position of RPC 3803 in time view 3813.

In a several embodiments, method 5300 optionally can include a block 5305 of automatically holding each of the one or more first carriers in the second carrier position and stationary with respect to the surface for a second time period while the vehicle moves the one or more second carriers in the first direction with respect to the surface, such that at least a portion of each of the two or more robotic systems carried by each of the one or more first carriers is carried in the stationary manner with respect to the surface for the second time period by each of the one or more first carriers. For example, as shown in FIG. 38, the second carrier position can be the position of RPC 3803 in time views 3813-3814 during the second time period in which track 3802 moves in the first direction. In many embodiments, the second time period can occur after the first time period.

In some embodiments, a first set of robot positions for the two or more robotic systems during the first time period can include a first robot position and a second robot position. For example, the first robot position can be similar or identical to the position of robot 3806 in time views 3811-3812 of FIG. 38, which can be at plant 3881, as shown in FIGS. 38-39. The first robot position can be similar or identical to the position of robot 3804 in time views 3811-3812 of FIG. 38, which can be at plant 3884, as shown in FIGS. 38-39. A second set of robot positions for the two or more robotic systems during the second time period can include a third robot position and a fourth robot position. For example, the third robot position can be similar or identical to the position of robot 3806 in time views 3813-3814 of FIG. 38, which can be at plant 3882, as shown in FIGS. 38-39. The fourth robot position can be similar or identical to the position of robot 3804 in time views 3813-3814 of FIG. 38, which can be at plant 3885, as shown in FIGS. 38-39. In some embodiments, the first, second, third, and fourth robot positions can be located in a single straight or curved row extending in the first direction. The single row can be similar or identical to plant row 3901 (FIG. 39) and/or plant row 3902 (FIG. 39). In some embodiments, the single row can include an ordering of the first, second, third, and fourth robot positions such that, when moving in the first direction, the first robot position is located before the third robot position, the third robot position is located before the second robot position, and the second robot position is located before the fourth robot position, such as shown in FIGS. 38-39.

In a number of embodiments, method 5300 optionally can include a block 5306 of automatically moving each of the one or more first carriers after the second time period and before the third time period (described below) from the second carrier position to a fourth carrier position. For example, as shown in FIG. 38, RPC 3803 can move from the second carrier position of RPC 3803 in time view 3814 to the fourth carrier position of RPC 3803 in time view 3815.

In a several embodiments, method 5300 optionally can include a block 5307 of automatically holding each of the one or more first carriers in the fourth carrier position and stationary with respect to the surface for a fourth time period while the vehicle moves the one or more carriers in the first direction with respect to the surface, such that at least the portion of each of the two or more robotic systems carried by each of the one or more first carriers is carried in a stationary manner with respect to the surface for the fourth time period by each of the one or more first carriers in a fourth set of robot positions. For example, as shown in FIG. 38, the fourth carrier position can be the position of RPC 3803 in time views 3815-3816 during the fourth time period in which track 3802 moves in the first direction. In many embodiments, the fourth time period can occur after the second time period.

In some embodiments, the fourth set of robot positions can include a fifth robot position and a sixth robot position. For example, the fifth robot position can be similar or identical to the position of robot 3806 in time views 3815-3816 of FIG. 38, which can be at plant 3883, as shown in FIGS. 38-39. The sixth robot position can be similar or identical to the position of robot 3804 in time views 3815-3816 of FIG. 38, which can be at plant 3886, as shown in FIGS. 38-39. In some embodiments, the fifth and sixth robot positions can be located in the single row, as shown in FIG. 39. In many embodiments, when the vehicle moves in the first direction, the third robot position is located before the fifth robot position, the fifth robot position is located before the second robot position, the fourth robot position is located before the sixth robot position, and the sixth robot position is located before each robot position of the third set of robot positions, such as shown in FIG. 39.

In a number of embodiments, method 5300 further can include a block 5308 of automatically moving each of the one or more first carriers after the second time period from the second carrier position to a third carrier position. For example, as shown in FIG. 38, RPC 3803 can move from the second carrier position of RPC 3803 in time view 3814 to the third carrier position of RPC 3803 in time view 3817. In some embodiments, one or more first carriers can move to the fourth carrier position between the second carrier position and the third carrier position, such as when the one or more first carriers are used to perform tasks on three different objects with each robot before a leap-frog progression. In other embodiments, the one or more first carriers can move directly from the second carrier position to the third carrier position, such as when the one or more first carriers are used to perform tasks on two different objects with each robot before a leap-frog adjustment. In other embodiments, the one or more first carriers can perform objections on a different number of objects with each robot before a leap-frog progression, such as four, five, six, seven, eight, nine, or ten objections.

In a several embodiments, method 5300 optionally can include, after block 5306 or block 5308, a block 5309 of automatically holding each of the one or more first carriers in the third carrier position and stationary with respect to the surface for a third time period while the vehicle moves the one or more carriers in the first direction with respect to the surface, such that at least the portion of each of the two or more robotic systems carried by each of the one or more first carriers is carried in the stationary manner with respect to the surface for the third time period by each of the one or more first carriers in a third set of robot positions. For example, as shown in FIG. 38, the third carrier position can be the position of RPC 3803 in time view 3817 during the third time period in which track 3802 moves in the first direction. In many embodiments, the third time period can occur after the second time period. In some embodiments, the third time period can occur after the fourth time period. In several embodiments, each robot position of the third set of robot positions can be located in the single row. For example, the third set of robot positions can be similar or identical to the position of robot 3806 in time view 3817 of FIG. 38, which can be at plant 3887, and/or the position of robot 3804 in time view 3817 of FIG. 38, which can be at plant 3890, as shown in FIGS. 38-39. In several embodiments, when the vehicle moves in the first direction, the fourth robot position can be located before each robot position of the third set of robot positions, such as shown in FIG. 39.

Figure 54:
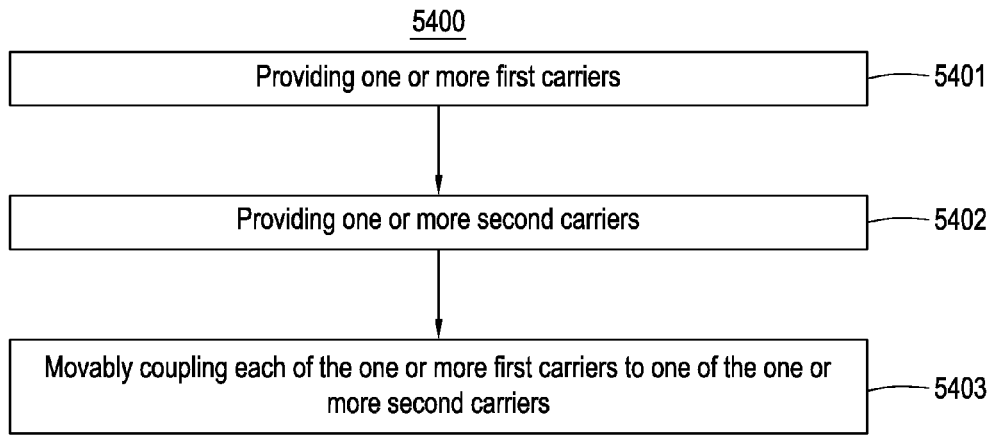
FIG. 54 illustrates a flow chart for a method of providing a system for robot positioning with station-keeping, according to an embodiment.

Turning ahead in the drawings, FIG. 54 illustrates a flow chart for a method 5400. Method 5400 can be a method of providing a system for robot positioning with station-keeping. Method 5400 is merely exemplary and is not limited to the embodiments presented herein. Method 5400 can be employed in many different embodiments or examples not specifically depicted or described herein. In some embodiments, the procedures, the processes, and/or the activities of method 5400 can be performed in the order presented. In other embodiments, the procedures, the processes, and/or the activities of method 5400 can be performed in any suitable order. In still other embodiments, one or more of the procedures, the processes, and/or the activities of method 5400 can be combined or skipped.

Referring to FIG. 54, method 5400 can include a block 5401 of providing one or more first carriers each configured to carry two or more robotic systems. The first carriers can be similar or identical to RPCs 3240, 3250, 3260, 3270 (FIGS. 32-34), and/or RPC 3803 (FIG. 38). The robotic systems can be similar or identical to harvesting robot 100 (FIG. 1), harvesting robot 2000 (FIG. 20), harvesting robots 3461-3464 (FIGS. 34-36), robots 3804-3807 (FIG. 38), and/or other suitable robotic systems, such as the hole-punching robot described above.

In a number of embodiments, method 5400 also can include a block 5402 of providing one or more second carriers configured to be coupled to a vehicle that is movable across a surface. The second carriers can be similar or identical to RPC tracks 3334-3337 (FIGS. 33-34), track 3802 (FIG. 38), and/or RPC tracks 4004-4007 (FIGS. 40-42). The vehicle can be similar or identical to harvesting vehicle 3200 (FIGS. 32-34), vehicle 4001 (FIGS. 40-42), and/or vehicle 4500 (FIGS. 45-46). The surface can be plant beds 1501 (FIGS. 15-16, 20, 28-31), plant beds 3281-3290 (FIGS. 32-34), plant beds 3801 (FIGS. 38-39), plant beds 4021-4032 (FIG. 40), and/or 4300 (FIG. 43), rows 3291-3299 (FIGS. 32-34), rows 4041-4051 (FIG. 40), and/or another suitable surface, such as a work surface.

In several embodiments, method 5400 additionally can include a block 5403 of movably coupling each of the one or more first carriers to one of the one or more second carriers, such that the each of the one or more first carriers is carried by the one of the one or more second carriers. In some embodiments, the system can be configured to automatically hold each of the one or more first carriers in a first carrier position and stationary with respect to the surface for a first time period while the vehicle moves the one or more second carriers in a first direction with respect to the surface, such that at least a portion of each of the two or more robotic systems carried by each of the one or more first carriers is carried in a stationary manner with respect to the surface for the first time period by each of the one or more first carriers. For example, as shown in FIG. 38, the first carrier position can be the position of RPC 3803 in time views 3811-3812 during the first time period in which track 3802 moves in the first direction.

In several embodiments, the system can be further configured to automatically move each of the one or more first carriers after the first time period from the first carrier position relative to the surface to a second carrier position relative to the surface. For example, as shown in FIG. 38, the first carrier position can be the position of RPC 3803 in time views 3811-3812 during the first time period in which track 3802 moves in the first direction.

In some embodiments, the system can be further configured to automatically hold each of the one or more first carriers in the second carrier position and stationary with respect to the surface for a second time period while the vehicle moves the one or more second carriers in the first direction with respect to the surface, such that at least the portion of each of the two or more robotic systems carried by each of the one or more first carriers is carried in the stationary manner with respect to the surface for the second time period by each of the one or more first carriers. For example, as shown in FIG. 38, the second carrier position can be the position of RPC 3803 in time views 3813-3814 during the second time period in which track 3802 moves in the first direction. In many embodiments, the second time period can occur after the first time period.

In some embodiments, a first set of robot positions for the two or more robotic systems during the first time period can include a first robot position and a second robot position. For example, the first robot position can be similar or identical to the position of robot 3806 in time views 3811-3812 of FIG. 38, which can be at plant 3881, as shown in FIGS. 38-39. The first robot position can be similar or identical to the position of robot 3804 in time views 3811-3812 of FIG. 38, which can be at plant 3884, as shown in FIGS. 38-39. A second set of robot positions for the two or more robotic systems during the second time period can include a third robot position and a fourth robot position. For example, the third robot position can be similar or identical to the position of robot 3806 in time views 3813-3814 of FIG. 38, which can be at plant 3882, as shown in FIGS. 38-39. The fourth robot position can be similar or identical to the position of robot 3804 in time views 3813-3814 of FIG. 38, which can be at plant 3885, as shown in FIGS. 38-39. In some embodiments, the first, second, third, and fourth robot positions can be located in a single row extending in the first direction. The single row can be similar or identical to plant row 3901 (FIG. 39) and/or plant row 3902 (FIG. 39). In some embodiments, the single row can include an ordering of the first, second, third, and fourth robot positions such that, when moving in the first direction, the first robot position is located before the third robot position, the third robot position is located before the second robot position, and the second robot position is located before the fourth robot position, such as shown in FIGS. 38-39.

In various embodiments, the system can be further configured to automatically move each of the one or more first carriers after the second time period from the second carrier position to a third carrier position. For example, as shown in FIG. 38, RPC 3803 can move from the second carrier position of RPC 3803 in time view 3814 to the third carrier position of RPC 3803 in time view 3817.

In some embodiments, the system can be further configured to automatically hold each of the one or more first carriers in the third carrier position and stationary with respect to the surface for a third time period while the vehicle moves the one or more carriers in the first direction with respect to the surface, such that at least the portion of each of the two or more robotic systems carried by each of the one or more first carriers is carried in the stationary manner with respect to the surface for the third time period by each of the one or more first carriers in a third set of robot positions. For example, as shown in FIG. 38, the third carrier position can be the position of RPC 3803 in time view 3817 during the third time period in which track 3802 moves in the first direction. In many embodiments, each robot position of the third set of robot positions can be located in the single row. For example, the third set of robot positions can be similar or identical to the position of robot 3806 in time view 3817 of FIG. 38, which can be at plant 3887, and/or the position of robot 3804 in time view 3817 of FIG. 38, which can be at plant 3890, as shown in FIGS. 38-39. In several embodiments, when the vehicle moves in the first direction, the fourth robot position can be located before each robot position of the third set of robot positions, such as shown in FIG. 39.

In a number of embodiments, the system can be further configured to automatically move each of the one or more first carriers after the second time period and before the third time period from the second carrier position to a fourth carrier position. For example, as shown in FIG. 38, RPC 3803 can move from the second carrier position of RPC 3803 in time view 3814 to the fourth carrier position of RPC 3803 in time view 3815.

In some embodiments, the system can be further configured to automatically hold each of the one or more first carriers in the fourth carrier position and stationary with respect to the surface for a fourth time period while the vehicle moves the one or more carriers in the first direction with respect to the surface, such that at least the portion of each of the two or more robotic systems carried by each of the one or more first carriers is carried in a stationary manner with respect to the surface for the fourth time period by each of the one or more first carriers in a fourth set of robot positions. For example, as shown in FIG. 38, the fourth carrier position can be the position of RPC 3803 in time views 3815-3816 during the fourth time period in which track 3802 moves in the first direction.

In some embodiments, the fourth set of robot positions can include a fifth robot position and a sixth robot position. For example, the fifth robot position can be similar or identical to the position of robot 3806 in time views 3815-3816 of FIG. 38, which can be at plant 3883, as shown in FIGS. 38-39. The sixth robot position can be similar or identical to the position of robot 3804 in time views 3815-3816 of FIG. 38, which can be at plant 3886, as shown in FIGS. 38-39. In some embodiments, the fifth and sixth robot positions can be located in the single row, as shown in FIG. 39. In many embodiments, when the vehicle moves in the first direction, the third robot position is located before the fifth robot position, the fifth robot position is located before the second robot position, the fourth robot position is located before the sixth robot position, and the sixth robot position is located before each robot position of the third set of robot positions, such as shown in FIG. 39.

In some embodiments, the system further can include the two or more robotic systems carried by each of the one or more first carriers. In several embodiments, the two or more robotic systems carried by each of the one or more first carriers can perform tasks on a first set of objects during the first time period. In some embodiments, the first set of objects can include plants. In other embodiments, the first set of objects can be other suitable object on which a robotic system can perform work. In several embodiments, the tasks can include picking crops from the plants. The crops can be similar or identical to crops 1511 (FIGS. 15, 20, 28-31). The plants can be similar or identical to plant 1510 (FIG. 15). In some embodiments, the plants can be strawberry plants and each of the crops can be a strawberry. In other embodiments, the plants can be another suitable type of plants, such as a tomato plant, a pepper plant, etc., and the crops can be another suitable type of crop, such as a tomato, a pepper, etc. In some embodiments, the two or more robotic systems carried by each of the one or more first carriers can simultaneously and independently detect and pick ripe strawberries from the strawberry plants.

In many embodiments, the two or more robotic systems on each of the one or more first carriers can be removably coupled to the one or more first carriers. In some embodiments, each of the two or more robotic systems on each of the one or more first carriers can include hole puncher, as described above. In several embodiments, the system further can include the vehicle. In a number of embodiments, the vehicle can automatically move across the surface at an approximately constant velocity in the first direction.

Figure 55:
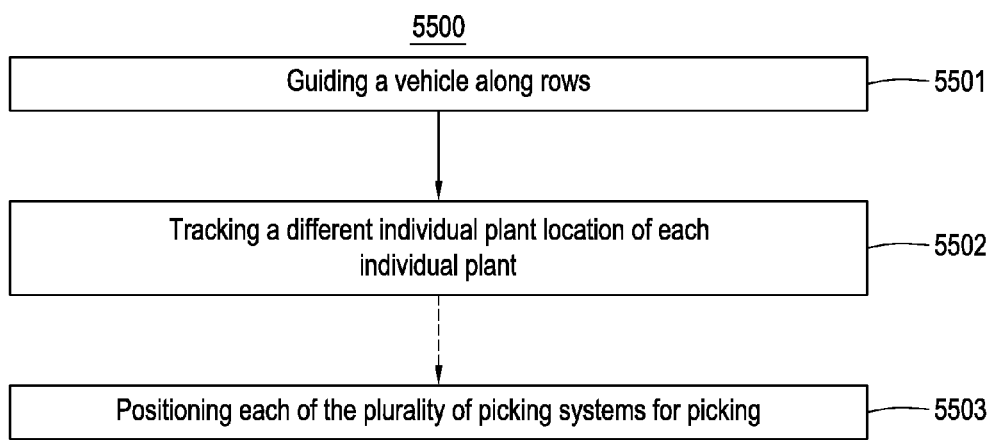
FIG. 55 illustrates a flow chart for a method of individual plant location positioning, according to an embodiment.

Proceeding to the next drawing, FIG. 55 illustrates a flow chart for a method 5500. Method 5500 can be a method of individual plant location positioning. Method 5500 is merely exemplary and is not limited to the embodiments presented herein. Method 5500 can be employed in many different embodiments or examples not specifically depicted or described herein. In some embodiments, the procedures, the processes, and/or the activities of method 5500 can be performed in the order presented. In other embodiments, the procedures, the processes, and/or the activities of method 5500 can be performed in any suitable order. In still other embodiments, one or more of the procedures, the processes, and/or the activities of method 5500 can be combined or skipped. In some embodiments, method 5500 can be performed by harvesting vehicle 3200 (FIGS. 32-34), vehicle 4001 (FIGS. 40-42), and/or vehicle 4500 (FIGS. 45-46), such as by at least guidance control system 5801 (FIG. 58, described below).

Referring to FIG. 55, method 5500 can include a block 5501 of guiding a vehicle along rows. The rows can be similar or identical to rows 3291-3299 (FIGS. 32-34) and/or rows 4041-4051 (FIG. 40). In many embodiments, the rows can be between plant beds. The plant beds can be similar or identical to plant beds 1501 (FIGS. 15-16, 20, 28-31), 3281-3290 (FIGS. 32-34), plant beds 3801 (FIGS. 38-39), and/or plant beds 4021-4032 (FIG. 40). In various embodiments, the vehicle can include a body, a plurality of wheels movable coupled to the body, and a guidance control system. The body can be similar or identical to body 3210 (FIGS. 32-34), body 4406 (FIG. 44), and/or body 4520 (FIGS. 45-46). The wheels can be similar or identical to wheels 3203-3204 (FIGS. 32-34), wheels 4002-4003 (FIGS. 40-42), wheel 4401 (FIG. 44), and/or wheels 4501-4504 (FIGS. 45-46). The guidance control system can be similar or identical to guidance control system 5801 (FIG. 58, described below). The plurality of wheels can be configured to move along the rows such that at least a portion of the body moves above the plant beds.

In a number of embodiments, method 5500 also can include a block 5502 of tracking a different individual plant location of each individual plant of plants that are either planned for growth or growing in the plant beds. In some embodiments, the plants can be strawberry plants. In other embodiments, the plants can be another suitable type of plants, such as a tomato plant, a pepper plant, etc.

The guidance control system further can include a processor. The processing unit can be similar or identical to computer system 1700 (FIG. 17), processing unit 1273 (FIGS. 12-13), processing unit 2173 (FIG. 21), control unit 1272, control unit 2072 (FIGS. 20-21), and/or harvester processing system 5800 (FIG. 58, described below). The guidance control system also can include two global positioning system (GPS) receivers each disposed on a different arm at a different side of the body. The GPS receivers can be similar or identical to GPS receivers 3215-3216 (FIGS. 32-34). The arms can be similar or identical to arms 3213-3214 (FIGS. 32-34). The guidance control system also can include an inertial measurement unit, as described above, which can be internal or external to one or more of the GPS receivers.

In some embodiments, the guidance control system can be configured to calculate a position of the vehicle using at least the two GPS receivers and the inertial measurement unit to track the individual plant locations of the individual plants of the plants. The position can be similar or identical to GCP 4100 (FIGS. 41-42). In many embodiments, the body further can include a plurality of modular attachments configured to attach at separate times to a plurality of picking systems and a plurality of hole punching systems. The modular attachments can be similar or identical to mounting pieces 3511-3514 (FIG. 35). The picking system can each be similar or identical to harvesting robot 100 (FIG. 1) and/or harvesting robot 2000 (FIG. 20). The hole punching system can be similar or identical to the hole punching robot described above.

In many embodiments, block 5501 of guiding the vehicle along the rows further can include, when the plurality of hole punching systems are attached to the plurality of modular attachments, guiding the vehicle such that each of the plurality of hole punching systems is positioned at the different individual plant location of the different individual plant of the plants that are planned for growth in the plant beds. In many embodiments, the different individual plant locations can be determined by the guidance control system.

In several embodiments, holes in each of the plant beds can be punched in rows of holes. The rows of holes can be similar or identical to rows of holes 4321-4322 (FIG. 43). The holes can be similar or identical to holes 4301-4313 (FIG. 43) and/or holes 4311-4313 (FIG. 43). In many embodiments, each hole of the holes in each straight or curved row of holes can be approximately equally spaced from adjacent holes of the holes. For example, hole 4302 (FIG. 43) can be approximately equally spaced from hole 4301 (FIG. 43) and hole 4303 (FIG. 43) in row of holes 4321 (FIG. 43). In some embodiments, block 5501 of tracking the individual plant location of each individual plant further can include tracking a location of each of the holes.

In many embodiments, the plurality of picking systems each can be configured to detect and pick crops from a different individual plant of the plants that are growing in the plant bed. In some embodiments, each of the crops can be a strawberry. In other embodiments, the crops can be another suitable type of crop, such as a tomato, a pepper, etc. In some embodiments, block 5501 of guiding the vehicle along the rows further can include, when the plurality of picking systems are attached to the plurality of modular attachments, guiding the vehicle such that each of the plurality of picking systems is positioned at the different individual plant location of the different individual plant of the plants, such that the plurality of picking systems simultaneously pick the crops from the different individual plants of the plants.

In many embodiments, the body further can include a plurality of first carriers. The first carriers can be similar or identical to RPCs 3240, 3250, 3260, 3270 (FIGS. 32-34), and/or RPC 3803 (FIG. 38). In several embodiments, each of the plurality of first carriers can include a different set of two or more modular attachments of the plurality of modular attachments. In some embodiments, each of the plurality of first carriers can be positioned to be disposed over a different plant bed of the plant beds.

In various embodiments, block 5502 of tracking the different individual plant location of each individual plant of the plants can include tracking the different individual plant location of each individual plant of the plants based on an offset from a measured reference position. For example, the offset can be based on the lever arm described above. In some embodiments, the offset can be determined based on at least a direction of travel of the vehicle and an approximately fixed spacing between the different individual plant locations of the individual plants of the plants.

In several embodiments, method 5500 optionally can include a block 5503 of positioning each of the plurality of picking systems for picking a different individual plant of the plants within a positioning tolerance distance of a different hole of the holes that was punched to plant the different individual plant. In some embodiments, the positioning tolerance distance can be approximately 1.27 cm. In other embodiments, the positioning tolerance distance can be another suitable distance, such as 0.635 cm, or another distance described above.

Figure 56:
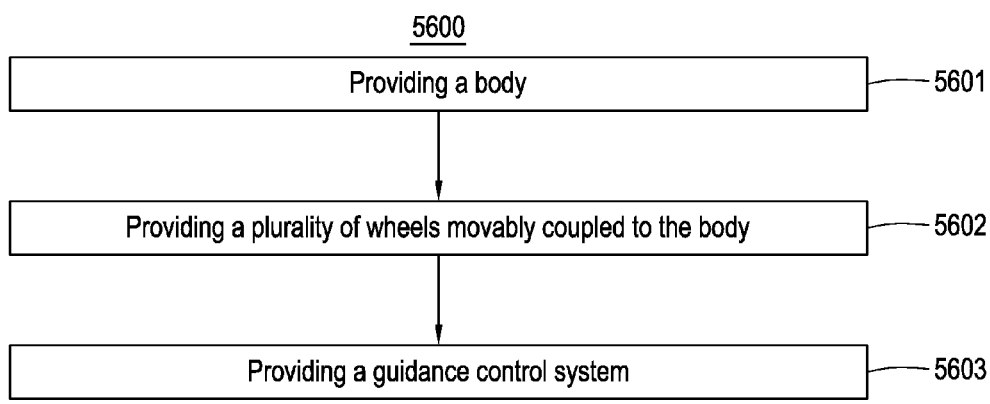
FIG. 56 illustrates a flow chart for a method of providing a vehicle with individual plant location positioning, according to an embodiment.

Proceeding to the next drawing, FIG. 56 illustrates a flow chart for a method 5600. Method 5600 can be a method of providing a vehicle with individual plant location positioning. Method 5600 is merely exemplary and is not limited to the embodiments presented herein. Method 5600 can be employed in many different embodiments or examples not specifically depicted or described herein. In some embodiments, the procedures, the processes, and/or the activities of method 5600 can be performed in the order presented. In other embodiments, the procedures, the processes, and/or the activities of method 5600 can be performed in any suitable order. In still other embodiments, one or more of the procedures, the processes, and/or the activities of method 5600 can be combined or skipped. In some embodiments, the vehicle can be similar or identical to harvesting vehicle 3200 (FIGS. 32-34), vehicle 4001 (FIGS. 40-42), and/or vehicle 4500 (FIGS. 45-46).

Referring to FIG. 56, method 5600 can include a block 5601 of providing a body. The body can be similar or identical to body 3210 (FIGS. 32-34), body 4406 (FIG. 44), and/or body 4520 (FIGS. 45-46).

In a number of embodiments, method 5600 also can include a block 5602 of providing a plurality of wheels movably coupled to the body. The wheels can be similar or identical to wheels 3203-3204 (FIGS. 32-34), wheels 4002-4003 (FIGS. 40-42), wheel 4401 (FIG. 44), and/or wheels 4501-4504 (FIGS. 45-46). In many embodiments, the plurality of wheels can be configured to roll through rows between plant beds such that at least a portion of the body moves above the plant beds. The rows can be similar or identical to rows 3291-3299 (FIGS. 32-34) and/or rows 4041-4051 (FIG. 40). The plant beds can be similar or identical to plant beds 1501 (FIGS. 15-16, 20, 28-31), 3281-3290 (FIGS. 32-34), plant beds 3801 (FIGS. 38-39), and/or plant beds 4021-4032 (FIG. 40).

In several embodiments, method 5600 additionally can include a block 5603 of providing a guidance control system. The guidance control system can be similar or identical to guidance control system 5801 (FIG. 58, described below). In many embodiments, the guidance control system can be configured to guide the vehicle along the rows. In several embodiments, the guidance control system can be configured to track a different individual plant location of each individual plant of plants that are either planned for growth or growing in the plant beds. In some embodiments, the plants can be strawberry plants. In other embodiments, the plants can be another suitable type of plants, such as a tomato plant, a pepper plant, etc.

The guidance control system can include a processor. The processing unit can be similar or identical to computer system 1700 (FIG. 17), processing unit 1273 (FIGS. 12-13), processing unit 2173 (FIG. 21), control unit 1272, control unit 2072 (FIGS. 20-21), and/or harvester processing system 5800 (FIG. 58, described below). The guidance control system also can include two global positioning system (GPS) receivers each disposed on a different arm at a different side of the body. The GPS receivers can be similar or identical to GPS receivers 3215-3216 (FIGS. 32-34). The arms can be similar or identical to arms 3213-3214 (FIGS. 32-34). The guidance control system also can include an inertial measurement unit, as described above, which can be internal or external to one or more of the GPS receivers.

In some embodiments, the guidance control system can be configured to calculate a position of the vehicle using at least the two GPS receivers and the inertial measurement unit to track the individual plant locations of the individual plants of the plants. The position can be similar or identical to GCP 4100 (FIGS. 41-42). In many embodiments, the body further can include a plurality of modular attachments configured to attach at separate times to a plurality of picking systems and a plurality of hole punching systems. The modular attachments can be similar or identical to mounting pieces 3511-3514 (FIG. 35). The picking system can each be similar or identical to harvesting robot 100 (FIG. 1) and/or harvesting robot 2000 (FIG. 20). The hole punching system can be similar or identical to the hole punching robot described above. In many embodiments, the different individual plant locations can be determined by the guidance control system.

In many embodiments, the guidance control system can further be configured guide the vehicle such that, when the plurality of hole punching systems are attached to the plurality of modular attachments, each of the plurality of hole punching systems is positioned at the different individual plant location of the different individual plant of the plants that are planned for growth in the plant beds.

In several embodiments, the holes in each of the plant beds can be punched in rows of holes. The rows of holes can be similar or identical to rows of holes 4321-4322 (FIG. 43). The holes can be similar or identical to holes 4301-4313 (FIG. 43) and/or holes 4311-4313 (FIG. 43). In many embodiments, each hole of the holes in each row of holes can be approximately equally spaced from adjacent holes of the holes. For example, hole 4302 (FIG. 43) can be approximately equally spaced from hole 4301 (FIG. 43) and hole 4303 (FIG. 43) in row of holes 4321 (FIG. 43). In some embodiments, the guidance control system can be further configured to track a location of each of the holes.

In many embodiments, the plurality of picking systems each can be configured to detect and pick crops from a different individual plant of the plants that are growing in the plant bed. In some embodiments, each of the crops can be a strawberry. In other embodiments, the crops can be another suitable type of crop, such as a tomato, a pepper, etc. In some embodiments, the guidance control system can be further configured to guide the vehicle such that, when the plurality of picking systems are attached to the plurality of modular attachments, each of the plurality of picking systems is positioned at the different individual plant location of the different individual plant of the plants, such that the plurality of picking systems simultaneously pick the crops from the different individual plants of the plants.

In some embodiments, the guidance control system can be further configured to position each of the plurality of picking systems for picking the different individual plant of the plants within a positioning tolerance distance of a different hole of the holes that was punched to plant the different individual plant. In some embodiments, the positioning tolerance distance can be approximately 1.27 cm. In other embodiments, the positioning tolerance distance can be another suitable distance, such as 0.635 cm, or another distance described above.

In many embodiments, the body further can include a plurality of first carriers. The first carriers can be similar or identical to RPCs 3240, 3250, 3260, 3270 (FIGS. 32-34), and/or RPC 3803 (FIG. 38). In several embodiments, each of the plurality of first carriers can include a different set of two or more modular attachments of the plurality of modular attachments. In some embodiments, each of the plurality of first carriers can be positioned to be disposed over a different plant bed of the plant beds.

In several embodiments, the guidance system can be further configured to track the different individual plant location of each individual plant of the plants based on an offset from a measured reference position. For example, the offset can be based on the lever arm described above. In some embodiments, the offset can be determined based on at least a direction of travel of the vehicle and an approximately fixed spacing between the different individual plant locations of the individual plants of the plants.

Turning ahead in the drawings, FIG. 57 illustrates a block diagram of a robotic processing system 5700 that can be employed for at least partially performing embodiments of various methods relating to the robots described herein, such as harvesting robots 100 (FIG. 1) and/or 2000 (FIG. 20). Robotics processing system 5700 is merely exemplary and embodiments of the system are not limited to robotics processing system presented herein. The robotics processing system can be employed in many different embodiments or examples not specifically depicted or described herein. In some embodiments, certain elements or modules of robotics processing system 5700 can perform various procedures, processes, and/or activities. In other embodiments, the procedures, processes, and/or activities can be performed by other suitable elements or modules of robotics processing system 5700. In some embodiments, robotic processing system 5700 can be perform by one or more of a processing unit, such as processing unit 1273 (FIGS. 12-13) and/or processing unit 2173 (FIG. 21), and/or a control unit, such as control unit 1272 and/or control unit 2072 (FIGS. 20-21).

In some embodiments, robotics processing system 5700 can include an imaging system 5701, a robotics system 5702, a communications system 5703, and/or a foliage displacement control system 5704. In some embodiments, each of the systems (5701-5704) can be implemented in software and/or hardware in the processing unit, such as processing unit 1273 (FIGS. 12-13) and/or processing unit 2173 (FIG. 21), and/or the control unit, such as control unit 1272 and/or control unit 2072 (FIGS. 20-21).

In many embodiments, imaging system 5701 can receive imaging input from imaging sensors (e.g., imaging sensors 1290-1291 (FIGS. 12-13) and/or imaging sensors 2190-2191 (FIG. 21)). In a number of embodiments, imaging system 5701 can process the imaging input to determine distances and/or locations of objects, such as the crops (e.g., 1511 (FIG. 15)) and/or the plant beds (e.g., 1501 (FIG. 15)), such as by using conventional methods. In many embodiments, imaging system 5701 can process the imaging input to determine the ripeness of the crops (e.g., 1511 (FIG. 15)), such as by using conventional methods. In several embodiments, imaging system 5701 can determine blooms on the plant (e.g., 1510 (FIG. 15)), determine the stage of the blooms, and/or count the number of blooms (or number of blooms at each stage). In many embodiments, each plant can have unique identifiers for location based on their GPS coordinates. In many embodiments, imaging system can provide information about the individual plants the robots are inspecting/picking including the number (and/or type) of blooms a robot has counted on the individual plant and the numbers of ripe and unripe berries, along with how many berries the robot picked off the plant. Using the unique identifier for each plant, robotics processing system and/or harvester processing system 5800 (FIG. 58, described below) can store this information about each plant in the field. Based off of plant production in this capacity, a great deal of information can be derived from this data, such as predictive analysis of how many berries might be coming from a plant, and how plants may have produced better in one part of a field based off of the number of berries picked (which could be correlated back to water and soil analysis). The analytics can be extensive when so much data can be stored from each plant.

In a number of embodiments, imaging system 5701 can at least partially perform block 4706 (FIG. 47) of receiving information at a processing unit of a system from one or more imaging sensors.

In many embodiments, robotics system 5702 can control the rotation of harvesting robots 100 (FIG. 1) and/or 2000 (FIG. 20) to detect crops (e.g., 1511 (FIG. 15)), and to determine, based at least in part on the imaging information from imaging system 5701, how to position and control harvesting robots 100 (FIG. 1) and/or 2000 (FIG. 20) to pick the crops. In many embodiments, robotics system 5702 can control the motors and actuators in harvesting robots 100 (FIG. 1) and/or 2000 (FIG. 20). In several embodiments, robotics system 5702 can receive input from harvester processing system 5800 (FIG. 58, described below), when harvesting robots 100 (FIG. 1) and/or 2000 (FIG. 20) can start rotating to detect and pick crops (e.g., 1511 (FIG. 15)) from a plant (e.g., 1510 (FIG. 15)), and can report back to harvester processing system 5800 (FIG. 58, described below) when the detecting and picking is complete for a plant (e.g., 1510 (FIG. 15)).

In a number of embodiments, robotics system 5702 can at least partially perform blocks 4701-4705 (FIG. 47), blocks 4708-4711 (FIG. 47), block 4903 (FIG. 49), and/or block 5301 (FIG. 53).

In many embodiments, communications system 5703 can provide for communication with harvester processing system 5800 (FIG. 58, described below). In some embodiments, the harvesting robots (e.g., 100 (FIG. 1), 2000 (FIG. 20)) can communicate with the harvester processing system 5800 (FIG. 58, described below) through a compact communication system that uses MQTT (Message Queue Telemetry Transport) or other suitable protocols for fast network communications.

In many embodiments, foliage displacement control system 5704 can control leaf displacement system 2800 (FIGS. 28-31). In several embodiments, foliage displacement control system 5704 can receive input from harvester processing system 5800 (FIG. 58, described below) and/or robotics system 5702, when foliage displacement system 2800 (FIGS. 28-31) should transition from the open configuration (as shown in FIG. 28) to the closed configuration (as shown in FIG. 31), and when foliage displacement system 2800 (FIGS. 28-31) should transition from the closed configuration (as shown in FIG. 31) to the open configuration (as shown in FIG. 28).

In a number of embodiments, foliage displacement control system 5704 can at least partially perform blocks 4901-4902 (FIG. 49).

Turning ahead in the drawings, FIG. 58 illustrates a block diagram of a harvester processing system 5800 that can be employed for at least partially performing embodiments of various methods relating to the vehicles described herein, such as harvesting vehicle 3200 (FIGS. 32-34), vehicle 4001 (FIGS. 40-42), and/or vehicle 4500 (FIGS. 45-46). Harvester processing system 5800 is merely exemplary and embodiments of the system are not limited to harvester processing system presented herein. The harvester processing system can be employed in many different embodiments or examples not specifically depicted or described herein. In some embodiments, certain elements or modules of harvester processing system 5800 can perform various procedures, processes, and/or activities. In other embodiments, the procedures, processes, and/or activities can be performed by other suitable elements or modules of harvester processing system 5800. In some embodiments, harvester processing system 5800 can be perform by one or more of a processing unit, which can be as processing unit 1273 (FIGS. 12-13) and/or processing unit 2173 (FIG. 21), and/or a control unit, which can be similar to control unit 1272 and/or control unit 2072 (FIGS. 20-21). The processing unit and/or the control unit can be disposed on a suitable position of the vehicle (e.g., harvesting vehicle 3200 (FIGS. 32-34), vehicle 4001 (FIGS. 40-42), and/or vehicle 4500 (FIGS. 45-46)).

In some embodiments, robotics processing system 5800 can include a guidance control system 5801, an RPC drive system 5802, a suspension control system 5803, and/or a communications system 5804. In some embodiments, each of the systems (5801-5804) can be implemented in software and/or hardware in the processing unit, such as processing unit 1273 (FIGS. 12-13) and/or processing unit 2173 (FIG. 21), and/or the control unit, such as control unit 1272 and/or control unit 2072 (FIGS. 20-21).

In many embodiments, guidance control system 5801 can receive input from the GPS receivers (e.g., 3215 or 3216 (FIGS. 32-34)), the IMU, and/or the height information from the robots, as described above in connection with FIGS. 45-46. In a number of embodiments, guidance control system 5801 can process the input to determine how to guide the vehicle such as harvesting vehicle 3200 (FIGS. 32-34), vehicle 4001 (FIGS. 40-42), and/or vehicle 4500 (FIGS. 45-46), and/or to determine the location of the RPCs (e.g., 3240, 3250, 3260, 3270 (FIGS. 32-24)), the robots carried by the RPCs, and/or the plant locations.

In a number of embodiments, guidance control system 5801 can at least partially perform blocks 5301 (FIG. 53) and/or blocks 5501-5503 (FIG. 55).

In many embodiments, RPC drive system 5802 can use input from guidance control system 5801 to control the positioning of the RPCs (e.g., 3240, 3250, 3260, 3270 (FIG. 32-24)). For example, RPC drive system can control RPC motor 3231 (FIGS. 32-34) to drive RPC drive shaft 3230 in either rotational direction, as appropriate, to position the RPC (e.g., 3240, 3250, 3260, 3270 (FIGS. 32-24)) as described above. In many embodiments, once the RPC (e.g., 3240, 3250, 3260, 3270 (FIGS. 32-24)) is positioned in a station-keeping position, as described above, RPC drive system 5802 can communicate with each robotics processing system 5700 (FIG. 57) of the robots to initiate a task, such as picking. In some embodiments, RPC drive system 5802 can receive a response from robotic processing system 5700 (FIG. 57) when the task is complete.

In a number of embodiments, RPC drive system 5802 can at least partially perform blocks 5302, 5304, 5305-5309 (FIG. 53), 5503 (FIG. 55).

In many embodiments, suspension control system 5803 can control actuator 4408 (FIG. 44) in the suspension components (e.g., 4400 (FIG. 44)), which can control the vertical position of one or more wheels (e.g., 4501-4504 (FIGS. 45-46)) with respect to body 4520 (FIGS. 45-46). In many embodiments, suspension control system 5803 can receive input from imaging sensors (e.g., imaging sensors 1290-1291 (FIGS. 12-13) and/or images sensors 2190-2191 (FIG. 21)), such as height information, as described above, to determine how to adjust the wheels (e.g., 4501-4504 (e.g., 45-46)) to control actuator 4408 (FIG. 44).

In a number of embodiments, suspension control system 5803 can at least partially perform blocks 5101-5103 (FIG. 51).

In many embodiments, communications system 5804 can provide for communication with each robotic processing system 5700 (FIG. 57), as described above. In some embodiments, communications system 5804 can provide for communications external to the vehicle (e.g., harvesting vehicle 3200 (FIGS. 32-34), vehicle 4001 (FIGS. 40-42), and/or vehicle 4500 (FIGS. 45-46)), such as wireless communications with external systems, such as through a wireless local area network, mobile telecommunications data systems, or other suitable communications system.

In a number of embodiments, communications system 5804 can at least partially perform blocks 5101 (FIG. 51).

Although the systems and methods herein have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-58 may be modified, and that the foregoing discussion of certain of these embodiments does not necessarily represent a complete description of all possible embodiments. For example, one or more of the procedures, processes, or activities of FIGS. 19 and 47-56 may include different procedures, processes, and/or activities and be performed by many different modules, in many different orders, and/or one or more of the procedures, processes, or activities of FIGS. 19 and 47-56 may include one or more of the procedures, processes, or activities of another different one of FIGS. 19 and 47-56.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A harvesting vehicle comprising:
a body comprising a plurality of picking systems configured to be carried over plants growing in at least one plant bed to harvest crops of the plants, each picking system comprising an imaging system and configured to (a) determine a height of the picking system over one of the at least one plant bed as the picking system is carried over the plants and (b) provide distance measurement data based on the height;
a plurality of wheels each having a vertical position with respect to the body; and
a suspension control system configured to perform:
receiving the distance measurement data from the plurality of picking systems;
determining adjustment information for an adjustment of the vertical position of at least one of the plurality of wheels with respect to the body based at least in part on the distance measurement data provided by at least one of the plurality of picking systems; and
controlling the adjustment of the vertical position of the at least one of the plurality of wheels with respect to the body based on the adjustment information.

2. The harvesting vehicle of claim 1, wherein:
determining the adjustment information further comprises:
determining the adjustment information at least in part based on the distance measurement data provided by all of the plurality of picking systems.

3. The harvesting vehicle of claim 1, wherein:
determining the adjustment information further comprises:
determining the adjustment information at least in part based on an average of the distance measurement data provided by all of the plurality of picking systems.

4. The harvesting vehicle of claim 1, wherein:
each of the plurality of wheels is slidably coupled to the body.

5. The harvesting vehicle of claim 1 further comprising:
a plurality of suspension actuators each corresponding to a different wheel of the plurality of wheels and each configured to adjust the vertical position of the corresponding wheel of the plurality of wheels independent of adjustments to other wheels of the plurality of wheels by others of the plurality of suspension actuators.

6. The harvesting vehicle of claim 1, wherein:
the height of the picking system over the one of the at least one plant bed is determined based on a distance between the imaging system of the picking system and at least one of the crops of the plants in the one of the at least one plant bed.

7. The harvesting vehicle of claim 1, wherein:
the suspension control system is further configured to control the adjustment of the vertical position of the at least one of the plurality of wheels such that a bottommost part of each of the plurality of picking systems is kept at a first distance above a bed of the at least one plant bed when the picking system is being carried over the bed.

8. The harvesting vehicle of claim 7, wherein:
the first distance is approximately 5.08 cm to approximately 12.7 cm.

9. The harvesting vehicle of claim 1, wherein:
each picking system provides the distance measurement data at least twice per second.

10. The harvesting vehicle of claim 1, wherein:
the plants are strawberry plants; and
each of the crops is a strawberry.

11. A method comprising:
receiving distance measurement data provided from a plurality of picking systems carried by a harvesting vehicle over plants growing in at least one plant bed to harvest crops of the plants, each picking system comprising an imaging system and configured to determine a height of the picking system over one of the at least one plant bed as the picking system is carried over the plants, the distance measurement data being based on the height, the harvesting vehicle comprising (a) a body comprising the plurality of picking systems and (b) a plurality of wheels each having a vertical position with respect to the body;
determining adjustment information for an adjustment of the vertical position of at least one of the plurality of wheels with respect to the body based at least in part on the distance measurement data provided by at least one of the plurality of picking systems; and
controlling the adjustment of the vertical position of the at least one of the plurality of wheels with respect to the body based on the adjustment information.

12. The method of claim 11, wherein:
determining the adjustment information further comprises:
determining the adjustment information at least in part based on the distance measurement data provided by all of the plurality of picking systems.

13. The method of claim 11, wherein:
determining the adjustment information further comprises:
determining the adjustment information at least in part based on an average of the distance measurement data provided by all of the plurality of picking systems.

14. The method of claim 11, wherein:
each of the plurality of wheels is slidably coupled to the body.

15. The method of claim 11, wherein:
the harvesting vehicle further comprises a plurality of suspension actuators each corresponding to a different wheel of the plurality of wheels and each configured to adjust the vertical position of the corresponding wheel of the plurality of wheels independent of adjustments to other wheels of the plurality of wheels by others of the plurality of suspension actuators.

16. The method of claim 11, wherein:
the height of the picking system over the one of the at least one plant bed is determined based on a distance between the imaging system of the picking system and at least one of the crops of the plants in the one of the at least one plant bed.

17. The method of claim 11, wherein:
controlling the adjustment of the vertical position of the at least one of the plurality of wheels comprises:
controlling the adjustment of the vertical position of the at least one of the plurality of wheels such that a bottommost part of each of the plurality of picking systems is kept at a first distance above a bed of the at least one plant bed when the picking system is being carried over the bed.

18. The method of claim 17, wherein:
the first distance is approximately 5.08 cm to approximately 12.7 cm.

19. The method of claim 11, wherein:
each picking system provides the distance measurement data at least twice per second.

20. The method of claim 11, wherein:
the plants are strawberry plants; and
each of the crops is a strawberry.

* * * * *